(12) United States Patent
Nikitin

(10) Patent No.: US 10,374,507 B2
(45) Date of Patent: Aug. 6, 2019

(54) METHOD AND APPARATUS FOR REGULATED AC-TO-DC CONVERSION WITH HIGH POWER FACTOR AND LOW HARMONIC DISTORTIONS

(71) Applicant: Avatekh, Inc., Lawrence, KS (US)

(72) Inventor: Alexei V. Nikitin, Manhattan, KS (US)

(73) Assignee: Avatekh, Inc., Lawrence, KS (US)

( * ) Notice: Subject to any disclaimer, the term of this patent is extended or adjusted under 35 U.S.C. 154(b) by 0 days.

(21) Appl. No.: 15/896,930

(22) Filed: Feb. 14, 2018

(65) Prior Publication Data

US 2018/0191237 A1 Jul. 5, 2018

Related U.S. Application Data

(63) Continuation of application No. 15/347,421, filed on Nov. 9, 2016, now Pat. No. 9,923,448, which is a continuation-in-part of application No. 15/086,411, filed on Mar. 31, 2016, now Pat. No. 9,531,282.

(60) Provisional application No. 62/142,910, filed on Apr. 3, 2015.

(51) Int. Cl.
*H02M 1/12* (2006.01)
*H02M 1/42* (2007.01)
*H02M 7/217* (2006.01)
*H02M 7/23* (2006.01)

(52) U.S. Cl.
CPC ............ *H02M 1/12* (2013.01); *H02M 1/4216* (2013.01); *H02M 7/217* (2013.01); *H02M 7/23* (2013.01); *Y02B 70/126* (2013.01)

(58) Field of Classification Search
CPC .. H02M 3/33546; H02M 7/04; H02M 1/4216; H02M 1/44; H02M 1/12
See application file for complete search history.

(56) References Cited

U.S. PATENT DOCUMENTS

| | | | |
|---|---|---|---|
| 5,768,112 A | 6/1998 | Barrett | |
| 5,844,791 A | 12/1998 | Swamy | |
| 5,914,588 A | 6/1999 | Jiang | |
| 5,923,152 A | 7/1999 | Guerrera | |
| 8,094,473 B2 | 1/2012 | Moon | |
| 9,531,282 B1 * | 12/2016 | Nikitin | H02M 1/4216 |
| 9,923,448 B2 * | 3/2018 | Nikitin | H02M 1/12 |
| 2012/0120697 A1 | 5/2012 | Cuk | |
| 2014/0204614 A1 | 7/2014 | Elam | |
| 2015/0016156 A1 | 1/2015 | Ganev et al. | |

OTHER PUBLICATIONS

S. Ramamoorthy, "Improved Three Phase AC-DC Converter w/Power Factor & Harmonics Correction"; Middle-East Journal of Scientific Research—2014, pp. 1597-1604, Dept of EEE, Bharath Univ., Chennai-73, India, ISSN 1990-9233.
Kolar, J.W.; Muhlethaler, J.; "The Essence of Three-Phase PFC Rectifier Systems", Swiss Fed Institute of Tech Zurich, Power Elec Systems Lab, www.pes.ee.ethz.ch, 2012.

* cited by examiner

*Primary Examiner* — Jue Zhang
(74) *Attorney, Agent, or Firm* — Erikson Kernell IP, LLC

(57) ABSTRACT

The present invention relates to methods and corresponding apparatus for AC to DC conversion, including 3-phase AC to DC conversion, with high power quality, for example, high power factor and low harmonic distortions. The invention further relates to methods and corresponding apparatus for regulation and control of said AC to DC conversion.

10 Claims, 44 Drawing Sheets

METHOD AND APPARATUS FOR REGULATED AC-TO-DC CONVERSION WITH HIGH POWER FACTOR AND LOW HARMONIC DISTORTIONS

CROSS REFERENCES TO RELATED APPLICATIONS

This is a continuation of U.S. patent application Ser. No. 15/347,421, filed on 9 Nov. 2016, which is a continuation of U.S. patent application Ser. No. 15/086,411, filed on 31 Mar. 2016 (now U.S. Pat. No. 9,531,282), which claims benefit of provisional application 62/142,910, filed on 3 Apr. 2015.

STATEMENT REGARDING FEDERALLY SPONSORED RESEARCH OR DEVELOPMENT

None.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to methods and corresponding apparatus for AC to DC conversion, including 3-phase AC to DC conversion, with high power quality, for example, high power factor and low harmonic distortions. The invention further relates to methods and corresponding apparatus for regulation and control of said AC to DC conversion.

BACKGROUND

AC/DC converters may be widely used in many types of industry. For example, in many applications electrical power for components in a system may be provided using AC generators. Because certain types of components (or loads) may not use AC power, it would be common to rectify AC power to obtain DC power. Rectification, however, may not be accomplished with 100% efficiency, and typically results in reduction in power quality, for example, reduction in power factor and in increased harmonic distortions of the line currents. In many applications, the power quality may need to be at or above a certain level in order to prevent disturbance to other loads on the system.

For example, there is an increasing need for high power 3-phase AC/DC converters for the next generation of More Electric Aircraft (MEA). New standards for the power factor and, more importantly, the limits on the reflected current harmonics imposed by DO-160, Environmental Conditions and Test Procedures for Airborne Equipment, call for development of AC/DC converters, including those based on active power factor correction (PFC) topologies, that satisfy these stringent requirements.

Further, certain applications may have constraints on and/or requirements regarding the output power, weight, size, cost, complexity, and reliability, and on the electromagnetic compatibility (EMC) and electromagnetic interference (EMI) emissions of AC/DC converters.

There typically exist various other, often conflicting requirements on AC/DC conversion. Those may include, but are not limited to, requirements on different voltage conversion ratios (e.g., from 115 VAC to 270 VDC, or from 230 VAC to 540 VDC), "wild" frequency compatibility (i.e., the ability to convert AC power that varies in time in a wide frequency range, e.g., from 300 Hz to 800 Hz), output voltage ripple, soft start ability (e.g., for powering motors), over-current protection, cooling method(s), and environmental requirements/qualifications.

Power conversion technologies that are capable of meeting enhanced power quality requirements may be characterized as passive conversion, active conversion, and "hybrid" conversion employing harmonic correction techniques such as those based on harmonic injection and/or active filter implementation. An overview of different approaches to constructing three-phase rectifier systems may be found in, e.g., [3] and the references thereof.

For example, passive AC/DC power conversion may be accomplished with a plurality of diode pairs, where each pair is connected to a different phase of the AC input, to provide a rectified DC output. However, this type of AC/DC conversion may lead to substantial current harmonics that would pollute the electric power generation and distribution system. One solution to the foregoing problem may be to increase the number of supply phases for rectification.

To reduce current harmonics, multi-phase transformers (Transformer Rectifier Units, or TRUs) and/or autotransformers (Auto-Transformer Rectifier Units, or ATRUs) may be employed to increase the number of AC phases supplied to the rectifier unit. For example, in an 18-pulse passive AC/DC converter (18-pulse TRU/ATRU) the transformer/autotransformer may be used to transform the three-phase AC input whose phases are spaced at 120°, into a system with nine phases spaced at 40°. This would have the effect of reducing the harmonics associated with the AC/DC conversion.

Passive multi-phase harmonic reduction typically has the advantages of relative simplicity and low cost, absence of or reduced need for energy storage devices and/or control, high reliability (e.g., typical mean time between failures (MTBF) in excess of 100,000 hours), robustness (e.g., the ability to accepts high overloads), and low weight at high line frequencies (e.g., at 400 Hz and higher).

An absence of output voltage regulation may be viewed as the main disadvantage of passive conversion. Without such regulation, input voltage variations are proportionally passed to the output, and a change in the load would also result in a change in the output voltage. For example, in a passive converter from 115 VAC to 270 VDC a typical difference in the output voltage between no load to full load conditions may be approximately 4% to 6%, or 11 VDC to 16 VDC. To obtain output voltage regulation, an additional active DC/DC converter stage would need to follow a passive AC/DC converter stage, which would increase complexity, weight, and cost, and would decrease efficiency, robustness, and reliability of the converter. Also, the absence of regulation may result in presence of significant inrush currents.

To overcome certain limitations of passive conversion, various active conversion means may be employed, in addition or as an alternative to passive conversion. Such means may include, for example, harmonic correction techniques based on harmonic injection and/or active filter implementation.

As a main alternative to passive AC/DC converters, active (e.g., high frequency switch mode) AC/DC conversion may also be used, and such active conversion would be capable of providing regulated DC output voltage.

Output voltage regulation and/or adjustment may be considered the main advantage of active conversion. Also, active regulation topologies may operate in a wide range of line frequencies (e.g., the same active AC/DC converter may be used for 300 Hz, 800 Hz, and/or 50/60 Hz), and would typically have a built-in soft start ability, over-current protection, current limiting, and thermal protection. In addition, active AC/DC converters may have significantly lower weight for low AC frequency conversion in comparison with passive converters designed for such low frequencies.

The disadvantages of active converters may include higher cost and lower reliability, the need for high energy storage capacitor(s), and lower overload capabilities in comparison with passive conversion. In addition, active AC/DC converters may not easily accomplish conversion at some voltage conversion ratios.

For example, two typical active approaches may include boost (step-up) and buck (step-down) conversion. For a 115 VAC line-to-neutral 3-phase input voltage, a boost converter would be capable of providing ≳320 VDC output, while a buck converter would be capable of providing ≲230 VDC output. Thus the output voltage range from 230 VDC to 320 VDC may not be available without an additional DC/DC conversion stage.

Depending on the converter topology, the output power requirements, and the AC/DC voltage conversion ratios, practical state-of-art passive, hybrid, and active AC/DC converters would provide the input-current total harmonic distortion (THD) in a typical range of 3% to 12%. Further reduction of the THD (to, e.g., 1% to 2% range) may require more complicated multi-stage and/or multi-level approaches, with typically more than three active power switches, increased complexity and cost, and decreased robustness and reliability.

In addition, state-of-art active AC/DC converters targeting high power quality may require complicated regulation and control topologies, e.g., those utilizing variable switching frequency, fuzzy logic, and/or multiple feedback control loops.

SUMMARY

The present invention disclosed herein may be referred to as an Ultra Linear Switching Rectifier, or ULSR, where "ultra" may refer to very or extremely, "linear" may refer to proportional relation between input currents and voltages, and thus imply high power factor (PF) and low total harmonic distortion (THD), "switching" may refer to active (solid state) switching, and "rectifier" may refer to AC/DC conversion.

The ULSR may be viewed as a unidirectional three-phase three-switch pulse-width modulation (PWM) rectifier with controlled output voltage. It may also be viewed as a three-phase diode bridge with an integrated buck-boost converter.

The ULSR offers a wide range of technical and commercial advantages over the state-of-art solutions that may include, but are not limited to, the following:

(i) Efficient 3-phase AC-to-DC conversion with high power factor (e.g., ≳99.9%) and low harmonic distortions (e.g., ≲0.5%) for a wide range of line frequencies (e.g., from 50 Hz to 1 kHz), output powers (e.g., from zero to ≳10 kW), and voltage conversion ratios; (ii) various standard and custom conversion voltages, including step-up and step-down conversion, and the output voltages corresponding to those of a three-phase full-wave diode rectifier ($V_{out}/V_{LN} \approx 2.34$, e.g., 115 VAC to 270 VDC, or 230 VAC to 540 VDC); (iii) both non-isolated and isolated topologies with similar complexity, power densities, and other properties; (iv) low complexity, low realization effort; (v) lightweight and rugged "all-solid-state" design; (vi) three-wire input, no connection to neutral; (vii) low EMI emissions; (viii) "wild" line frequency compatibility; (ix) well distributed and equalized currents through active and passive components; (x) flexible cooling options (e.g., forced air, fan, cold plate, liquid cooling); (xi) flexible options for component technologies (e.g., conventional Si devices, SiC- or GaN-based semiconductors, diodes or actively controlled switches, air or magnetic core inductors); (xii) large acceptable tolerances and long-term drifts; (xiii) reliable behavior under heavily unbalanced mains voltages and in case of mains failure; (xiv) ability to easily connect various ULSR converters (of the same and/or different power ratings) in parallel to increase power and/or to provide N+1 redundancy.

While a variety of state-of-art fixed and/or variable switching frequency (e.g., in a 40 kHz to 500 kHz range) PWM controllers may be used with ULSRs to provide a regulated output voltage, the present invention also discloses a simple, robust, and stable analog fixed-frequency PWM controller, with a common control signal to all three switches, that is tailored to the ULSR topology. Said controller requires only output voltage feedback control loop (but may also include an additional load current feedback to improve transient response of the ULSR to the changes in the load), and is capable of providing a regulated ULSR output voltage for full range of output power (i.e. from full load to open circuit), with small amplitude and short duration voltage and current transients in response to load changes.

Further scope and the applicability of the invention will be clarified through the detailed description given hereinafter. It should be understood, however, that the specific examples, while indicating preferred embodiments of the invention, are presented for illustration only. Various changes and modifications within the spirit and scope of the invention should become apparent to those skilled in the art from this detailed description. Furthermore, all the mathematical expressions, and the examples of hardware implementations are used only as a descriptive language to convey the inventive ideas clearly, and are not limitative of the claimed invention.

ABBREVIATIONS

Figure 1:
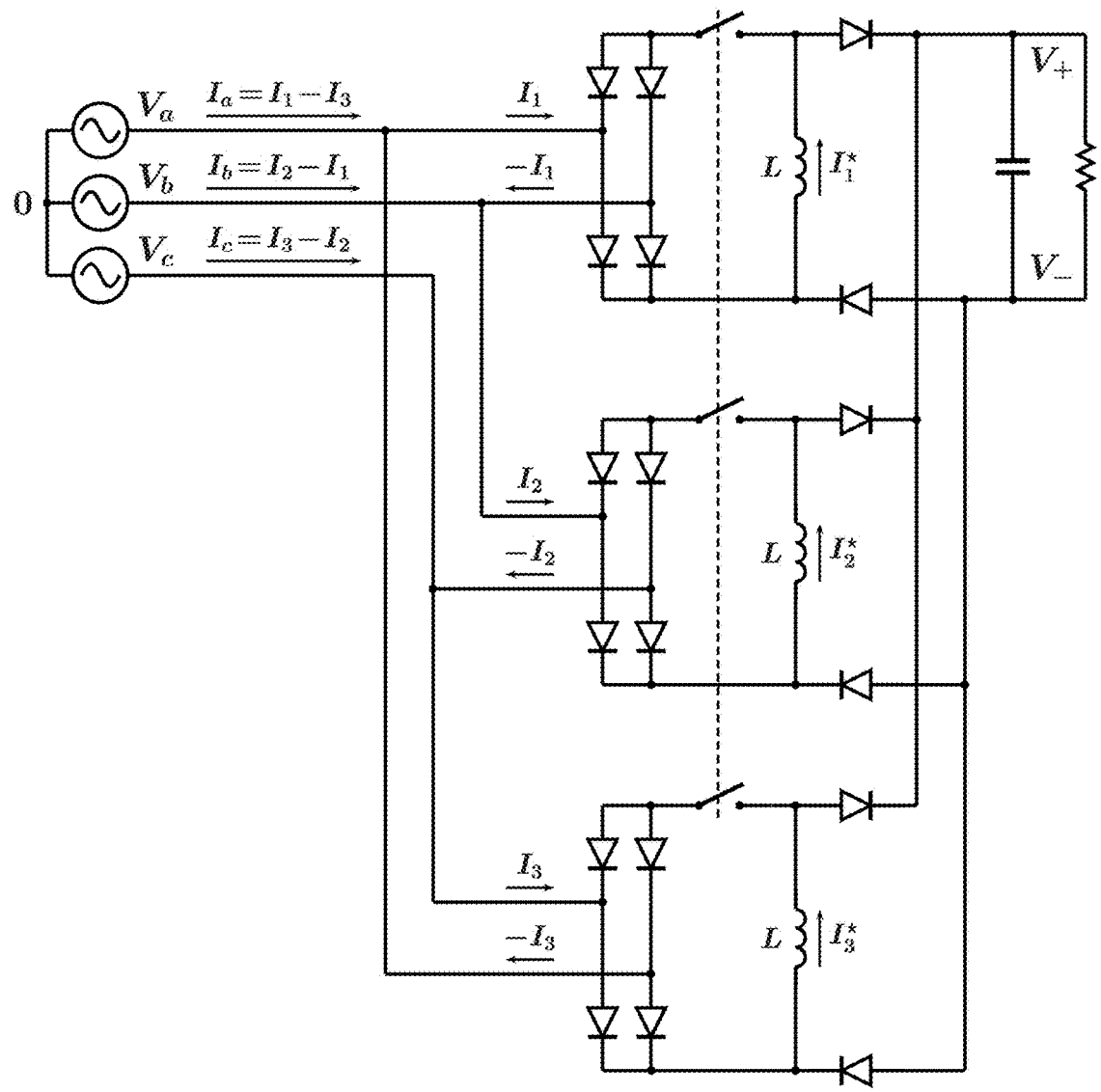
FIG. 1. Initial idealized circuit diagram of a 3-phase AC/DC converter of the current invention.

AC: alternating (current or voltage); ATRU: Auto-Transformer Rectifier Unit;

BOM: Bill Of Materials;

CCM: Continuous Conduction Mode; CM: Common Mode; COT: Constant On Time; COTS: Commercial Off-The-Shelf;

DC: direct (current or voltage), or constant polarity (current or voltage); DCM: Discontinuous Conduction Mode; DCR: DC Resistance of an inductor; DM: Differential Mode; DSP: Digital Signal Processing/Processor;

EMC: electromagnetic compatibility; EMF: electromotive force; EMI: electromagnetic interference; ESR: Equivalent Series Resistance;

FCS: Frequency Control Signal;

GaN: Gallium nitride;

IGBT: Insulated-Gate Bipolar Transistor;

LDO: low-dropout regulator; LED: Light-Emitting Diode;

MATLAB: MATrix LABoratory (numerical computing environment and fourth-generation programming language developed by MathWorks); MEA: More Electric Aircraft; MOS: Metal-Oxide-Semiconductor; MOSFET: Metal Oxide Semiconductor Field-Effect Transistor; MTBF: Mean Time Between Failures;

NDL: Nonlinear Differential Limiter;

PF: Power Factor; PFC: Power Factor Correction; PoL: Point-of-Load; PSD: Power Spectral Density; PSM: Power Save Mode; PSRR: Power-Supply Rejection Ratio; PWM: Pulse-Width Modulator;

RFI: Radio Frequency Interference; RMS: Root Mean Square;

SCS: Switch Control Signal; SiC: Silicon carbide; SMPS: Switched-Mode Power Supply; SMVF: Switched-Mode Voltage Follower; SMVM: Switched-Mode Voltage Mirror; SNR: Signal to Noise Ratio; SCC: Switch Control Circuit;

THD: Total Harmonic Distortion; TRU: Transformer Rectifier Unit;

UAV: Unmanned Aerial Vehicle; ULISR: Ultra Linear Isolated Switching Rectifier; ULSR(U): Ultra Linear Switching Rectifier (Unit);

VN: Virtual Neutral; VRM: Voltage Regulator Module; ZVS: Zero Voltage Switching;

DETAILED DESCRIPTION

As required, detailed embodiments of the present invention are disclosed herein. However, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Moreover, except where otherwise expressly indicated, all numerical quantities in this description and in the claims are to be understood as modified by the word "about" in describing the broader scope of this invention. Practice within the numerical limits stated is generally preferred. Also, unless expressly stated to the contrary, the description of a group or class of materials as suitable or preferred for a given purpose in connection with the invention implies that mixtures or combinations of any two or more members of the group or class may be equally suitable or preferred.

The detailed description of the invention is organized as follows.

Section 1 ("Buck-boost 3-phase AC-to-DC converter") introduces the ULSR arrangement that may be viewed as a three-phase diode bridge with an integrated buck-boost converter, and Subsection 1.1 ("Basic operation, voltage and current relations, and the inductor value for the converter shown in FIG. 1") describes its basic operation and the relations between its parameters and component values.

Figure 6:
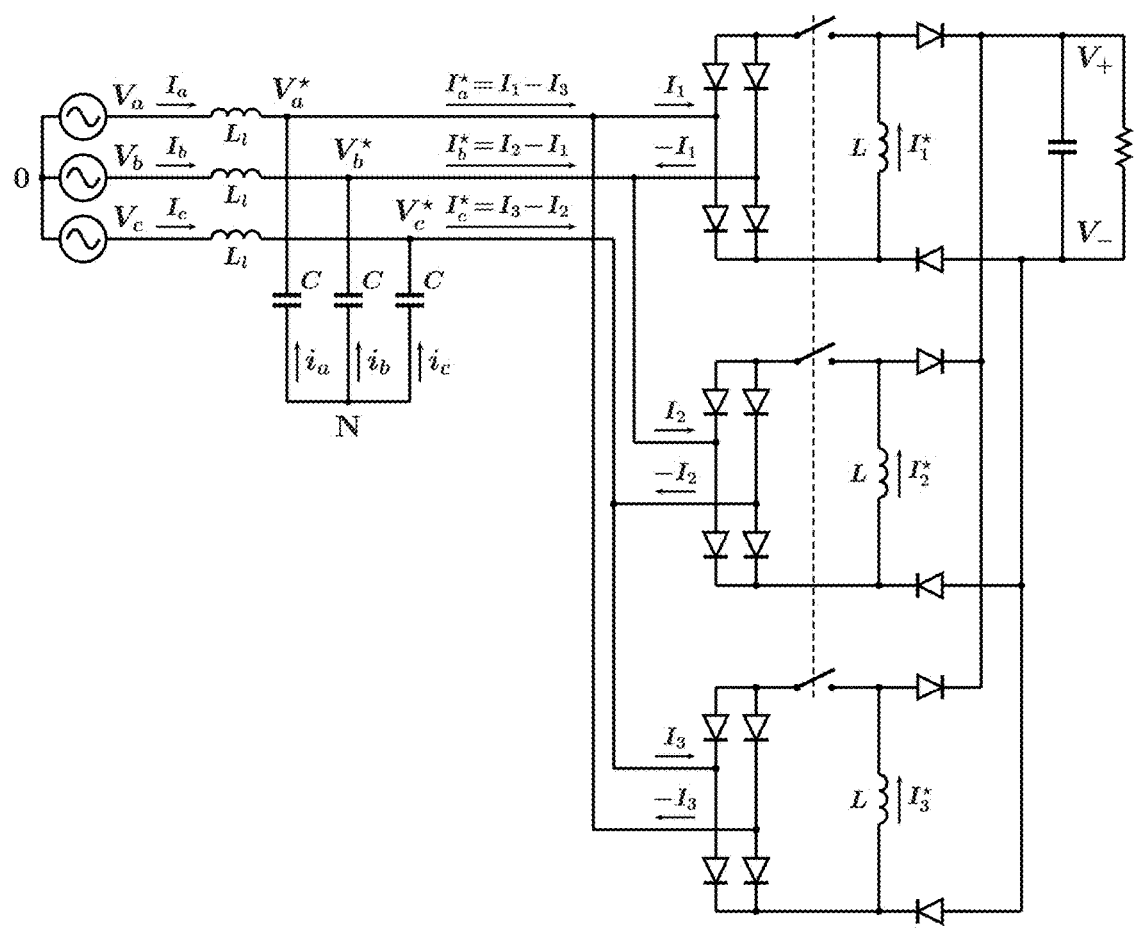
FIG. 6. 3-phase AC-to-DC converter shown in FIG. 1 with an LC filtering network inserted between the voltage sources and the power stage of the converter.

Section 2 ("Suppressing high-frequency component of line current") and its subsections 2.1 ("Virtual neutral capacitance for the converter shown in FIG. 6"), 2.2 ("Line inductance and power factor for the converter shown in FIG. 6"), 2.2.1 ("Preferred choice for line inductance for the converter shown in FIG. 6 to meet power factor specifications"), and 2.3 ("Additional line EMI filtering and damping") discuss the constraints that may be imposed on the values of the virtual neutral capacitors and the line inductors in an LC filtering network inserted between the voltage sources and the converter in order to suppress high-frequency components of the line currents.

Section 3 ("Regulating the output of a buck-boost 3-phase AC-to-DC converter") and its subsections 3.1 ("Factors affecting transient response"), 3.2 ("Further improving transient response by introducing a feedback signal indicative of the load current"), 3.3 ("Light-load behavior and transitions to and from zero load"), 3.4 ("Further reducing line current transients and output voltage "ringing" during large low-to-high load steps"), 3.5 ("Output EMI filtering"), and 3.6 ("Example of controller circuit implementation") describe the method and corresponding apparatus for providing a robust and stable regulated converter output voltage for full range of output power (i.e. from full load to open circuit), characterized by small in magnitude and duration voltage and current transients in response to load changes.

Section 4 ("Additional discussion of ULSR converter, its modifications, and properties") and its subsections Subsection 4.1 ("Scaling to different range of output powers"), 4.2 ("Limiting maximum voltages across switches"), 4.3 ("Operation under heavily unbalanced mains voltages and/or in case of mains failure"), 4.4 ("Parallel connections to increase power and/or to provide N+1 redundancy"), 4.5 ("Stepping output voltage up or down with autotransformer"), and 4.6 ("Boost 3-phase AC-to-DC converter") provide additional discussion of ULSR converters, their modifications, and properties.

Section 5 ("Isolated buck-boost 3-phase AC-to-DC converter") introduces an isolated buck-boost 3-phase AC-to-DC converter, referred to as an Ultra Linear Isolated Switching Rectifier, or ULISR.

Section 6 ("Mitigating the effects of parasitic capacitances of semiconductor components and of bridge voltage drops") and Subsection 6.1 ("Further reduction of THD in ULSR by introducing coupling among converter inductors") discuss mitigating the effects of parasitic capacitances of semiconductor components and of bridge voltage drops.

Finally, Section 7 provides a few additional comments on the current disclosure.

1 Buck-Boost 3-Phase AC-to-DC Converter

Let us first consider an idealized circuit diagram of a 3-phase AC/DC converter shown in FIG. 1. This arrangement may be viewed as a three-phase diode bridge with an integrated buck-boost converter. One should be able to see that this converter may also be viewed as consisting of three identical sections connected in parallel to a common load. In this example, the load is represented by a parallel RC circuit. Each section comprises 6 diodes (4 of which are connected in a bridge), an inductor (with inductance L), and a switch.

It may be assumed here and further that the switches in all three sections operate synchronously, i.e., they are "on" (closed) and/or "off" (open) at the same time, as indicated by the dashed line drawn through the actuators of the switches. Thus these three switches may be viewed as one triple-pole, single-throw switch.

The main idealization of this diagram would be in assuming that the AC voltage sources are effectively ideal (e.g., effectively zero line inductance), and in neglecting non-idealities of the components, such as their parasitic capacitances. As a result, we would assume zero current in the reverse-bias direction of the diodes, and zero current through open switches. The effects of non-idealities of the components would be addressed further in this disclosure.

One may see in FIG. 1 that a section of the converter comprises an inductor (a "converter inductor"), a diode bridge having two AC terminals and two DC terminals, a 1st output diode and a 2nd output diode, and an active switching device (a "switch"). The AC terminals of the bridge are also the input terminals of the section, and a 1st input voltage is applied to a 1st AC terminal, and a 2nd input voltage is applied to a 2nd AC terminal. The cathode of the 1st output diode is a positive output terminal of the section, and the anode of the 2nd output diode is a negative output terminal of the section.

One may further see in FIG. 1 that the anode of the 1st output diode is connected to a 1st terminal of the converter inductor, forming a 1st node, and that the cathode of the 2nd output diode is connected to a 2nd terminal of the converter inductor, forming a 2nd node.

Further, in FIG. 1 a 1st terminal of the switch is connected to a negative DC terminal of the diode bridge, a 2nd terminal of the switch is connected to the 1st node, and a positive DC terminal of the bridge is connected to the 2nd node. Also, an alternative switch connection may be used, wherein a 1st terminal of the switch is connected to a positive DC terminal of the diode bridge, a 2nd terminal of the switch is connected to the 2nd node, and a negative DC terminal of the bridge is connected to the 1st node.

One skilled in the art will recognize that diodes in the converter shown in FIG. 1 may be replaced with active semiconductor switches. For example, a diode bridge may be replaced by a synchronous MOSFET-based rectifying arrangement.

1.1 Basic Operation, Voltage and Current Relations, and the Inductor Value for the Converter Shown in FIG. 1

One should be able to see that the converter depicted in FIG. 1 is powered by three voltage sources providing the voltages $V_a$, $V_b$, and $V_c$, and connected in a "Y" configuration. Thus the voltages applied to the three sections of the converter would be equal to the differences $V_a-V_b$ (1st section), $V_b-V_c$ (2nd section), and $V_c-V_a$ (3rd section), respectively.

Let us assume that the switches operate at a fixed switching frequency and with a given duty cycle, so that the duration of a full switching interval is $\Delta T$=const, and the duration of the interval during which the switches are in the "on" position (allowing the current to flow through the switch) is $\Delta t_{on}$=const<$\Delta T$. Let us further assume that the converter operates in a discontinuous conduction mode (DCM), so that the inductor current in each section is zero at the beginning (and, therefore, at the end) of any switching interval.

Figure 2:
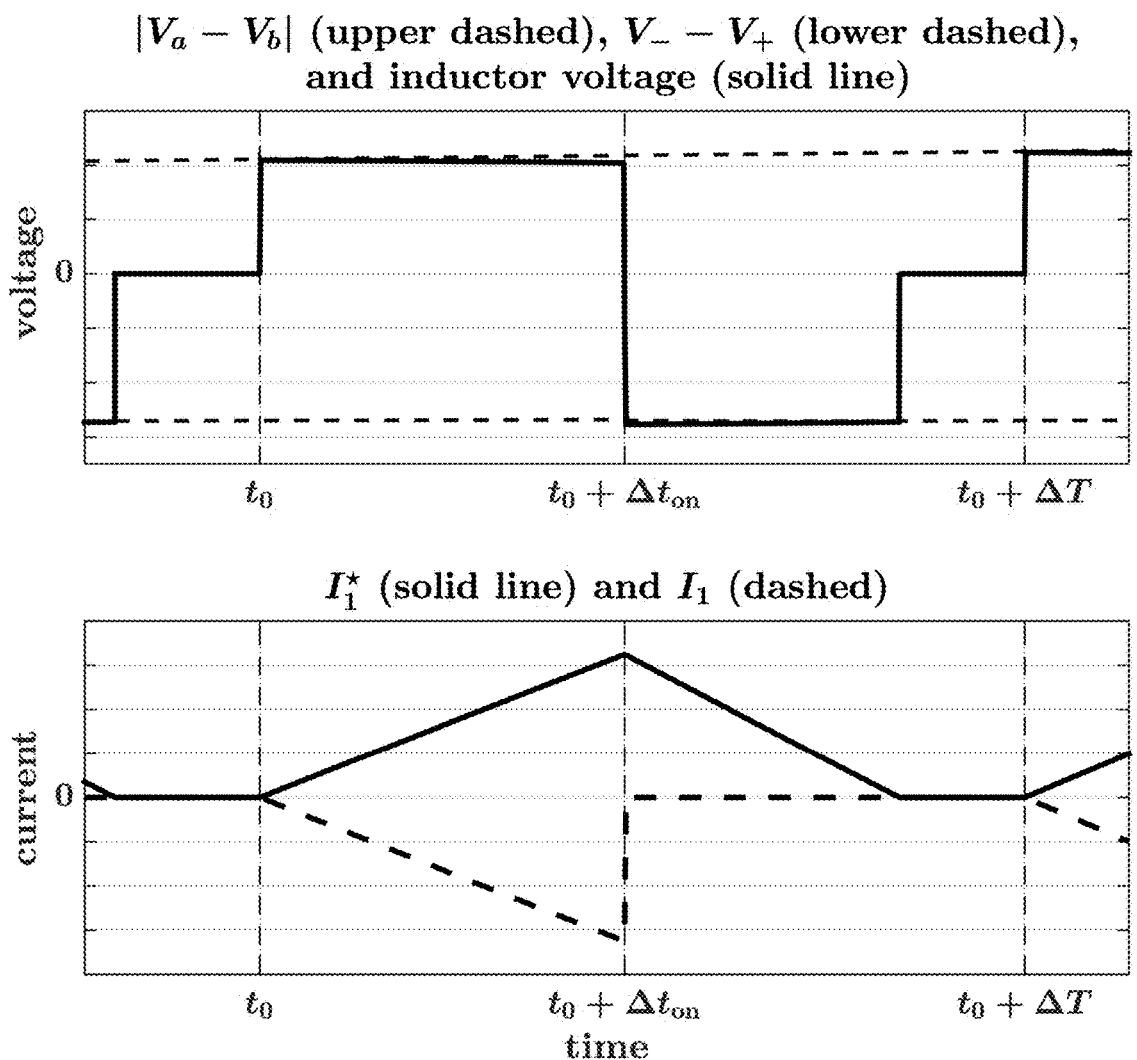
FIG. 2. Voltage and current relations during switching for the inductor in the 1st section.

Let us now examine the voltage and current relations during a switching interval for the inductor in the 1st section, as illustrated in FIG. 2. One should be able to see from FIG. 1 that, ignoring the voltage drops across the diodes and the switch, during the "on" time the voltage across the inductor would be equal to the absolute value of the voltage applied to the section, i.e., to $|V_a-V_b|$ causing the inductor current to increase. Also, the inductor current during the "on" time would be equal to the absolute value of the current supplied to the section, $|I_1|$. During the initial phase of the switch "off" time, the inductor current would forward bias the "output" diodes, and the voltage across the inductor would be equal (ignoring the diodes' forward voltage drop) to the output voltage difference $V_--V_+$, causing the inductor current to decrease. Since the converter operates in a DCM, at the final phase of the switch "off" time both the inductor current and the voltage across the inductor would be equal to zero. Also, the current $I_1$ supplied to the section would be equal to zero during the entire switch "off" interval.

With the above, the average value $\langle I_1 \rangle$ of the current $I_1$ supplied to the 1st section during a full switching interval starting at $t_0$ may be expressed as $$\langle I_1 \rangle = \frac{1}{\Delta T} \int_{t_0}^{t_0+\Delta t_{on}} dt\, I_1(t) = \frac{\Delta t_{on}^2}{2L\Delta T} \overline{V}_{ab} \propto \overline{V}_{ab}, \quad (1)$$

where $\overline{V}_{ab}$ is the voltage $V_a(t)-V_b(t)$ evaluated at some instance within the "on" position of the switch. For example, if the switch is turned on at time $t_0$, then $\overline{V}_{ab}=V_a(\tilde{t})-V_b(\tilde{t})$, where $\tilde{t}$ is such that $t_0 \leq \tilde{t} \leq t_0+\Delta t_{on}$.

One may see from equation (1) that for a sufficiently small $\Delta t_{on}$ the average values over a full switching interval of the supply current and the supply voltage would be proportional to each other.

Let us now consider the converter shown in FIG. 1 wherein the voltage sources supply balanced 3-phase voltages with the AC frequency $f_{AC}=T_0^{-1}$. For the initial simplicity of the subsequent discussion, let us also assume that the switching frequency $f_{sw}=\Delta T^{-1}$ is such that $f_{sw}$=6N $f_{AC}$, where N is an integer. Then, from the symmetries that should be apparent in FIG. 1, the following relations among the currents and voltages would hold (with practical accuracy limited by non-idealities):

$$V_b(t)=V_a(t-T_0/3),$$

$$V_c(t)=V_a(t-2T_0/3),$$

$$V_a(t)+V_b(t)+V_c(t)=0, \quad (2)$$

$$I_b(t)=I_a(t-T_0/3),$$

$$I_c(t)=I_a(t-2T_0/3),$$

$$I_a(t)+I_b(t)+I_c(t)=0 \quad (3)$$

$$I_2(t)=I_1(t-T_0/3),$$

$$I_3(t)=I_1(t-2T_0/3),$$

$$I_1(t)+I_2(t)+I_3(t)=0, \quad (4)$$

and $$I_2^*(t)=I_1^*(t-T_0/3),$$

$$I_3^*(t)=I_1^*(t-2T_0/3). \quad (5)$$

From equation (1) it would follow that $$I_1(t)=G[V_a(t)-V_b(t)]+\Delta I_1(t), \quad (6)$$

where G is a constant (with physical units of conductance) and $\Delta I_1(t)$ is a zero-mean current with the main frequency content consisting of the harmonics of the switching frequency±the AC frequency. Similarly, $$I_3(t)=G[V_c(t)-V_a(t)]+\Delta I_3(t) \quad (7)$$

Since from equation (2) it follows that $V_a-V_b-(V_c-V_a)=3V_a$, the line current $I_a(t)$ may be expressed as $$I_a(t)=I_1(t)-I_3(t)=3GV_a(t)+\Delta I_a(t), \quad (8)$$

where $\Delta I_a(t)$ is a zero-mean current with the main frequency content consisting of the harmonics of the switching frequency±the AC frequency.

Likewise, $$I_b(t)=I_2(t)-I_1(t)=3GV_b(t)+\Delta I_b(t), \quad (9)$$

and $$I_c(t)=I_3(t)-I_2(t)=3G\,V_c(t)+\Delta I_c(t). \quad (10)$$

One should be able to see from equations (8), (9), and (10) that, ignoring the frequency content with frequencies at $f_{sw}-f_{AC}$ and above, the line currents in the converter shown in FIG. 1 would be proportional to the respective line voltages.

Figure 3:
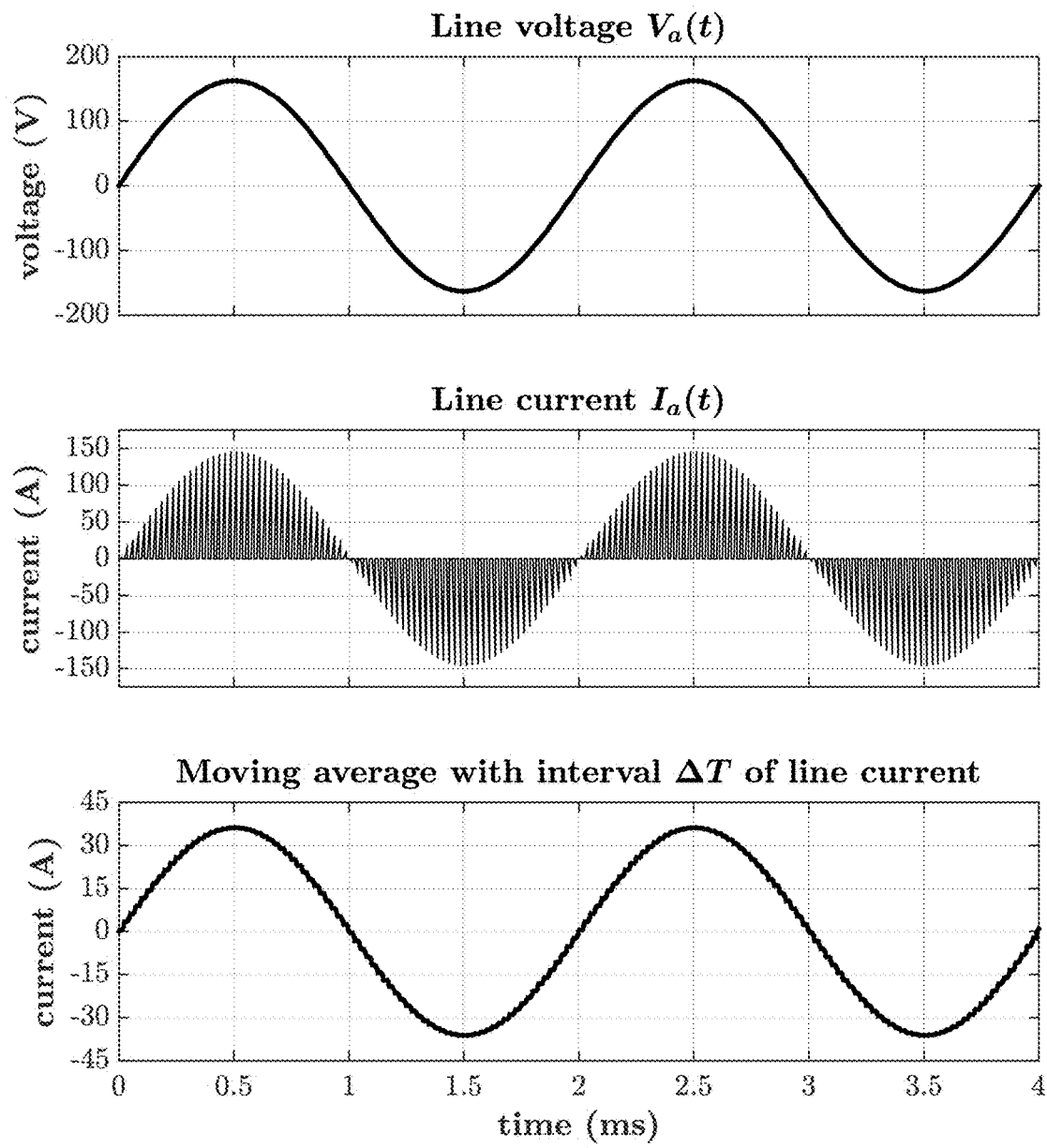
FIG. 3. Line voltage (upper panel), line current (middle panel), and moving average of line current (lower panel) for the converter shown in FIG. 1.

This is illustrated in FIG. 3 for the line voltage $V_a(t)$ and the respective line current $I_a(t)$ for the converter shown in FIG. 1 with the following values: The line frequency is $f_{AC}=500$ Hz, the switching frequency is $f_{sw}=78f_{AC}=39$ kHz, the conductance of the load is $G_{load}=R_{load}^{-1}=(9\Omega)^{-1}$, the output voltage is $V_{out}=V_+-V_{31}=270$ V (the output power is $P_{out}=8.1$ kW), the RMS of the line-to-neutral voltage is $V_{LN}=115$ V, and the inductance is $L=39$ μH.

One skilled in the art will recognize that equations (3), (4), and (5) may not generally hold for the instantaneous current values if $f_{sw} \ne 6N\,f_{AC}$. However, one will also recognize that these equations may still adequately represent the current relations for the current values averaged over a full switching interval, provided that the switching frequency is sufficiently high, e.g., $f_{sw} \gtrsim 100\,f_{AC}$. Thus equations (8), (9), and (10) would still hold, and, ignoring the frequency content with frequencies at $f_{sw}-f_{AC}$ and above, the line currents in the converter shown in FIG. 1 would still be proportional to the respective line voltages.

Figure 4:
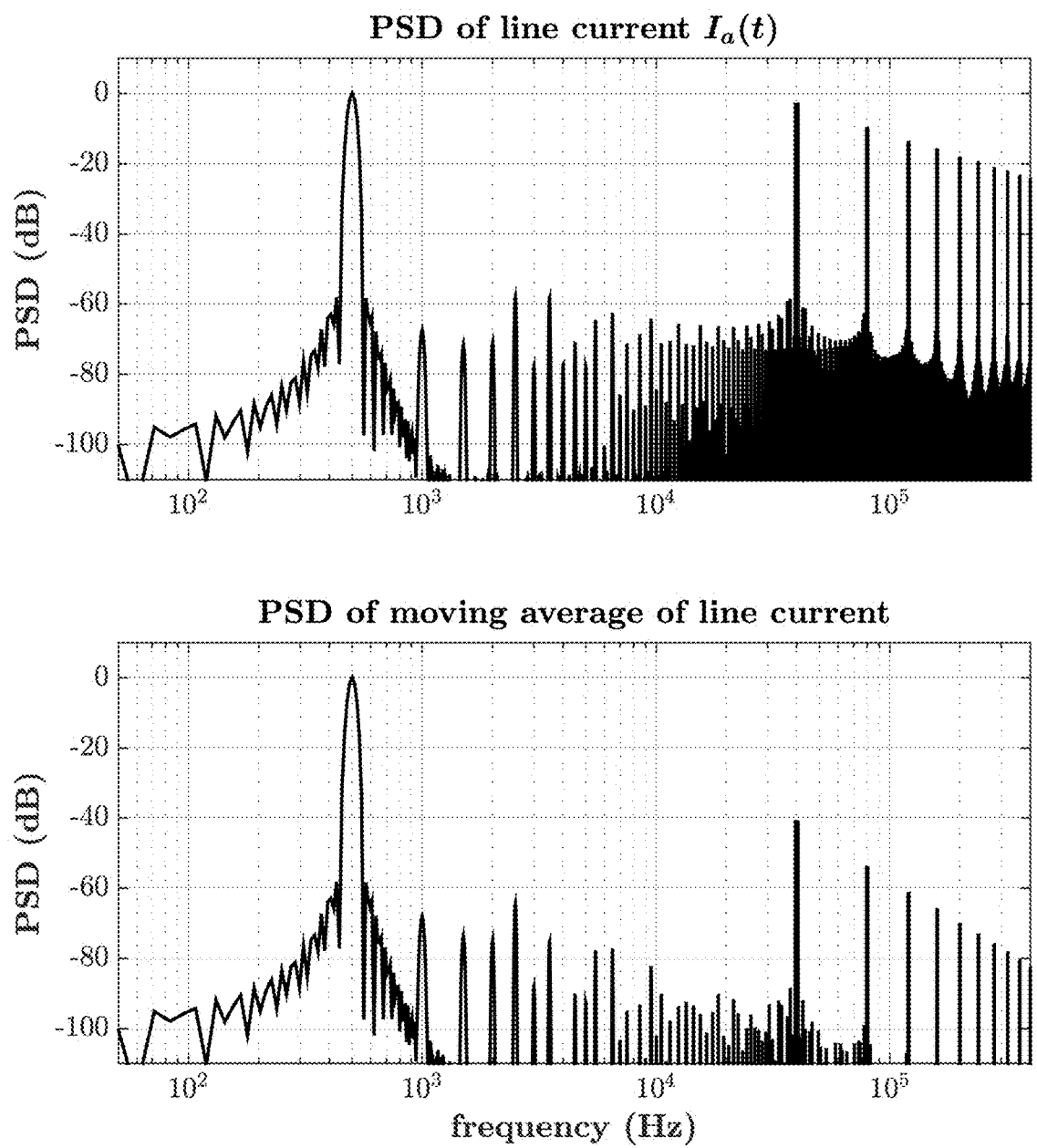
FIG. 4. PSDs of line current (upper panel) and of moving average of line current (lower panel) for the converter shown in FIG. 1.

This is illustrated in FIG. 4 for the converter shown in FIG. 1 with the following values: The line frequency is $f_{AC}=500$ Hz, the switching frequency is $f_{sw}=80f_{AC}=40$ kHz, the conductance of the load is $G_{load}=R_{load}^{-1}=(9\Omega)^{-1}$, the output voltage is $V_{out}=V_+-V_-=270$V (the output power is $P_{out}=8.1$ kW), the RMS of the line-to-neutral voltage is $V_{LN}=115$ V, and the inductance is $L=39$ μH.

One skilled in the art will recognize that if the product of the resistance and the capacitance of the load is sufficiently large so that the voltage $V_+-V_-$ across the load may be considered constant, then the conductance G may be expressed as $$G = \frac{1}{3}\frac{(V_+ - V_-)^2}{V_a^2 + V_b^2 + V_c^2}G_{load} = \frac{1}{9}\frac{V_{out}^2}{V_{LN}^2}G_{load} = \frac{1}{9}\frac{P_{out}}{V_{LN}^2}, \quad (11)$$

where $V_{out}=V_+-V_-$, $G_{load}=R_{load}^{-1}$ is the conductance of the load, $V_{LN}$ is the RMS of the line-to-neutral voltage, and $P_{out}$ is the output power.

The voltage conversion ratio $V_{out}/V_{LN}=3\sqrt{6}/\pi \approx 2.34$ may be of a particular interest, as it would correspond to the conversion ratio of a three-phase full-wave diode rectifier. For this ratio, $G^{-1}=\pi^2 R_{load}/6 \approx 5R_{load}/3$.

The maximum duty cycle $D_{max}'$ for which the converter shown in FIG. 1 would always operate in a DCM may be expressed as follows:

$$D_{max}' = \frac{\max(\Delta t_{on})}{\Delta T} = \frac{1}{1+\frac{\max(V_a - V_b)}{V_{out}}} = \frac{1}{1+\sqrt{6}\frac{V_{LN}}{V_{out}}}. \quad (12)$$

For example, $D_{max}'=1/(1+\pi/3) \approx \frac{1}{2}$ for $V_{out}/V_{LN}=3\sqrt{6}/\pi$ (e.g., for $V_{LN}=115$V and $V_{out}=270$ V).

When operating at $D_{max}'$, the conductance G would have the maximum value $G_{max}$, $$G_{max} = \frac{1}{9}\frac{V_{out}^2}{V_{LN}^2}\max(G_{load}) = \frac{1}{9}\frac{P_{max}}{V_{LN}^2}, \quad (13)$$

where $P_{max}$ is the maximum output power of the converter. Thus the maximum value of the inductance $L_{max}=\max(L)$ for which the converter shown in FIG. 1 would always operate in a DCM may be expressed as follows:

$$L_{max} = \frac{9D_{max}'^2 V_{LN}^2 \Delta T}{2P_{max}} = \frac{3V_{out}^2}{4f_{sw}P_{max}\left(1+\frac{V_{out}}{V_{LN}\sqrt{6}}\right)^2}. \quad (14)$$

For example, $L_{max} \approx 44$ μH for $V_{LN}=115$ V, $V_{out}=270$ V, $P_{max}=8.1$ kW, and $\Delta T=25$ μs ($f_{sw}=40$ kHz).

However, if the line voltage is reduced to $V_{LN}=90$ V, $L_{max} \approx 34$ μH to ensure a DCM operation for the same maximum output power.

Figure 5:
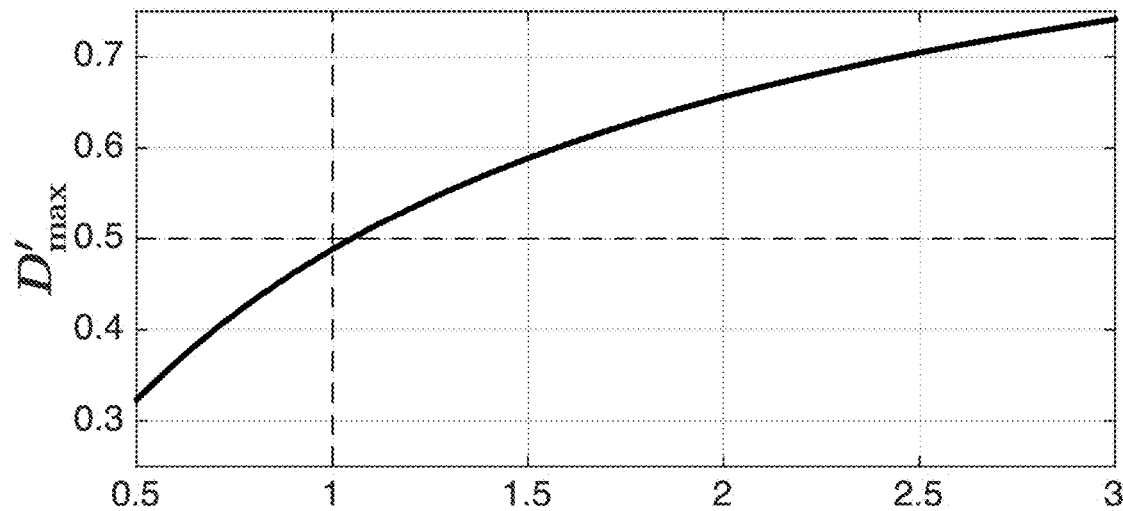
FIG. 5. Maximum duty cycle $D_{max}'$ (upper panel) and maximum value of the converter inductance $L_{max}$ (lower panel) according to equations (12) and (14), respectively, as functions of the voltage conversion ratio $V_{out}/V_{LN}$.
Figure 5:
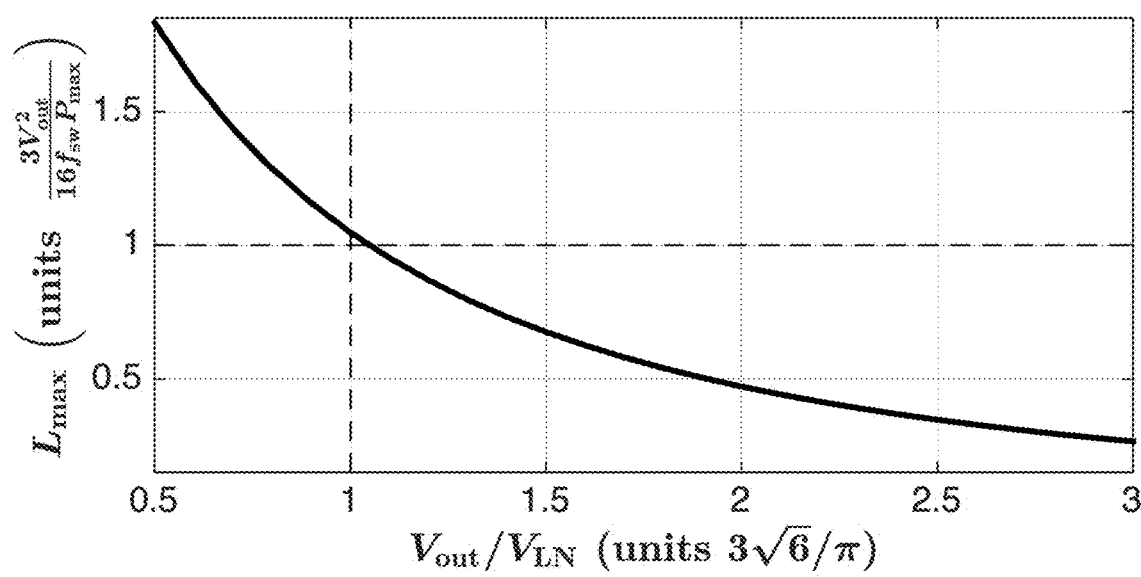

FIG. 5 plots the maximum duty cycle $D_{max}'$ (upper panel) and the maximum value of the converter inductance $L_{max}$ (lower panel) according to equations (12) and (14), respectively, as functions of the voltage conversion ratio $V_{out}/V_{LN}$.

In a design of a practical converter for given $f_{sw}$, $V_{out}$, and $P_{max}$, and operable at a minimum line voltage $\min(V_{LN})$, the inductance value for the converter inductor may be chosen as $$L = \frac{3V_{out}^2}{4f_{sw}P_{max}\left(1+\frac{V_{out}}{\min(V_{LN})\sqrt{6}}\right)^2} \le L_{max}. \quad (15)$$

Then the "actual" maximum duty cycle $D_{max}$ of the converter (while operating at maximum power and at minimum line voltage) may be expressed as $$D_{max} = \frac{\sqrt{2Lf_{sw}P_{max}}}{3\min(V_{LN})} \le D_{max}'. \quad (16)$$

2 Suppressing High-Frequency Component of Line Current

To suppress the high-frequency component of the line current, let us insert an LC filtering network between the voltage sources and the converter, as shown in FIG. 6. For convenience, let us refer to an inductor $L_l$ as a "line inductor", to an inductor L as a "converter inductor", and to a capacitor C as a "virtual neutral capacitor", or "VN capacitor".

Depending on the converter specifications (e.g., voltage conversion and power rating, and the switching frequency) and the converter inductance, the values for the line inductors and the virtual neutral capacitors would need to be chosen in a proper way to ensure high power factor and efficiency, and low harmonic distortions of the line current.

The constraints that may be imposed on the values of the virtual neutral capacitors and the line inductors are discussed in this section.

2.1 Virtual Neutral Capacitance for the Converter Shown in FIG. 6

Let us first assume that the line inductance $L_l$ is sufficiently large so that the line currents $I_a$, $I_b$, and/or $I_c$ may be considered constant during a switching interval. It may be then shown that a sufficient (albeit not necessary) condition for the current through a converter inductor to be an increasing function of time during an "on" position of the switch (i.e., during any $\Delta t_{on}$ interval) may be expressed as $$D_{max}\Delta T \leq \frac{1}{4} 2\pi \sqrt{L\frac{C}{2}}, \quad (17)$$

leading to $$C \geq \frac{8}{\pi^2} \frac{D_{max}^2 \Delta T^2}{L}. \quad (18)$$

Then the minimum value of the VN capacitance $C_{min}$ that ensures an increasing current through a converter inductor during any $\Delta t_{on}$ interval may be expressed as $$C_{min} = \frac{16}{9\pi^2} \frac{P_{max}}{f_{sw} \min(V_{LN})^2}. \quad (19)$$

For example, $C_{min} \approx 3.6$ μF for $P_{max}=8.1$ kW, $\min(V_{LN})=100$ V, and $\Delta T=25$ μs (40 kHz switching).

One should be able to see from equations (14) and (19) that, for given voltage and current specifications, both $L_{max}$ and $C_{min}$ are inversely proportional to the switching frequency $f_{sw}=\Delta T^{-1}$.

Figure 7:
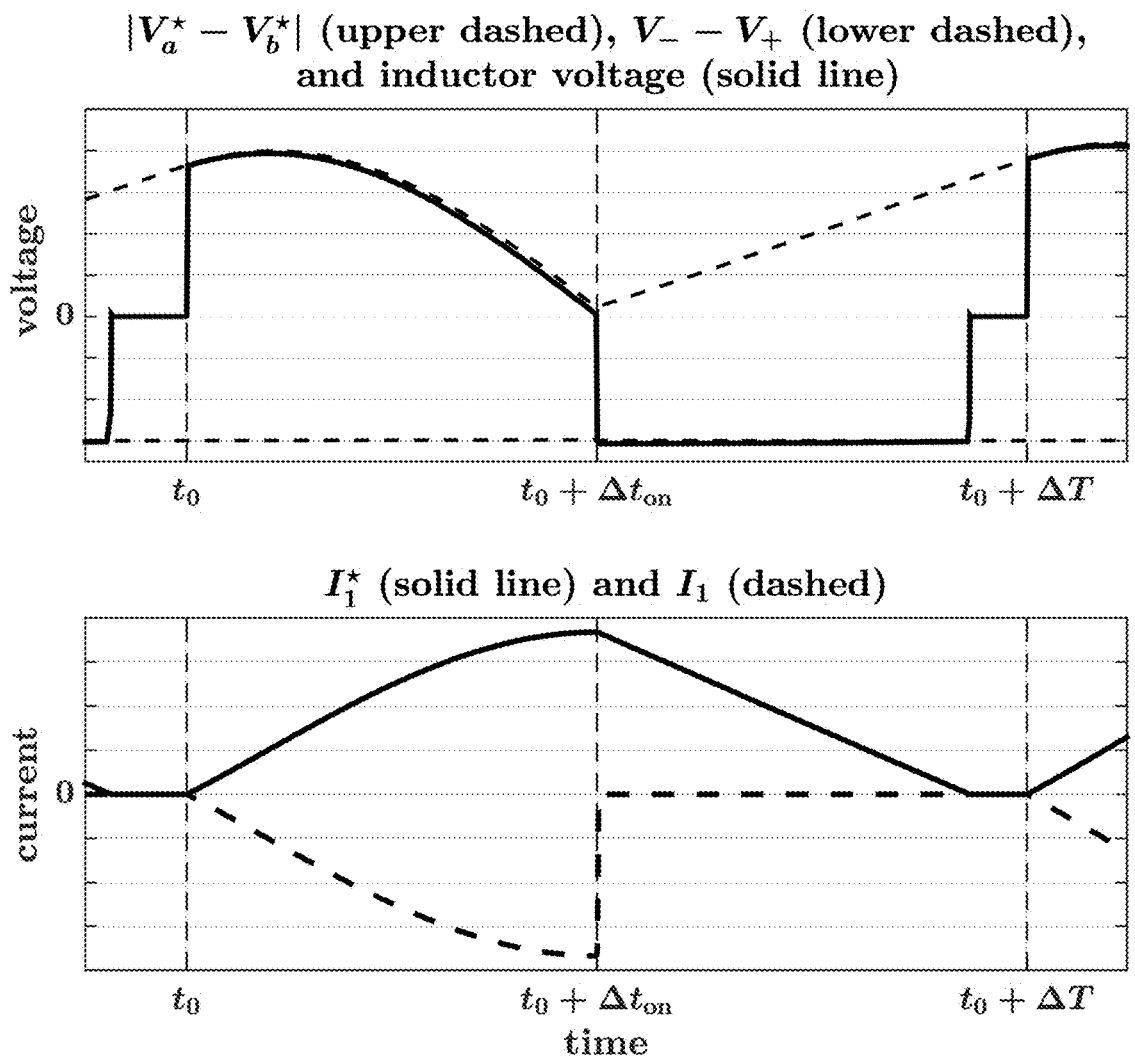
FIG. 7. Example of voltage and current relations during switching for the inductor in the 1st section of the converter shown in FIG. 6 with $C \approx C_{min}$ ($V_{LN} = \min(V_{LN})$).

FIG. 7 provides an example of voltage and current relations during switching for the inductor in the 1st section of the converter shown in FIG. 6 with $C \approx C_{min}$ ($V_{LN}$=min ($V_{LN}$)). One may see in this figure that at the end of a $\Delta t_{on}$ interval the inductor voltage approaches zero, and the rate of increase in the inductor current becomes small (close to zero).

Figure 8:
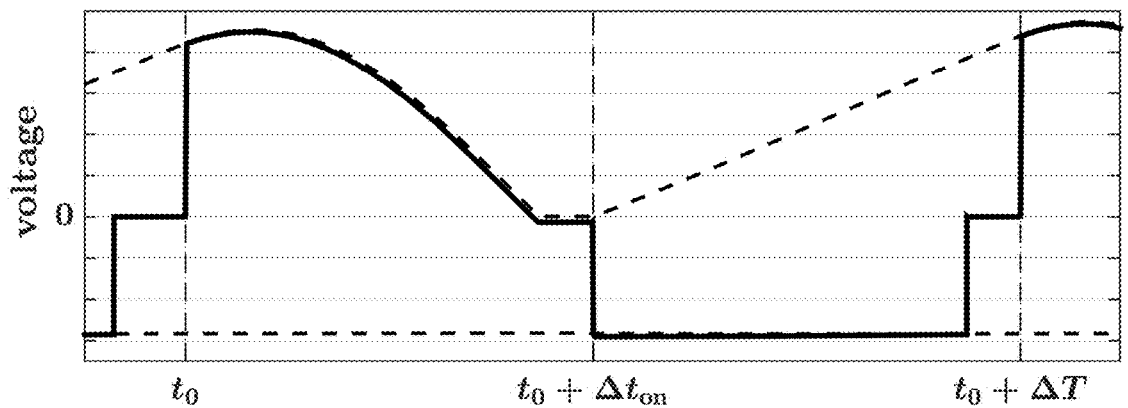
FIG. 8. Example of voltage and current relations during switching for the inductor in the 1st section of the converter shown in FIG. 6 with $C \approx \frac{3}{4} C_{min}$ ($V_{LN} = \min(V_{LN})$).
Figure 8:
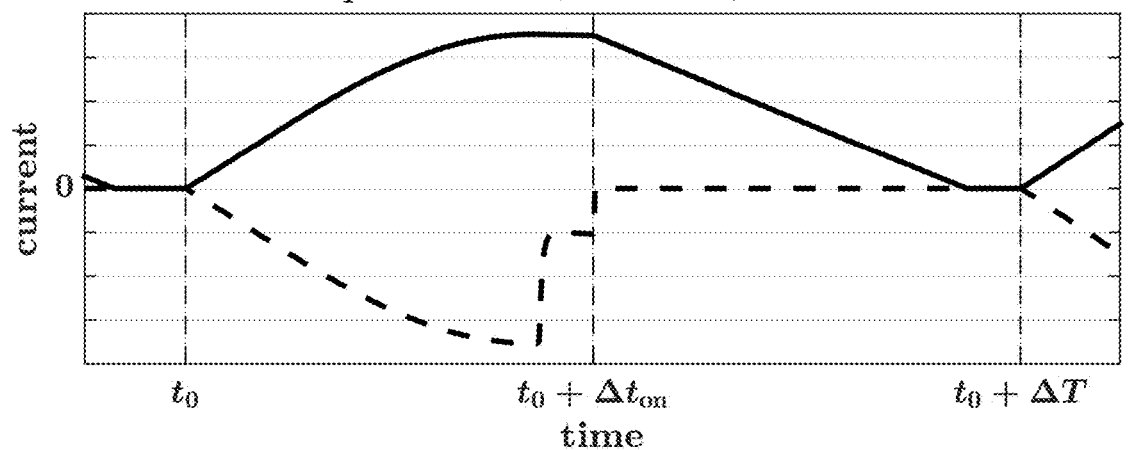

FIG. 8 provides an example of voltage and current relations during switching for the inductor in the 1st section of the converter shown in FIG. 6 with $C \approx \frac{3}{4} C_{min}$ ($V_{LN}$=min ($V_{LN}$)). One may see in this figure that the inductor voltage approaches zero, and that the rate of change in the inductor current becomes effectively zero before the end of a $\Delta t_{on}$ interval. Thus an increase (and/or a small decrease) in the duty cycle would not result in a change in the output current, and thus the output may no longer be regulated.

Figure 9:
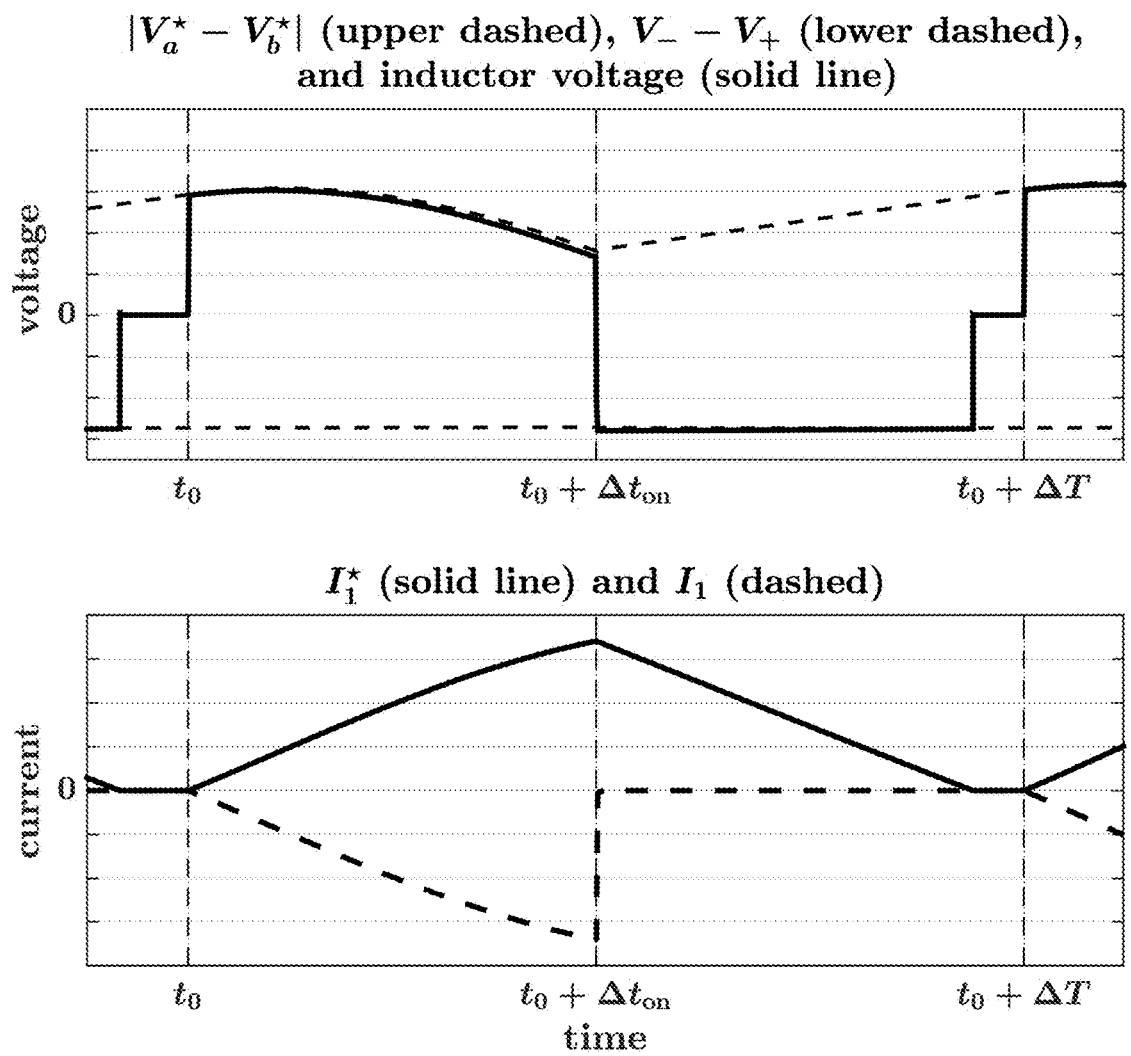
FIG. 9. Example of voltage and current relations during switching for the inductor in the 1st section of the converter shown in FIG. 6 with $C \approx 2 C_{min}$ ($V_{LN} = \min(V_{LN})$).

FIG. 9 provides an example of voltage and current relations during switching for the inductor in the 1st section of the converter shown in FIG. 6 with $C \approx 2C_{min}$ ($V_{LN}$=min ($V_{LN}$)). One may see in this figure that the variation in the voltage $|V_a^* - V_b^*|$ is reduced, and that the current in the converter inductor remains approximately linear during a $\Delta t_{on}$ interval.

One should be able to see from the examples of FIGS. 7 through 9 that the value of the VN capacitance $C \approx 2C_{min}$ provides approximately linearly increasing current in the converter inductor during a $\Delta t_{on}$ interval. Also, while with $C \leq C_{min}$ the switch is turned "off" at zero or small voltage (e.g., ZVS switch off-time), and thus switching losses may be reduced, such smaller VN capacitance values may result in relatively larger average currents in the bridge diodes and the switches, and thus in lower overall converter efficiency.

2.2 Line Inductance and Power Factor for the Converter Shown in FIG. 6

Clearly, inserting an LC filtering network between the voltage sources and the converter would affect the converter power factor (PF), which for a given converter would now be a function of both the line frequency $f_{AC}$ and the output power $P_{out}$ (or conductance of the load $C_{load}$). Thus both the value of the VN capacitance C and the value of the line inductance $L_l$ need to be properly chosen to ensure a high power factor in full range of the line frequencies and in a desired range of the output powers, while remaining as small as possible for smaller weight, size, and cost.

While the VN capacitance C may be chosen in a relatively simple way as $C_{min} < C \leq 2C_{min}$, this section provides a discussion and some guidelines for choosing the value of the line inductance $L_l$ based on certain design requirements for the power factor. One skilled in the art will recognize that there may be a variety of alternative approaches to choosing this value.

In reference to FIG. 6, various current and voltage relations may be expressed as $$I_a(t) = I_a^*(t) - i_a(t) = \frac{1}{L_l} \int dt[V_a(t) - V_a^*(t)], \quad (20)$$

$$i_a(t) = -C\dot{V}_a^*(t), \quad (21)$$

$$V_a^*(t) = \overline{V}_a^*(t) + \Delta V_a^*(t), \text{ and} \quad (22)$$

$$I_a(t) = \overline{I}_a(t) + \Delta I_a(t), \quad (23)$$

where the overbar may be viewed to denote a centered moving average with interval $\Delta T$, and $\Delta$ (as in $\Delta V_a^*(t)$ and/or $\Delta I_a(t)$) a residual high-frequency component.

Further, from the previous discussion, the current $I_a^*(t)$ may be expressed as $$I_a^*(t) = 3G^*\overline{V}^{a*}(t) + \Delta I_a^*(t), \quad (24)$$

where $G^*$ is a constant with physical units of conductance, and $\Delta I_a^*(t)$ is a zero-mean current with the main frequency content consisting of the harmonics of the switching frequency±the AC frequency.

Since the switching frequency is much larger than the line frequency (e.g., $f_{sw} \geq 100\, f_{AC}$), one skilled in the art will recognize that from equations (20) through (24) it would follow that $$\overline{V}_a^*(t) = V_a(t) - 3L_l G^* \overline{\dot{V}}_a^*(t) - L_l C \overline{\ddot{V}}_a^*(t) \quad (25)$$

and $$\overline{I}_a(t) = 3G^* \overline{V}_a^*(t) + C\overline{\dot{V}}_a^*(t) \quad (26)$$

One skilled in the art will further recognize that, according to equation (25), $V_a^*(t)$ may be viewed as the line voltage $V_a(t)$ filtered with a 2nd order lowpass filter with the undamped natural frequency $\omega_0$ and the quality factor Q that may be expressed as $$\omega_0 = \frac{1}{\sqrt{L_l C}} \text{ and } Q = \frac{1}{3G^\star}\sqrt{\frac{C}{L_l}}, \quad (27)$$

respectively. If $V_a(t)=V_0 \sin(2\pi f_{AC} t)$, then, for a sufficiently large $\omega_0$ (e.g., for $\omega_0^2 \gg 4\pi^2 f_{AC}^2$), $\overline{V}_a^*(t)$ may be expressed as $\overline{V}_a^*(t)=V_0 \sin(2\pi f_{AC} t-\varphi)$, where $$\tan(\varphi) \approx 6\pi L_l G^\star f_{AC}. \quad (28)$$

Assuming that $G^*$ is of the same order of magnitude as $G$ (which would be typically true), and using equation (11), equation (28) may be rewritten as $$\tan(\varphi) \approx \frac{2\pi}{3} L_l \frac{P_{out}}{V_{LN}^2} f_{AC}. \quad (29)$$

For example, for $P_{out}=8.1$ kW, $V_{LN}=115$ V, and $f_{AC}=1$ kHz, $\tan(\varphi) \approx 1.28 \times 10^3$ Hz$\Omega^{-1}$ $L_l$.

Further, from equation (26), $$\bar{I}_a(t) = 3G^\star V_0 \left[\sin(2\pi f_{AC}t - \varphi) + \frac{2\pi}{3} f_{AC} \frac{C}{G^\star} \cos(2\pi f_{AC}t - \varphi)\right] \quad (30)$$
$$= 3G^\star V_0 \cos(\varphi)[b\sin(2\pi f_{AC}t) + \alpha' \cos(2\pi f_{AC}t)], \text{ where}$$

$$\alpha' = \frac{2\pi}{3} f_{AC} \frac{C}{G^\star} - \tan(\varphi) = 2\pi f_{AC}\left(\frac{C}{3G^\star} - 3G^\star L_l\right), \text{ and} \quad (31)$$

$$b = 1 + (2\pi f_{AC})^2 L_l C. \quad (32)$$

Then the power factor may be expressed as $$PF = \frac{\langle \bar{I}_a V_a \rangle}{\langle \bar{I}_a^2 \rangle^{\frac{1}{2}} \langle V_a^2 \rangle^{\frac{1}{2}}} = \frac{1}{\sqrt{1+\left(\frac{\alpha'}{b}\right)^2}} = \frac{1}{\sqrt{1+\alpha^2}}, \quad (33)$$

where the angular brackets denote time averaging over a large time interval, and where $$\alpha = \frac{2\pi f_{AC}}{1 + (2\pi f_{AC})^2 L_l C}\left(\frac{C}{3G^\star} - 3G^\star L_l\right). \quad (34)$$

One may further note that $\alpha \approx \alpha'$ for $\omega_0^2 \gg 4\pi^2 f_{AC}^2$.

Let us now choose the converter inductance as $L=L_{max}$ according to equation (14), and the VN capacitance as $C=\gamma C_{min}$, $$C = \gamma C_{min} = \gamma \frac{16}{9\pi^2} \frac{P_{max}}{f_{sw} V_{LN}^2}, \quad (35)$$

where $\gamma>1$ is a parameter that would be typically not much larger than unity (e.g., $\gamma=2$).

Let us further choose the line inductance as $L_l = \kappa L_0$, where $$L_0 = \frac{1}{4\pi^2 C \max(f_{AC})^2}, \quad (36)$$

and where $\kappa \ll 1$.

Assuming that the conductance $G^*$ may be expressed as $$G^\star = \frac{1}{9} \frac{P_{out}}{V_{LN}^2}, \quad (37)$$

and that the output power $P_{out}$ is expressed as a fraction of the maximum power $P_{max}$ (i.e., $P_{out}=\beta P_{max}$, where $0<\beta \leq 1$), substitution of equations (35) through (37) into equation (34) would lead to the following expression for $\alpha$ as a function of the output power:

$$\alpha = \alpha(\beta; \gamma, f_{AC}, \kappa) = \frac{32\gamma f_{AC}}{3\pi \beta f_{sw}}\left[1 - \kappa\left(\frac{3\pi \beta f_{sw}}{32\gamma \max(f_{AC})}\right)^2\right] \quad (38)$$
$$\approx \frac{3.4\gamma f_{AC}}{\beta f_{sw}}\left[1 - \kappa\left(\frac{\beta f_{sw}}{3.4\gamma \max(f_{AC})}\right)^2\right],$$

where $0<\beta \leq 1$, $\gamma>1$, and $\kappa \ll 1$.

A possible choice for the parameter $\kappa$ would be to ensure a unity power factor at some specified load $P_{out}=\beta_0 P_{max}$. With this, $$\kappa = \left(\frac{32\gamma \max(f_{AC})}{3\pi \beta_0 f_{sw}}\right)^2 \approx \left(\frac{3.4\gamma \max(f_{AC})}{\beta_0 f_{sw}}\right)^2, \quad (39)$$

and equation (38) would become $$\alpha = \alpha(\beta; \gamma, f_{AC}, \beta_0) \approx \frac{3.4\gamma f_{AC}}{\beta f_{sw}}\left[1 - \left(\frac{\beta}{\beta_0}\right)^2\right]. \quad (40)$$

With $\kappa$ given by equation (39), the line inductance $L_l$ may be expressed as $$L_l = \gamma\left(\frac{4}{\pi \beta_0}\right)^2 \frac{V_{LN}^2}{P_{max} f_{sw}}. \quad (41)$$

For example, $L_l \approx 110$ µH for $P_{max}=8.1$ kW, $V_{LN}=115$ V, $f_{sw}=48$ kHz, $\gamma=2$, and $\beta_0=1$ (i.e., PF=1 at maximum load).

Another attractive choice for $\kappa$ would be $$\kappa = \frac{\max(f_{AC})}{f_{sw}}, \quad (42)$$

and thus the resonant frequency of the $L_l C$ circuit is the geometric mean of the switching frequency and the maximum line frequency, $$\frac{1}{2\pi \sqrt{L_l C}} = \sqrt{f_{sw} \max(f_{AC})}. \quad (43)$$

With $f_{sw} \gg \max(f_{AC})$, this choice would ensure that both conditions $\kappa \ll 1$ and $\omega_0^2 \gg 4\pi^2 f_{AC}^2$ are met.

If the VN capacitance is given by equation (35), $\kappa$ according to equation (42) would lead to the value for the line inductance as $$L_l = \frac{9}{64\gamma} \frac{V_{LN}^2}{P_{max}\max(f_{AC})}, \quad (44)$$

which is independent of the switching frequency. For example, $L_l \approx 144$ μH for $P_{max}=8.1$ kW, $V_{LN}=115$ V, $\gamma=2$, and $\max(f_{AC})=800$ Hz.

We then may write the following expression for α as a function of the output power:

$$\alpha = \alpha(\beta; \gamma, f_{AC}) \approx \frac{3.4\gamma f_{AC}}{\beta f_{sw}} \left[1 - \left(\frac{\beta}{3.4\gamma}\right)^2 \frac{f_{sw}}{\max(f_{AC})}\right]. \quad (45)$$

Let us examine the values of α, and the respective power factor values, for different output powers.

For full output power (β=1), $$|\alpha(1; \gamma, f_{AC})| \approx \frac{3.4\gamma f_{AC}}{f_{sw}} \left|\left(\frac{1}{3.4\gamma}\right)^2 \frac{f_{sw}}{\max(f_{AC})} - 1\right| < \quad (46)$$

$$\frac{f_{AC}}{3.4\gamma\max(f_{AC})} < \frac{1}{3.4\gamma},$$

provided that the switching frequency is sufficiently high, i.e., $f_{sw} \geq (3.4\gamma)^2 \max(f_{AC})$. Then $$PF(1; \gamma, f_{AC}) \approx 1 - \frac{1}{2}|\alpha(1; \gamma, f_{AC})|^2 > \quad (47)$$

$$1 - \left(\frac{f_{AC}}{4.8\gamma\max(f_{AC})}\right)^2 > 1 - \frac{1}{(4.8\gamma)^2}.$$

For example, for γ=2 the minimum power factor at full output power would be >98.9% in full range of line frequencies.

One should note that the minimum power factor given by equation (47) would be achieved in the limit of high switching frequencies, e.g., for $f_{sw} >> (3.4\gamma)^2 \max(f_{AC})$, and that the full-load power factor would be generally higher for lower switching frequencies, e.g., for $f_{sw} \gtrsim (3.4\gamma)^2 \max(f_{AC})$. For example, for γ=2 and $\max(f_{AC})=800$ Hz, $(3.4\gamma)^2 \max(f_{AC})=37$ kHz, and for the switching frequency $f_{sw}=48$ kHz the full-load power factor at $f_{AC}=800$ Hz would be ≈99.94%.

The power factor would become unity at β=β₀ given by $$\beta_0 \approx 3.4\gamma \sqrt{\frac{\max(f_{AC})}{f_{sw}}}. \quad (48)$$

For example, for γ=2 and $\max(f_{AC})=800$ Hz, $\beta_0=0.878$ (87.8%) for $f_{sw}=48$ kHz, and $\beta_0=0.507$ (50.7%) for $f_{sw}=144$ kHz. One would note that, if the line inductance is chosen according to equation (44), the switching frequency would need to be larger than $(3.4\gamma)^2 \max(f_{AC})$ (e.g., >37 kHz for γ=2 and $\max(f_{AC})=800$ Hz) in order to achieve a unity power factor at some load.

For β<β₀, the power factor would be an increasing function of output power, becoming zero in the limit β→0. For sufficiently small β (e.g., resulting in a small power factor such that $PF^2<<1$).

$$PF(\beta; \gamma, f_{AC}) \approx \frac{f_{sw}}{3.4\gamma f_{AC}}\beta \text{ for sufficiently small } \beta. \quad (49)$$

For $\beta=\beta_{min}$ such that $$\beta_{min} \approx \frac{3.4\gamma}{\sqrt{2\Delta PF_{max}}} \frac{\max(f_{AC})}{f_{sw}}, \quad (50)$$

$$|\alpha(\beta_{min}; \gamma, \max(f_{AC}))| = \quad (51)$$

$$\sqrt{2\Delta PF_{max}} \left|1 - \frac{1}{2\Delta PF_{max}} \frac{\max(f_{AC})}{f_{sw}}\right| < \sqrt{2\Delta PF_{max}},$$

provided that $\Delta PF_{max} \geq \max(f_{AC})/(2f_{sw})$. Then, for $\max(f_{AC})/(2f_{sw}) \leq \Delta PF_{max}<<1$, the power factor would remain relatively large, namely $$PF(\beta_{min} \leq \beta \leq \beta_0; \beta_0; \gamma, \max(f_{AC})) \geq 1 - \Delta PF_{max}. \quad (52)$$

For example, for γ=2, $\max(f_{AC})=800$ Hz, $f_{sw}=144$ kHz, and $\Delta PF_{max}=0.03$ (3%), the power factor would remain above 97% for output powers larger than 15.4% of $P_{max}$.

One should note that the power factor $1-\Delta PF_{max}$ would be achieved for $\beta_{min}$ given by equation (50) in the limit of high switching frequencies, e.g., for $f_{sw}>>\max(f_{AC})/(2\Delta PF_{max})$, and that the power factor at $\beta_{min}$ would be generally higher than $1-\Delta PF_{max}$ for lower switching frequencies.

Figure 10:
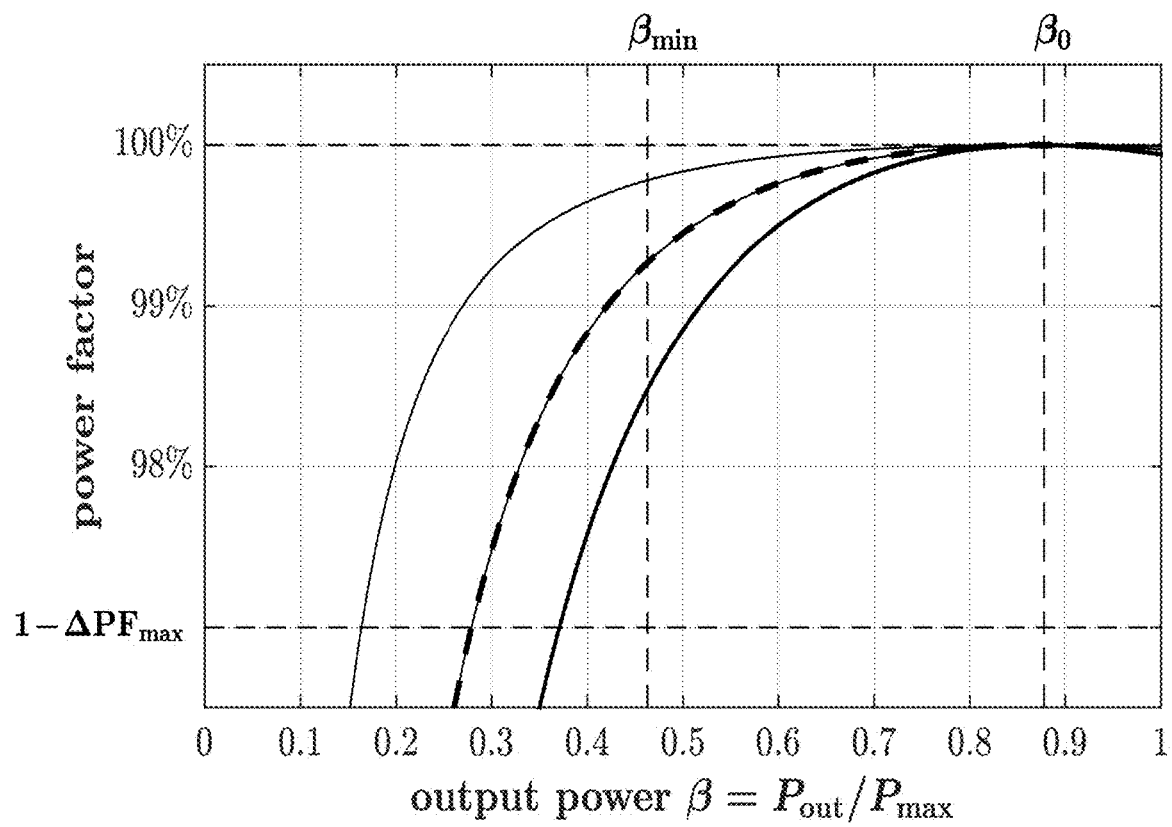
FIG. 10. Power factors as functions of output power for $\gamma=2$, $\max(f_{AC})=800$ Hz, line frequencies 300 Hz (thin line), 550 Hz (dashed line), 800 Hz (thick line), and switching frequency $f_{sw}=48$ kHz. The line inductance is according to equation (44).

For $\Delta PF_{max}=0.03$ (3%) and the line inductance according to equation (44), FIG. 10 shows the power factors as functions of output power for γ=2, $\max(f_{AC})=800$ Hz, line frequencies 300 Hz (thin line), 550 Hz (dashed line), 800 Hz (thick line), and switching frequency $f_{sw}=48$ kHz.

Figure 11:
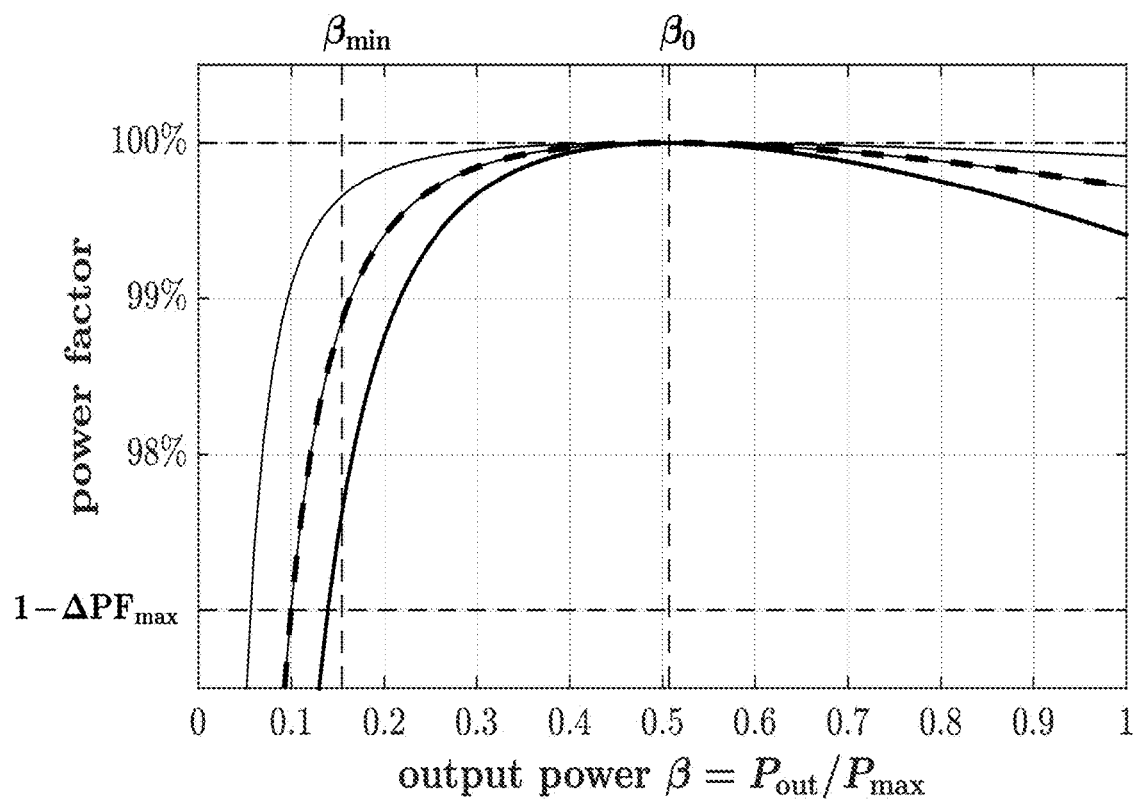
FIG. 11. Power factors as functions of output power for $\gamma=2$, $\max(f_{AC})=800$ Hz, line frequencies 300 Hz (thin line), 550 Hz (dashed line), 800 Hz (thick line), and switching frequency $f_{sw}=144$ kHz. The line inductance is according to equation (44).

For $\Delta PF_{max}=0.03$ (3%) and the line inductance according to equation (44), FIG. 11 shows the power factors as functions of output power for γ=2, $\max(f_{AC})=800$ Hz, line frequencies 300 Hz (thin line), 550 Hz (dashed line), 800 Hz (thick line), and switching frequency $f_{sw}=144$ kHz.

Figure 12:
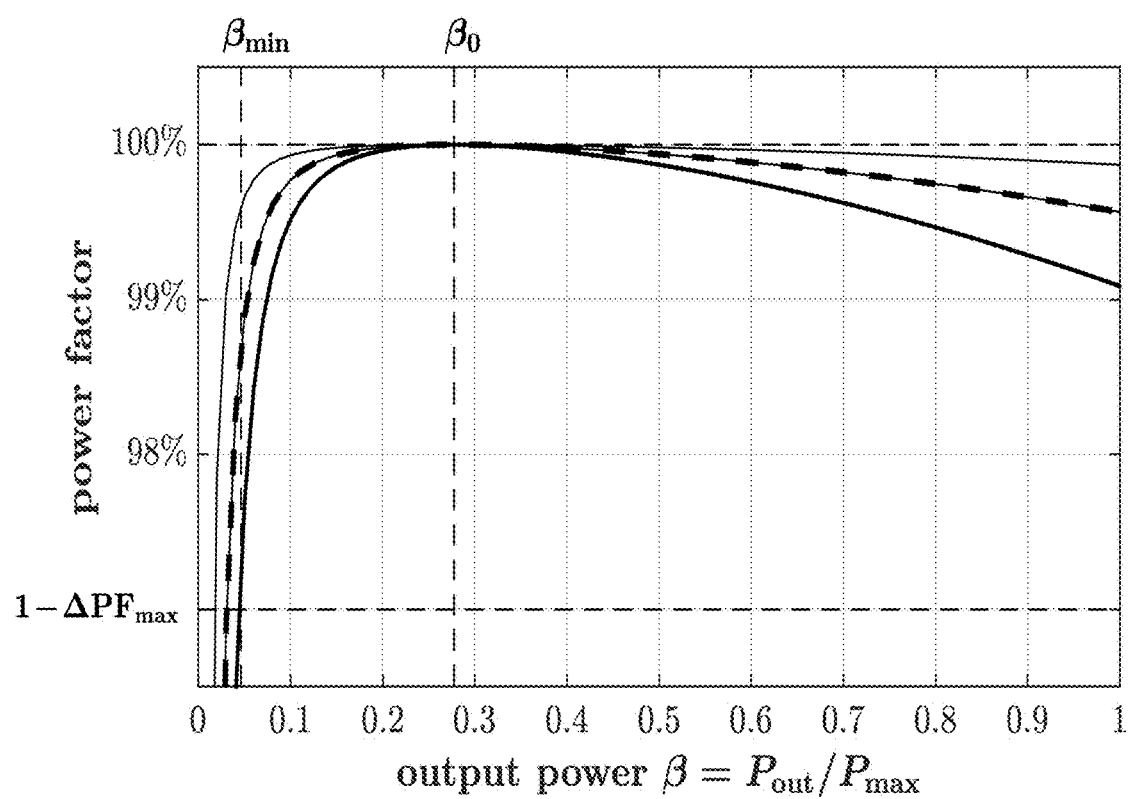
FIG. 12. Power factors as functions of output power for $\gamma=2$, $\max(f_{AC})=800$ Hz, line frequencies 300 Hz (thin line), 550 Hz (dashed line), 800 Hz (thick line), and switching frequency $f_{sw}=480$ kHz. The line inductance is according to equation (44).

For $\Delta PF_{max}=0.03$ (3%) and the line inductance according to equation (44), FIG. 12 shows the power factors as functions of output power for γ=2, $\max(f_{AC})=800$ Hz, line frequencies 300 Hz (thin line), 550 Hz (dashed line), 800 Hz (thick line), and switching frequency $f_{sw}=480$ kHz.

2.2.1 Preferred Choice for Line Inductance for the Converter Shown in FIG. 6 to Meet Power Factor Specifications Let us now revisit the expression for α given by equation (40). At full power β=1, $$\alpha = \alpha(1; \gamma, f_{AC}, \beta_0) \approx \frac{3.4\gamma f_{AC}}{f_{sw}}\left(1 - \frac{1}{\beta_0^2}\right), \quad (53)$$

and the power factor $$PF(1; \gamma, f_{AC}, \beta_0) = 1 - \Delta PF_{max} \quad (54)$$

$$\approx 1 - \frac{1}{2}|\alpha(1; \gamma, f_{AC}, \beta_0)|^2$$

$$\approx 1 - \frac{1}{2}\left(\frac{3.4\gamma f_{AC}}{f_{sw}}\right)^2\left(1 - \frac{1}{\beta_0^2}\right)^2.$$

Then a unity power factor would be achieved at $P_{out}=\beta_0 P_{max}$, where $$\beta_0 \approx \frac{1}{\sqrt{1+\frac{f_{sw}}{3.4\gamma f_{AC}}\sqrt{2\Delta PF_{max}}}}. \quad (55)$$

For example, $\beta \approx 2/3$ for $\Delta PF_{max}=10^{-3}$ (99.9% power factor), $f_{sw}=144$ kHz, $f_{AC}=800$ Hz, and $\gamma=1.9$.

The line inductance may then be given by equation (41). For example, $L_l \approx 78.5$ μH for $P_{max}=8.1$ kW, $V_{LN}=115$ V, $f_{sw}=144$ kHz, $\gamma=1.9$, and $\beta_0=2/3$.

For $\beta<\beta_0$, the power factor would be an increasing function of output power, becoming zero in the limit $\beta\to 0$. For $\beta=\beta_{min}$ such that the power factor is $1-\Delta PF_{max}$, we may write $$PF(\beta_{min}; \gamma, f_{AC}, \beta_0) = 1 - \Delta PF_{max} \quad , \text{ and thus} \quad (56)$$

$$\approx 1 - \frac{1}{2}|\alpha(\beta_{min}; \gamma, f_{AC}, \beta_0)|^2$$

$$\approx 1 - \frac{1}{2}\left(\frac{3.4\gamma f_{AC}}{f_{sw}}\right)^2\left(\frac{1}{\beta_{min}}-\frac{\beta_{min}}{\beta_0^2}\right)^2$$

$$\beta_{min} = \beta_0(-K+\sqrt{K^2+1}), \text{ where} \quad (57)$$

$$K = \frac{\beta_0 f_{sw}}{4.8\gamma f_{AC}}\sqrt{\Delta PF_{max}}. \quad (58)$$

For example, with $f_{sw}=144$ kHz, $f_{AC}=800$ Hz, $\gamma=1.9$, and $\beta_0=2/3$, $\beta_{min}\approx 0.445$ (44.5%) for $\Delta PF_{max}=10^{-3}$ (99.9% power factor), and $\beta_{min}\approx 0.136$ (13.6%) for $\Delta PF_{max}=0.032$ (96.8% power factor).

Figure 13:
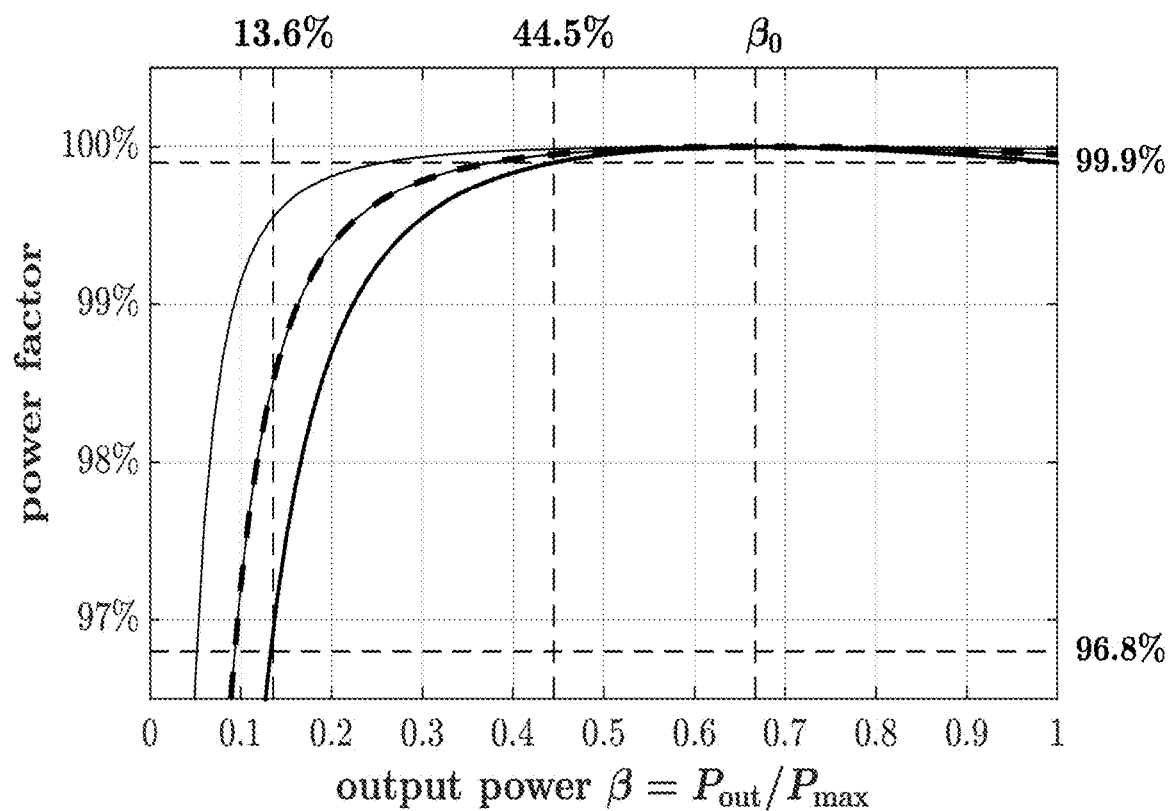
FIG. 13. Power factors as functions of output power for $\gamma=1.9$, $\max(f_{AC})=800$ Hz, line frequencies 300 Hz (thin line), 550 Hz (dashed line), 800 Hz (thick line), and switching frequency $f_{sw}=144$ kHz. The line inductance is according to equation (41).

For the line inductance according to equation (41) (e.g., $L_l \approx 78.5$ μH for $P_{max}=8.1$ kW, $V_{LN}=115$V, $f_{sw}=144$ kHz, $\gamma=1.9$, and $\beta_0=2/3$), FIG. 13 plots the power factors as functions of output power for max($f_{AC}$)=800 Hz and the line frequencies 300 Hz (thin line), 550 Hz (dashed line), and 800 Hz (thick line).

Let us now consider a particular design example for a converter desired to convert a $V_{LN}=115$ VAC voltage with maximum frequency max($f_{AC}$)=800 Hz into a $V_{out}=270$ VDC voltage, and to operate at up to 8.1 kW of output power.

Let us first choose the switching frequency as $f_{sw}=144$ kHz.

From equation (14), $L_{max}=12.2$ μH, and, using ti 10% tolerance margin, we may choose the converter inductance as $$L=11 \text{ μH}. \quad (59)$$

From equation (19), $C_{min}=0.766$ μF, and we may choose $$C=1.36 \text{ μF}, \quad (60)$$

e.g., two 0.68 μF capacitors connected in parallel, which would lead to $$\gamma \approx 1.78. \quad (61)$$

Let us initially require that $\Delta PF_{max}=10^{-3}$. For this, the power factor is larger than 99.9%, and may be considered effectively unity. For $\Delta PF_{max}=10^{-3}$, $\beta_0$ given by equation (55) would be $\beta_0=0.655$, and the line inductance according to equation (41) would be $L_l=76$ μH.

Let us further assume that due to design constraints $L_l=44$ μH. This would lead to the following value for $\beta_0$:

$$\beta_0 = \frac{3V_{LN}^2}{P_{max}}\sqrt{\frac{C}{L_l}} \approx 0.86 > 0.655. \quad (62)$$

For this $\beta_0$, the power factor at full load would be $$PF(1; \gamma, f_{AC}, \beta_0) \approx 1 - \frac{1}{2}\left(\frac{3.4\gamma f_{AC}}{f_{sw}}\right)^2\left(1-\frac{1}{\beta_0^2}\right)^2 \geq 0.9999 \text{ (99.99%)} \quad (63)$$

for any line frequency $f_{AC}\leq$max($f_{AC}$), and may be considered effectively unity.

The value $\beta_{min}$ for which the power factor still remains above 99.9% would be $$\beta_{min} \approx 0.499, \quad (64)$$

or less than half of the maximum power, and the power factor would remain above 96.8% for the loads>13%.

Figure 14:
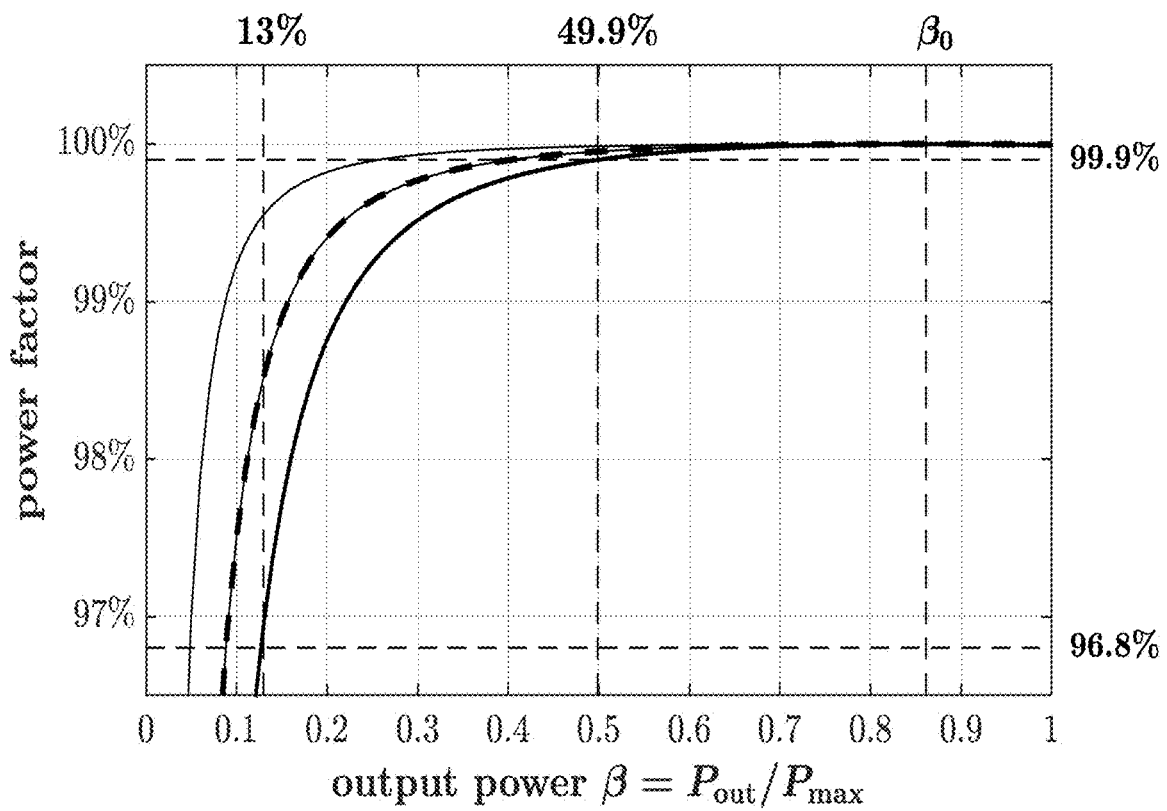
FIG. 14. Power factors as functions of output power for $\gamma=1.78$, $\max(f_{AC})=800$ Hz, line frequencies 300 Hz (thin line), 550 Hz (dashed line), 800 Hz (thick line), and switching frequency $f_{sw}=144$ kHz. The line inductance is $L_l=44$ μH.

For this particular example, FIG. 14 plots the power factors as functions of output power for the line frequencies 300 Hz (thin line), 550 Hz (dashed line), and 800 Hz (thick line).

Let us consider another design example, for a converter with $f_{sw}=144$ kHz transforming a $V_{LN}=115$ VAC voltage with maximum frequency max($f_{AC}$)=800 Hz into a $V_{out}=270$ VDC voltage, and operating at up to $P_{max}=8.1$ kW of output power.

From equation (14), $L_{max}=12.2$ μH, and the choice $L=10$ μH would provide us with $\approx 20$% tolerance margin.

From equation (19), $C_{min}=0.766$ μF, and the VN capacitance value of $C=1.2$ μF ($\gamma \approx 1.57$) would ensure (in combination with the reduced converter inductance, and thus smaller maximum duty cycle) that the current through a converter inductor would be an increasing function of time during an "on" position of the switch.

For $L_l=60$ μH, a unity power factor would be achieved at $P_{out}=\beta_0 P_{max}$, where $$\beta_0 = \frac{3V_{LN}^2}{P_{max}}\sqrt{\frac{C}{L_l}} \approx 0.69. \quad (65)$$

The power factor would be given by equation (33), where a would be given by equation (40).

Figure 15:
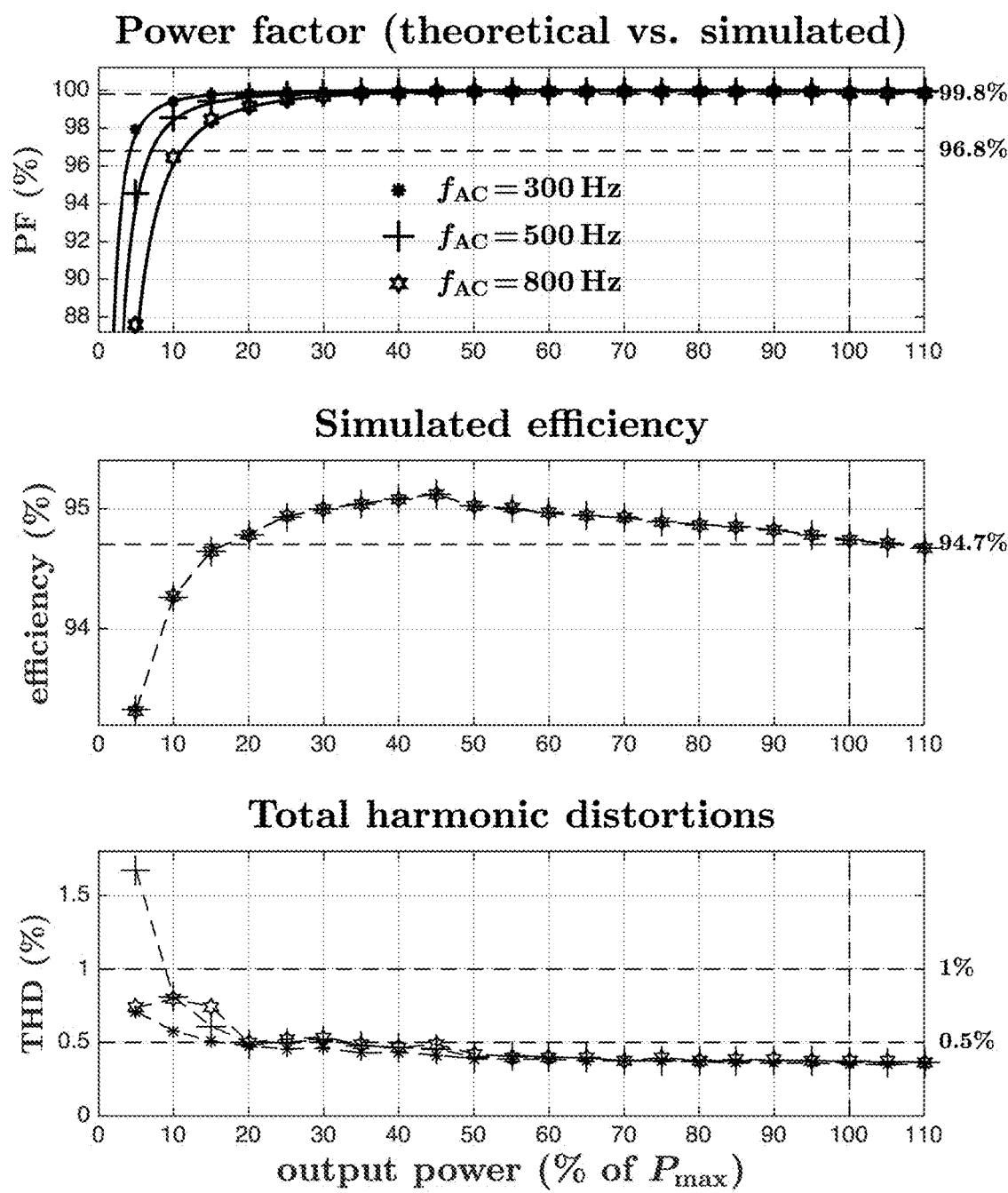
FIG. 15. Simulated power factor, efficiency, and total harmonic distortions as functions of output power for $f_{AC}=300$ Hz, $f_{AC}=500$ Hz, and $f_{AC}=800$ Hz. ($P_{max}=8.1$ kW, $f_{sw}=144$ kHz, 115 VAC/270 VDC conversion.)

FIG. 15 provides examples of power factor, efficiency, and total harmonic distortions as functions of output power for $f_{AC}=300$ Hz, $f_{AC}=500$ Hz, and $f_{AC}=800$ Hz, simulated using LTspice IV for such a converter constructed with Commercial Off-The-Shelf (COTS) components. ($P_{max}=8.1$ kW, $f_{sw}=144$ kHz, 115 VAC/270 VDC conversion.) In these examples, the theoretical power factors are shown by the solid lines, and the output voltage regulation is performed by a controller constructed according to the disclosure provided in Section 3.

It would need to be noted, however, that the THD values shown in the examples of FIG. 15 assume employing additional means to mitigate the effects of parasitic capacitances of the semiconductor components (i.e., the diodes and the MOSFET power switches), as discussed in more detail in Section 6 of this disclosure.

2.3 Additional Line EMI Filtering and Damping

To meet various requirements on the conducted input EMI emissions, an additional filter for suppressing the input common and differential mode EMI may need to be inserted between the voltage sources and the LC filtering network. Also, such an EMI filter may need to incorporate additional damping.

Indeed, for example, if the line inductance is chosen according to equation (41), then equation (27) may be rewritten as $$f_0 = \frac{\omega_0}{2\pi} = \frac{3\pi\beta_0}{32\gamma} f_{sw} \text{ and } Q = \beta_0 \frac{P_{max}}{P_{out}}, \quad (66)$$

and, with the constraints on $\gamma$ and $\beta_0$ as discussed above, $$0.07 f_{sw} \lesssim f_0 \lesssim 0.3 f_{sw} \text{ and } \frac{1}{2}\frac{P_{max}}{P_{out}} \lesssim Q \lesssim \frac{P_{max}}{P_{out}}. \quad (67)$$

Thus for light loads the quality factor may be significantly large, and damping may need to be employed.

Figure 16:
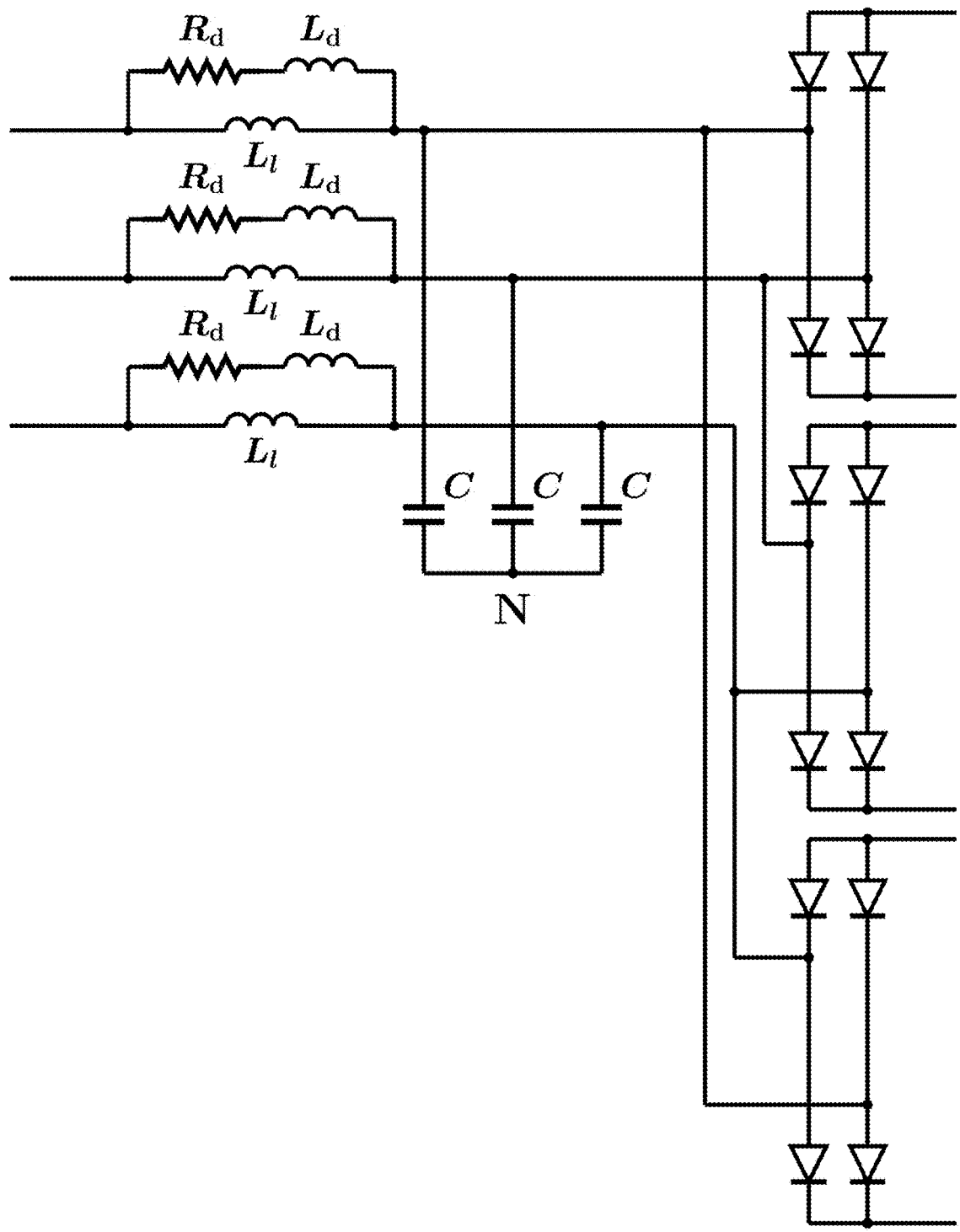
FIG. 16. Example of line LC filtering network with parallel $R_d$-$L_d$ damping.

In practice, it may be sufficient to incorporate such additional damping in the EMI filtering network. When adding damping directly to the LC filtering network is required, parallel $R_d$-$L_d$ damping may be used, as illustrated in FIG. 16.

When additional line EMI filtering and/or damping is employed, the value of the line inductor $L_l$ may need to be adjusted to meet the desired criteria for the power factor.

3 Regulating the Output of a Buck-Boost 3-Phase AC-to-DC Converter

It may be shown that the output voltage of the converter disclosed in Sections 1 and 2 would not only depend on the input voltage and the duty cycle, but also on the converter inductor value, the switching frequency, and the output current. In this section, we describe the method and corresponding apparatus for providing robust and stable regulated converter output voltage for full range of output powers (i.e. from full load to open circuit).

Figure 17:
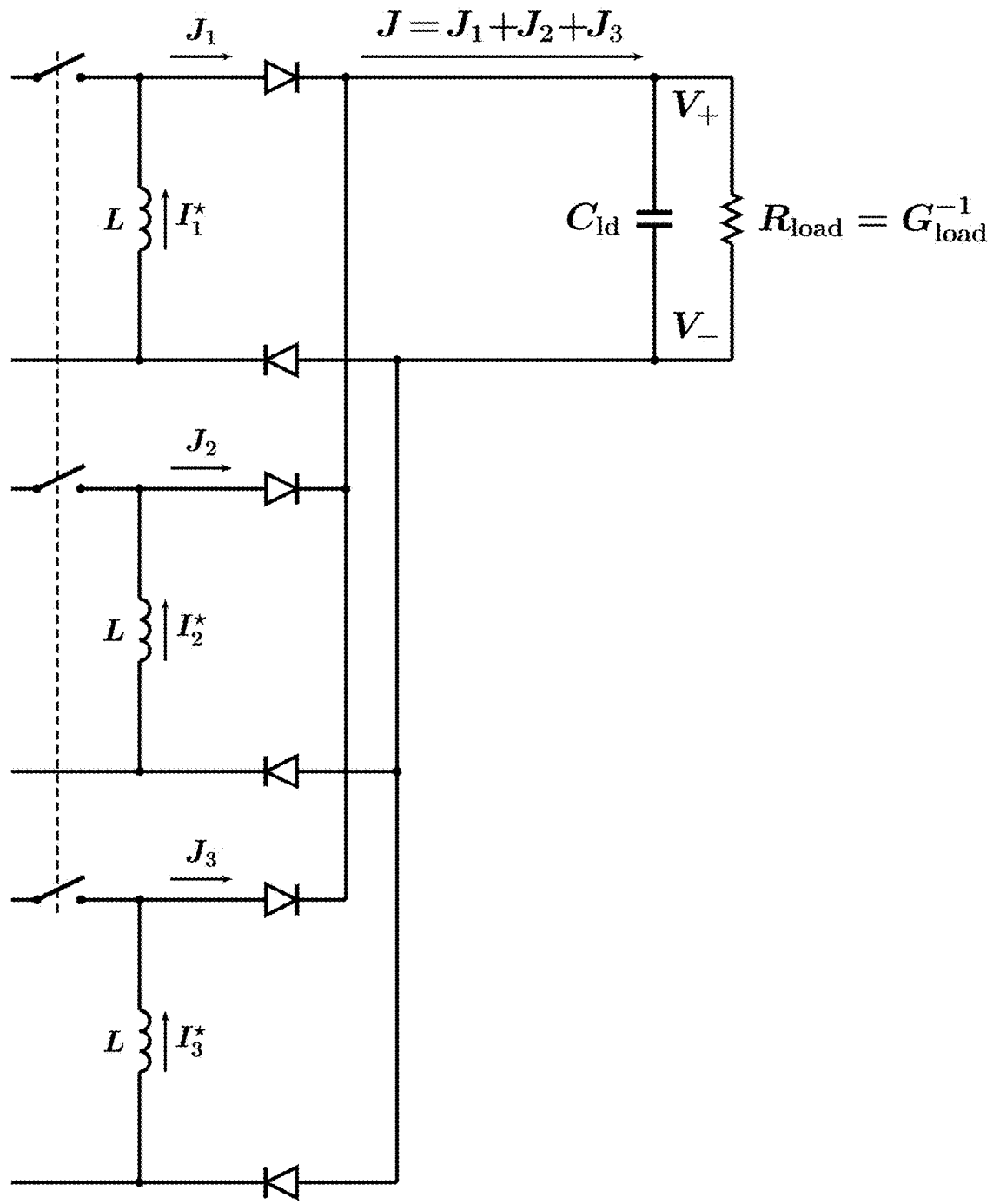
FIG. 17. Current supplied to the output RC circuit as a sum of the output currents of the three sections.

Let us first assume a load that may be represented by a parallel RC circuit, and consider the current supplied to the output RC circuit by the converter shown in FIG. 1 as a sum of the output currents of the three sections, as illustrated in FIG. 17.

Let us assume that $\min(R_{load})C_{ld} \gg \Delta T$, and thus we may neglect the high-frequency "ripples" in the output voltage. For example, for $C_{ld}=105$ µF $\min(R_{load})=9\Omega$, and $f_{sw}=144$ kH, min $(R_{load})C_{ld} f_{sw}=136\gg 1$.

Figure 18:
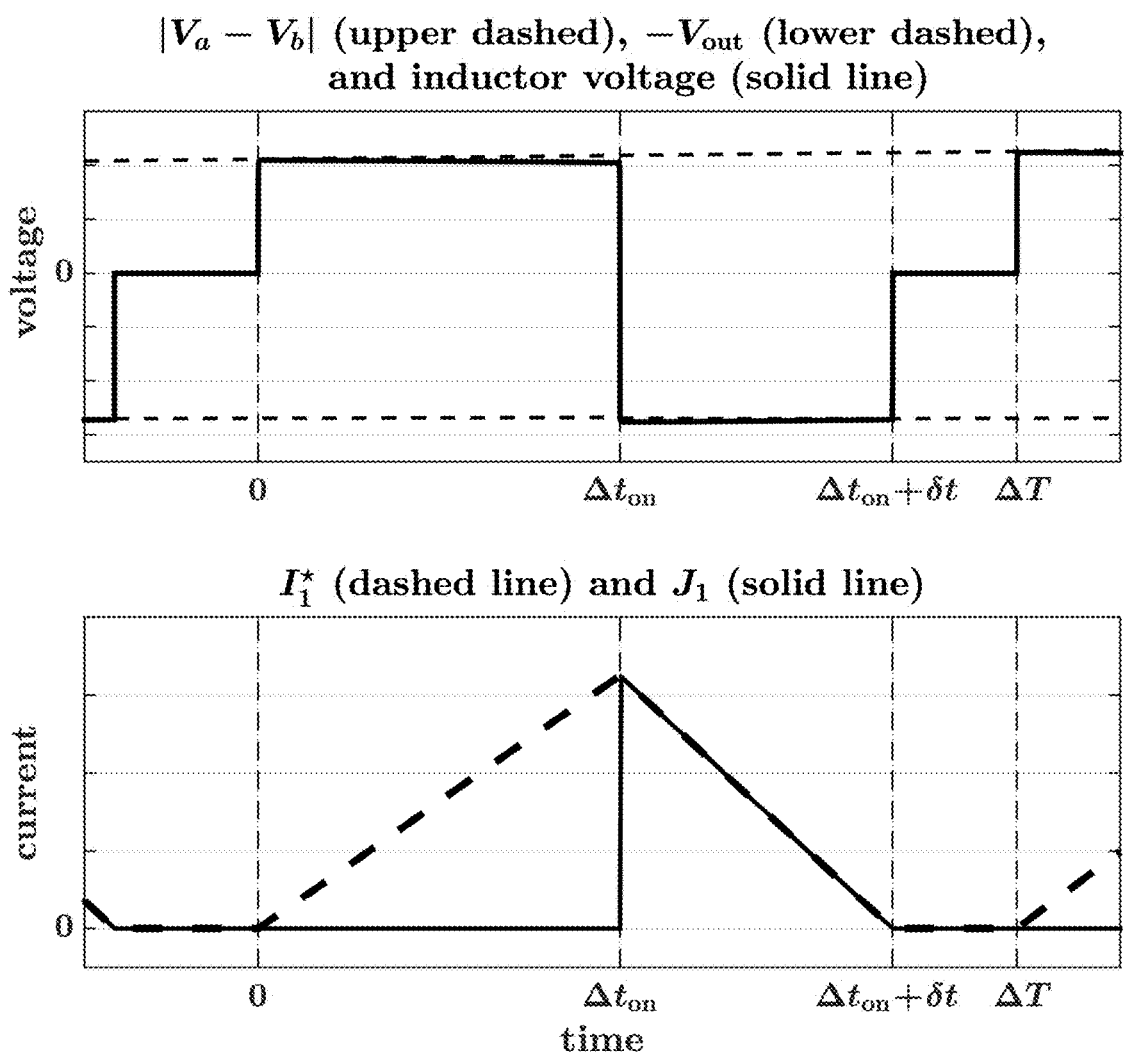
FIG. 18. Voltage and current relations during switching for the inductor in the 1st section.

It may be then shown (see, for example, the illustration of the inductor voltage and current relations during switching depicted in FIG. 18) that the average value $\langle J_1 \rangle$ of the current $J_1$ supplied by the 1st section to the output RC circuit during a full switching interval may be expressed as $$\langle J_1 \rangle = \frac{1}{\Delta T}\int_{\Delta t_{on}}^{\Delta t_{on}+\delta t} dt I_1^*(t) = \frac{D^2 \overline{V}_{ab}^2}{2Lf_{sw}V_{out}}, \quad (68)$$

where $D=\Delta t_{on}/\Delta T$ is the duty cycle.

The average value $\langle J \rangle$ of the total current $J$ supplied by all three sections to the output RC circuit during a full switching interval may then be expressed as $$\langle J \rangle = \langle J_1 \rangle + \langle J_2 \rangle + \langle J_3 \rangle = D^2\frac{\overline{V}_{ab}^2 + \overline{V}_{bc}^2 + \overline{V}_{ca}^2}{2Lf_{sw}V_{out}} = D^2\frac{9V_{LN}^2}{2Lf_{sw}V_{out}}. \quad (69)$$

$\langle J \rangle$ may also be expressed as the sum of the average currents through the capacitor and through the resistive load, namely as $$\langle J \rangle = G_{load}\langle V_{out}\rangle + C_{ld}\langle \dot{V}_{out}\rangle. \quad (70)$$

If we may express $V_{out}$ as $V_{out}=V_{ref}+\Delta V$, where $V_{ref}$=const and $|\Delta V|\ll V_{ref}$, then equating the right-hand sides of equations (69) and (70) and differentiating the resulting equality with respect to time would lead to the following expression:

$$\frac{d}{dt}D^2 - D^2\dot{v} = \rho \dot{G}_{load} + \rho G_{load}\dot{v} + \rho C_{ld}\ddot{v}, \quad (71)$$

where $v=\langle \Delta V\rangle/V_{ref}$ is nondimensionalized transient voltage, and $$\rho = \frac{2Lf_{sw}V_{ref}^2}{9V_{LN}^2} \quad (72)$$

is a parameter (constant for $V_{LN}$=const) with physical units of resistance.

For example, $\rho=1.94\Omega$ for $L=11$ µH, $f_{sw}=144$ kHz, $V_{ref}=270$ V, and $V_{LN}=115$ V. Further, if $C_{ld}=105$ µF, then $\rho C_{ld}=204$ µs.

Let us now assume that the switches in the converter may be controlled by a two-level switch control signal (SCS) in such a way that a high level of the SCS corresponds to the "on" position of the switches, and a low level of the SCS corresponds to the "off" position.

Let us further assume that the SCS may be provided by a pulse-width modulator (PWM) comprising a comparator that compares a signal x(t) with a frequency control signal (FCS) y(t) and outputs a high-level SCS when y>x, and a low-level SCS when y<x.

If the FCS y(t) is such that, for a constant x, $D^2$ is proportional to x ($D^2 \propto x$) for $0<D\leq D_{max}$, then $dD^2/dx$ would be a constant ($dD^2/dx$=const) for $0<D\leq D_{max}$. If x(t) may be considered approximately constant (in relation to y(t)) during a $\Delta T$ interval, and if, further, x(t) is a linear combination of v(t) and of an antiderivative of v(t) with respect to time ($\int dt v(t)$), then equation (71) for the nondimensionalized transient voltage v(t) may be approximated by a 2nd order linear differential equation.

Figure 19:
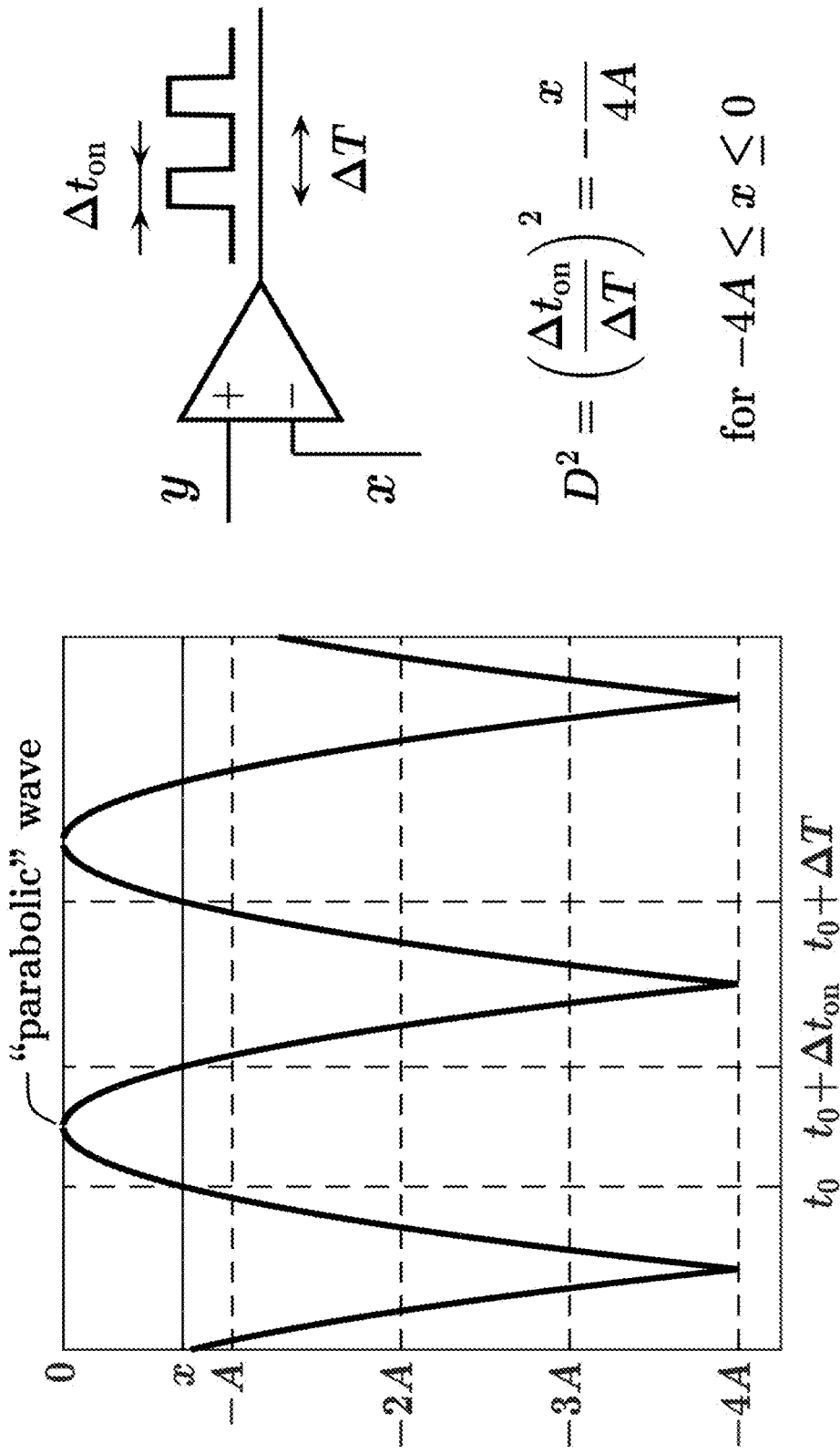
FIG. 19. Duty cycle of a PWM with a "parabolic" wave FCS.

An example of such an FCS that provides $D^2 \propto x$ for $0<D<1$ would be a "parabolic" wave as illustrated in FIG. 19. Such a parabolic FCS may be generated, e.g., by integrating a zero-mean sawtooth wave and applying appropriate scaling and translation. Also, a good approximation for such a parabolic FCS may be a full-wave rectified sine wave with frequency $f_{sw}/2$, appropriately scaled and translated, as illustrated in FIG. 20.

Figure 21:
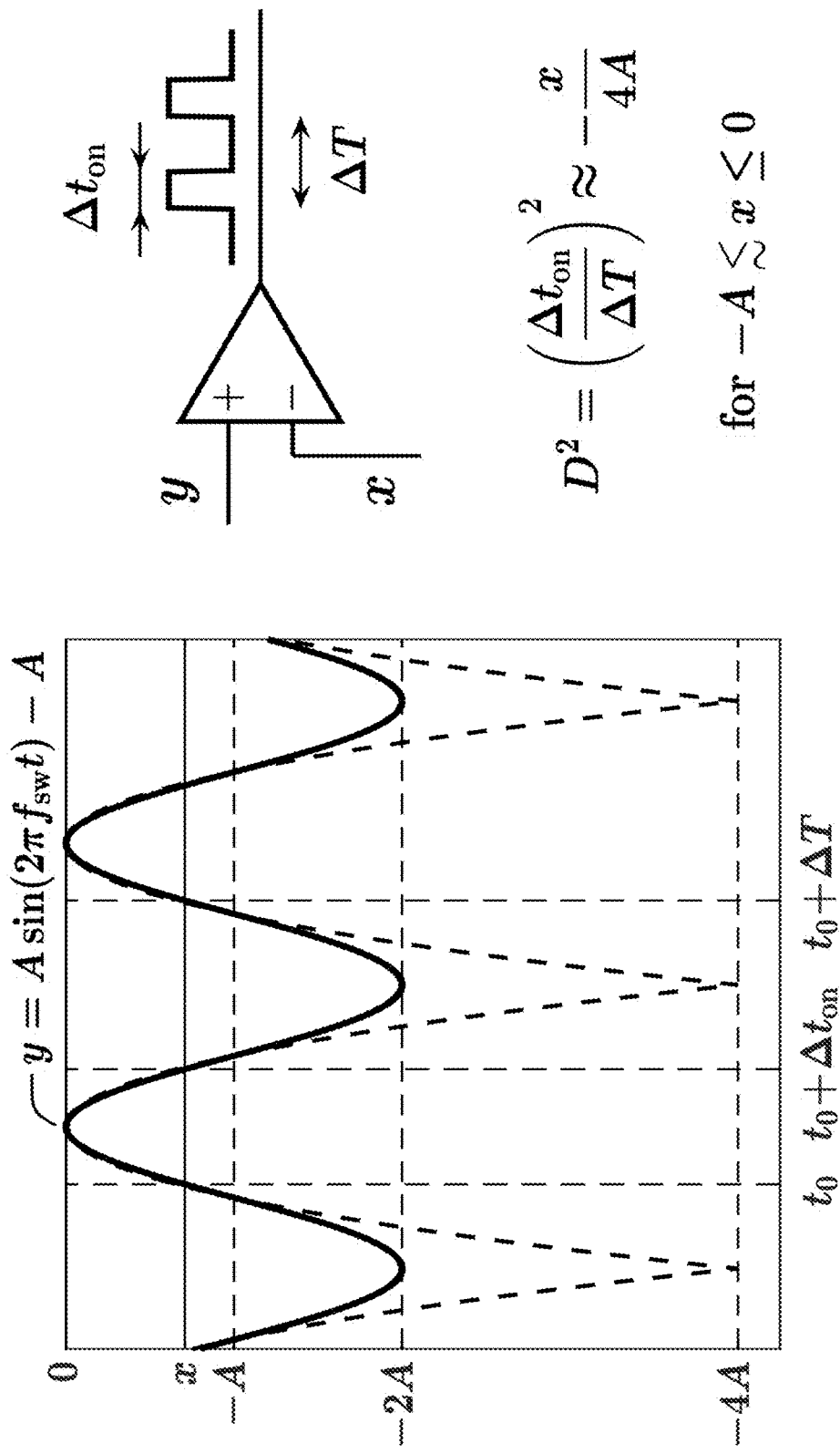
FIG. 21. Duty cycle of a PWM with a sine wave FCS.

When the proportionality $D^2 \propto x$ may be desired only for $0<D\leq \frac{1}{2}$ (e.g., when $D_{max}\leq\frac{1}{2}$), a simple sine wave with frequency $f_{sw}$ may also be used, as illustrated in FIG. 21. In the numerical examples (simulations) of this section, such a sine-wave FCS signal is used.

Figure 20:
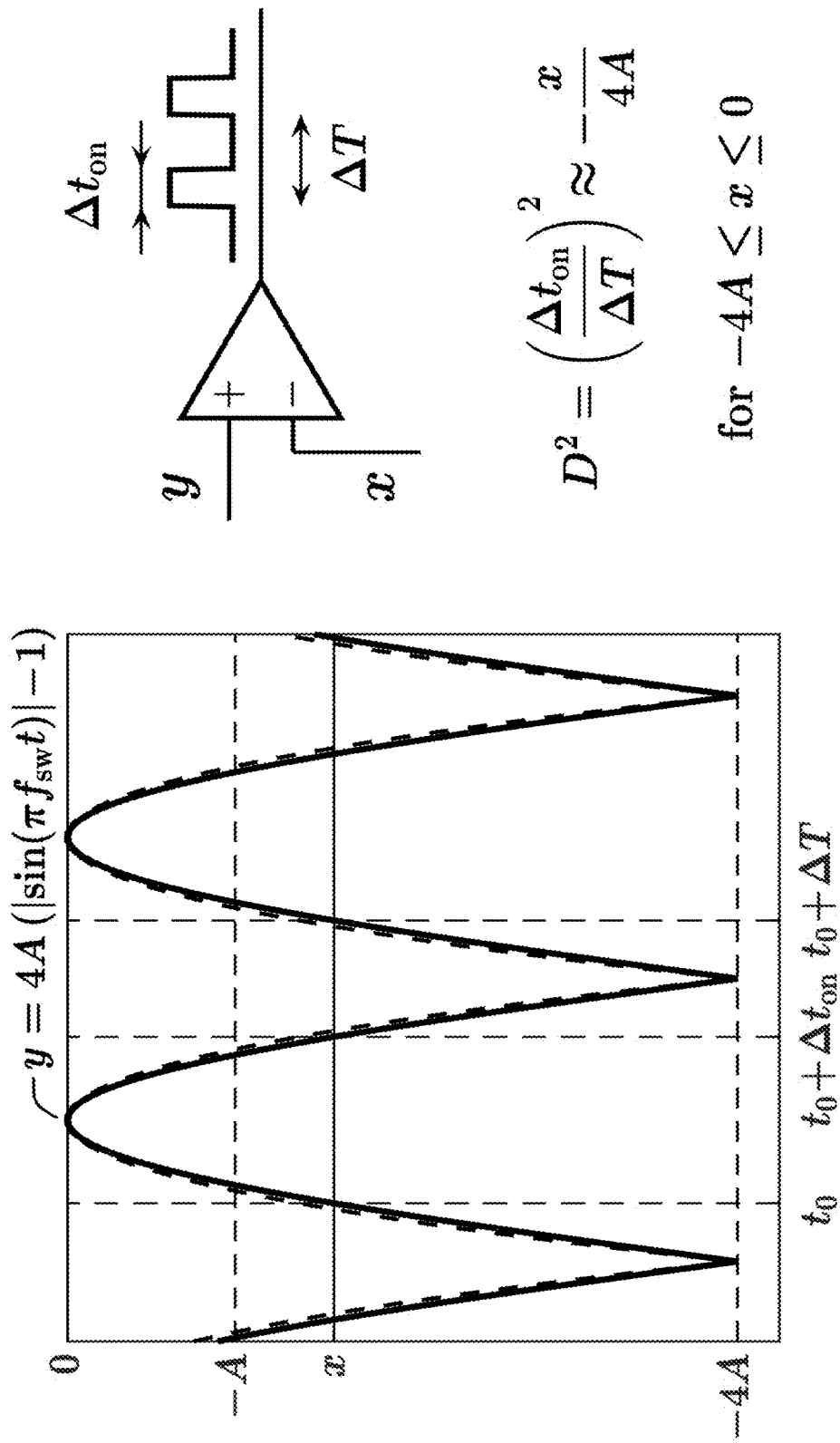
FIG. 20. Duty cycle of a PWM with a full-wave rectified sine wave FCS.
Figure 22:
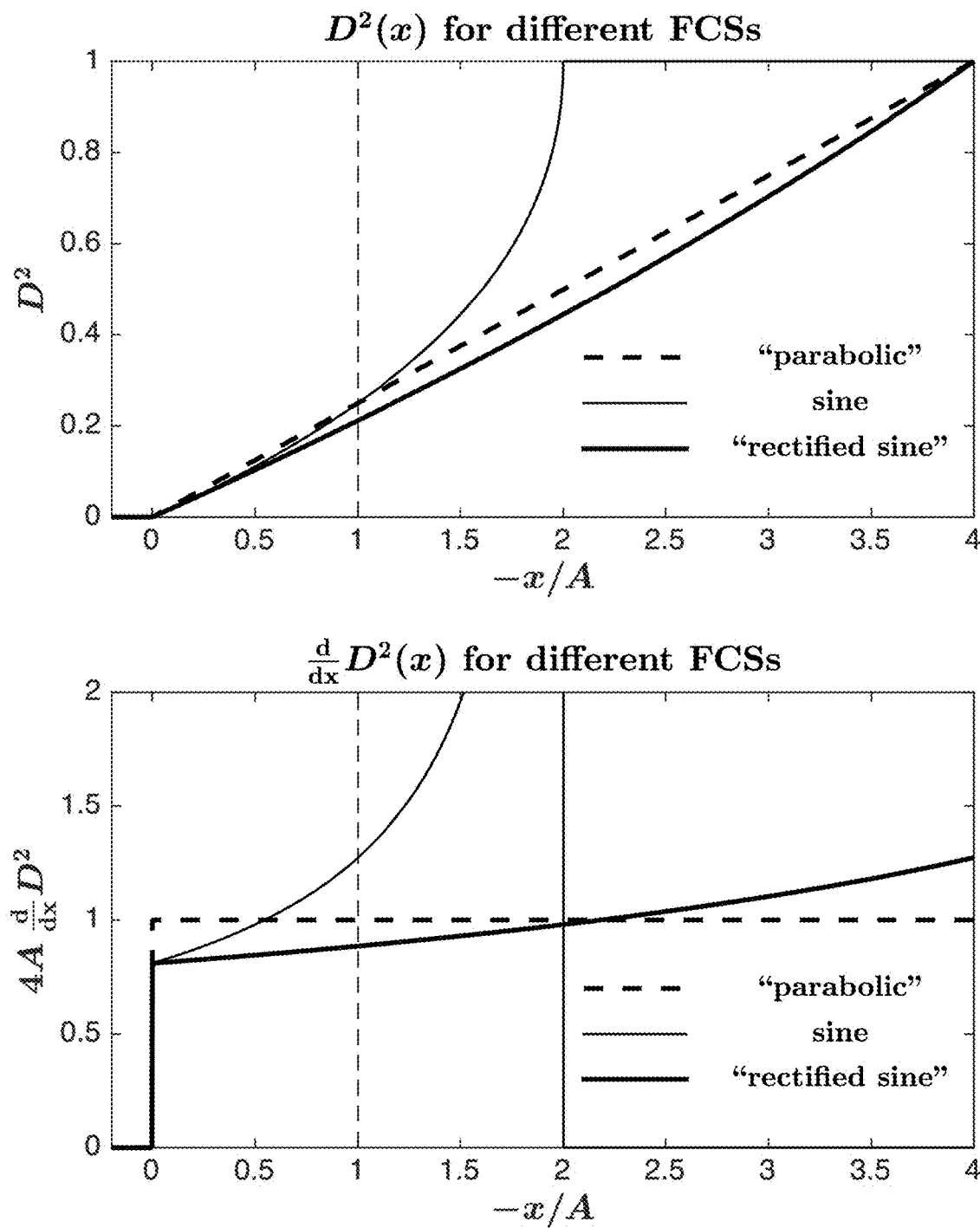
FIG. 22. $D^2$ and $dD^2/dx$ as functions of x for the FCSs shown in FIGS. 19, 20, and 21.

FIG. 22 illustrates $D^2$ and $dD^2/dx$ as functions of x for the FCSs shown in FIGS. 19, 20, and 21. Note that for all shown FCSs $$D^2 = 0 \text{ and } \frac{d}{dt}D^2 = 0 \text{ for } x > 0.$$

In the subsequent discussion of this section, it would also be assumed that $$D^2 = -\frac{x}{4A},$$

and thus $$\frac{d}{dx}D^2 = -\frac{1}{4A} = const,$$

for $-4A\, D_{max}^2 \leq x < 0$.

Thus the time derivative of $D^2$ for $-4A\, D_{max}^2 \leq x < 0$ may be expressed as $$\frac{d}{dt}D^2 = -\frac{\dot{x}}{4A}. \tag{73}$$

Let us further consider a signal x(t) that may be expressed as a linear combination of the transient voltage and of its antiderivative with respect to time, $$x(t) = \mu\left[\eta \Delta V(t) + \frac{1}{T}\int dt \Delta V(t)\right]. \tag{74}$$

The signal x(t) given by equation (74) may be interpreted as a sum of a feedback error signal $\mu\Delta V(t)$ integrated by an integrator with the time constant T, and of a feedback error signal multiplied by the gain $\eta$.

The time derivative of x(t) may be expressed as $$\dot{x}(t) = \frac{\mu V_{ref}}{T}[v(t) + \eta T \dot{v}(t)]. \tag{75}$$

Then for $-4A\, D_{max}^2 \leq x < 0$ equation (71) for the nondimensionalized transient voltage v(t) may be rewritten as $$v = -\lambda T \beta - \left[\eta + \left(\beta + \frac{R_{min}}{\rho}D^2\right)\lambda\right]T\dot{v} - \lambda T \tau_0 \ddot{v}, \tag{76}$$

where $R_{min} = \min(R_{load})$, $$\rho = \frac{2Lf_{sw}V_{ref}^2}{9V_{LN}^2} = D_{max}^2 R_{min}\left(\frac{\min(V_{LN})}{V_{LN}}\right)^2, \tag{77}$$

$$0 \leq \beta = G_{load}R_{min} \leq 1, \tag{78}$$

$$\tau_0 = R_{min}C_{ld} = const, \tag{79}$$

$$\lambda = \lambda_0\left(\frac{\min(V_{LN})}{V_{LN}}\right)^2 \leq \lambda_0, \tag{80}$$

and where $$\lambda_0 = \frac{4A\rho}{\mu V_{ref} R_{min}} = \frac{8Lf_{sw}AV_{ref}}{9\mu R_{min}\min(V_{LN}^2)} = const. \tag{81}$$

For example, $\lambda_0 = 0.61$ for A=1.6V, L=10 µH, $f_{sw}$=144 kHz, µ=$10^{-2}$, $R_{min}$=9Ω, $V_{ref}$=270 V, and min($V_{LN}$)=100 V.

Equation (76) may be further rewritten as $$v = -\lambda T \beta - \frac{\sqrt{\lambda T \tau_0}}{Q}\dot{v} - \lambda T \tau_0 \ddot{v}, \tag{82}$$

where the quality factor Q may be expressed as $$Q = \frac{\sqrt{\frac{\lambda \tau_0}{T}}}{\eta + \left(\beta + \frac{R_{min}}{\rho}D^2\right)\lambda} \leq Q_{max} = \frac{1}{\eta}\sqrt{\frac{\lambda_0 \tau_0}{T}}. \tag{83}$$

A reasonable practical choice for the quality factor may be ½≲$Q_{max}$≲1. This choice would provide fast transient response that is not significantly overdamped and/or underdamped.

3.1 Factors Affecting Transient Response

One may obtain from equation (82) that, for a step current (i.e., when $\dot{\beta}(t)$ is proportional to the Dirac δ-function [2]), the duration $\Delta t_{tr}$ of the transient may be expressed as $$\Delta t_{tr} = \frac{\int_0^\infty dt t v(t)}{\int_0^\infty dt v(t)} = \frac{\sqrt{\lambda T \tau_0}}{Q}, \tag{84}$$

and that, for a constant Q, both the magnitude and the duration of the output voltage transient would be proportional to $\sqrt{T}$.

On the other hand, from equation (83), $$T = \frac{\lambda_0 \tau_0}{\eta^2 Q_{max}^2}, \tag{85}$$

and both the magnitude and the duration of the step-current output voltage transient would be inversely proportional to the gain $\eta$. Thus one should choose as high gain $\eta$ as practically reasonable without violating the validity of the approximations employed in derivation of equation (82), under various operational conditions.

In particular, since in derivation of the equations of this section we have been considering quantities averaged over a full switching interval $\Delta T = f_{sw}^{-1}$; one skilled in the art will recognize that, for a reasonably small $Q_{max}$ (e.g., $Q_{max}$≲1) a constraint on the gain $\eta$ may be expressed as $$\eta \lesssim \frac{1}{\gamma} \lambda_0 f_{sw} \tau_0, \quad (86)$$

where $\gamma$ is a constant of order 10 (e.g., $\gamma=10$). For example, $\eta \lesssim 10$ for $\lambda_0=0.61$, $f_{sw}=144$ kHz, $\tau_0=1.1$ ms, and $\gamma=10$.

Using equations (85) and (86), equation (82) may be rewritten as $$v = -\frac{\xi^2}{f_{sw}^2 Q_{max}^2} \frac{\dot{\beta}}{\tau_0} - \frac{\xi}{f_{sw} Q_{max} Q} \dot{v} - \frac{\xi^2}{f_{sw}^2 Q_{max}^2} \ddot{v}, \quad (87)$$

where $$\xi = \gamma \sqrt{\frac{\lambda}{\lambda_0}} \leq \gamma. \quad (88)$$

One may notice that in equation (87) for the nondimensionalized transient voltage the parameter $\xi$ does not depend on particular voltage and current specifications, and/or particular choice of component values, as well as A and $\mu$.

One may also notice that Q and $Q_{max}$ would be of the same order of magnitude for a sufficiently large $\eta$ (e.g., for $\eta \gg 2\lambda_0$). One skilled in the art will thus recognize that, according to equation (87), a decrease in $Q_{max}$ would increase the duration of a transient, $\Delta t_{tr} \propto Q_{max}^{-2}$. The magnitude of the transient would also be a monotonically decreasing function of $Q_{max}$, asymptotically approaching a maximum value in the limit $Q_{max} \to 0$.

A reasonable practical choice for the quality factor may be a $\frac{1}{2} \lesssim Q_{max} \lesssim 1$. This choice would provide a fast transient response that is not significantly overdamped and/or underdamped, and would also ensure that the undamped natural frequency of the 2nd order lowpass filter represented by equation (87) would remain sufficiently smaller than the switching frequency.

One skilled in the art will also recognize that, according to equation (87), both the magnitude and the duration of the step-current output voltage transient would be inversely proportional to the switching frequency $f_{sw}$.

Further, when both $f_{sw}$ and $Q_{max}$ are fixed, the magnitude of a transient would be inversely proportional to $\tau_0$, and thus to the magnitude of the output capacitor $C_{ld}$.

Figure 23:
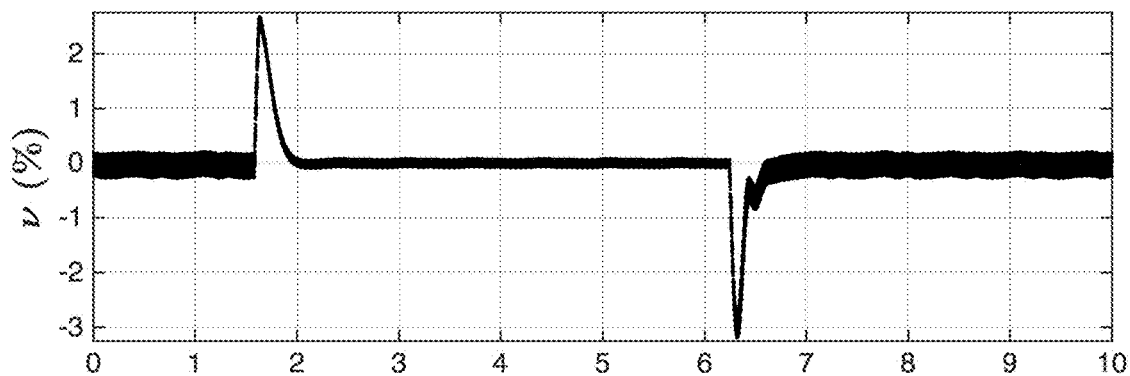
FIG. 23. Reducing transients by increasing $C_{ld}$.
Figure 23:
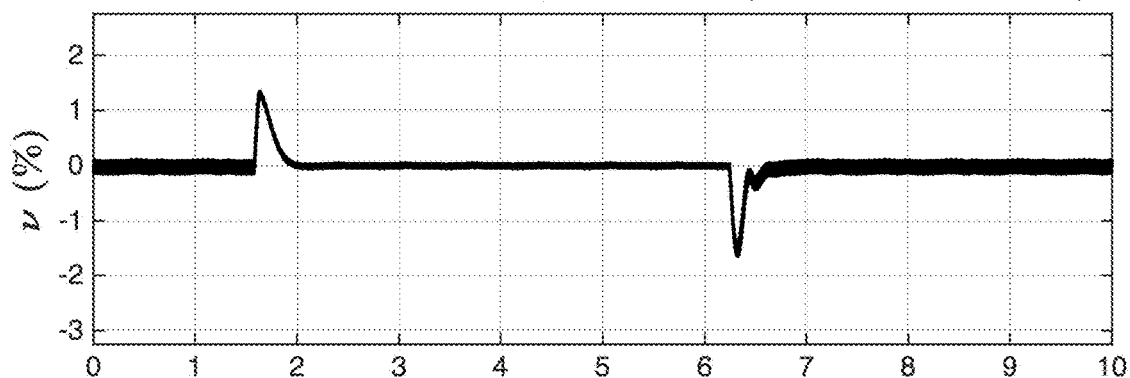
Figure 23:
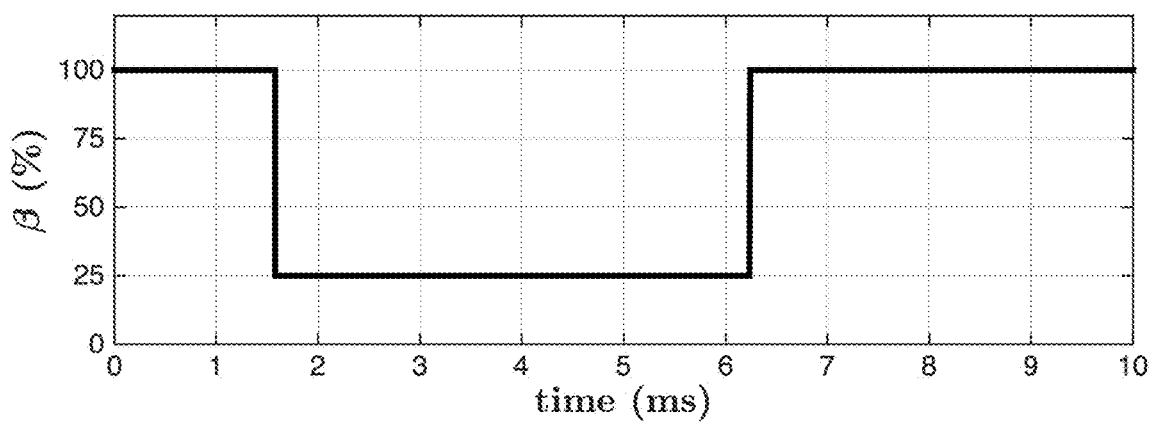

For example, as illustrated in FIG. 23 by a simulated example for a particular converter implementation, doubling the value of $C_{ld}$ would double $\tau_0$, and thus, according to equation (87), would reduce the magnitude of a transient in half. (Note that, according to equations (86) and (85), the gain $\eta$ would be doubled, and T reduced in half.)

As one may see, while the high-low transients in FIG. 23 appear approximately critically damped, the low-high transients appear to be slightly underdamped. This may be explained by the fact that, as was mentioned earlier, in the simulated examples of this section a simple sine wave with frequency $f_{sw}$ was used as an FCS. For such an FCS, as illustrated in FIG. 22, the value of $$\frac{d}{dx} D^2$$

at $D=\frac{1}{2}$ would be noticeably (approximately 50%) larger than at $D \ll 1$, which would lead to a larger quality factor (and a wider bandwidth) at heavier loads.

In general, replacing $$\frac{d}{dx} D^2$$

by a constant value for a sine wave FCS would be a relatively crude approximation. In practice, due to nonlinear terms, the transient responses for such an FCS may exhibit noticeable deviations from those described by the respective "linearized" equations in this section. However, such deviations may be considered to be of the same order of magnitude or smaller than the "idealized" responses, and the later may be considered an acceptable 1st order approximation.

3.2 Further Improving Transient Response by Introducing a Feedback Signal Indicative of the Load Current Let us modify the signal x(t) by adding a term indicative of the current through $R_{load}$ as follows:

$$x = \mu \left[ \eta \Delta V - \mathcal{R} G_{load} \langle V_{out} \rangle + \frac{1}{T} \int dt \Delta V \right], \quad (89)$$

where $\mathcal{R}$ is a constant with physical units of resistance.

Then the time derivative of x(t) may be expressed as $$\dot{x} = \frac{\mu V_{ref}}{T} \left[ v + (\eta - \mathcal{R} G_{load}) T \dot{v} - (1+v) T \mathcal{R} \dot{G}_{load} \right], \quad (90)$$

and for $-4A D_{max}^2 \lesssim x < 0$, equation (71) for the nondimensionalized transient voltage v(t) may then be rewritten as $$v = -\left[ \lambda - (1+v) \frac{\mathcal{R}}{R_{min}} \right] T \dot{\beta} - \left\{ \eta + \left[ \left( 1 - \frac{\mathcal{R}}{\lambda R_{min}} \right) \beta + \frac{R_{min}}{\rho} D^2 \right] \lambda \right\} T \dot{v} - \lambda T \tau_0 \ddot{v}. \quad (91)$$

Let us further express the ratio of $\mathcal{R}$ and $R_{min}$ as $$\frac{\mathcal{R}}{R_{min}} = \alpha \lambda, \quad 0 < \alpha < 1. \quad (92)$$

With this, and since $|v| \ll 1$, equation (91) may be written as $$v = -(1-\alpha) \lambda T \dot{\beta} - \left\{ \eta + \left[ (1-\alpha) \beta + \frac{R_{min}}{\rho} D^2 \right] \lambda \right\} T \dot{v} - \lambda T \tau_0 \ddot{v}. \quad (93)$$

One should be able to see that, if the parameters $\lambda$, T, $\eta$, $R_{min}$, $D^2$, and $\tau_0$ were constant, in the limit $\alpha \to 1$ the transient response given by equation (93) would vanish. However, since in derivation of equation (93) we employed certain approximations, and since both $D^2$ and $dD^2/dx$ are functions of x(t), equation (93) would be a nonlinear differential equation. Thus, in order to ensure stability of transient response for fast and wide range (i.e. from full load to open circuit) of load changes, a practical value of $\alpha$ may be limited to, e.g., approximately a $\alpha \approx \frac{1}{2}$, which would reduce the magnitude of the transient response by approximately a factor of 2.

Figure 24:
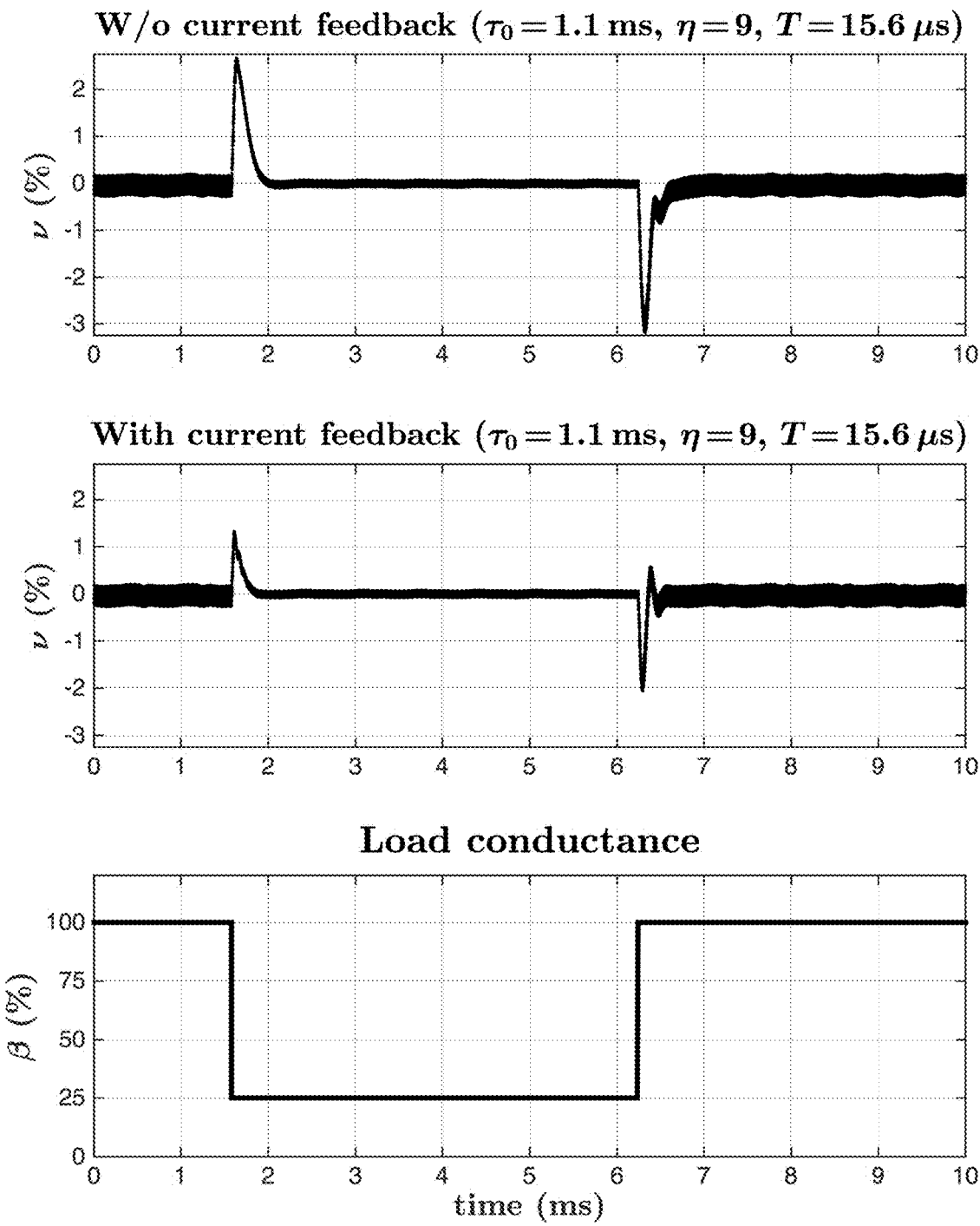
FIG. 24. Reducing transients by using additional "current" feedback.
Figure 25:
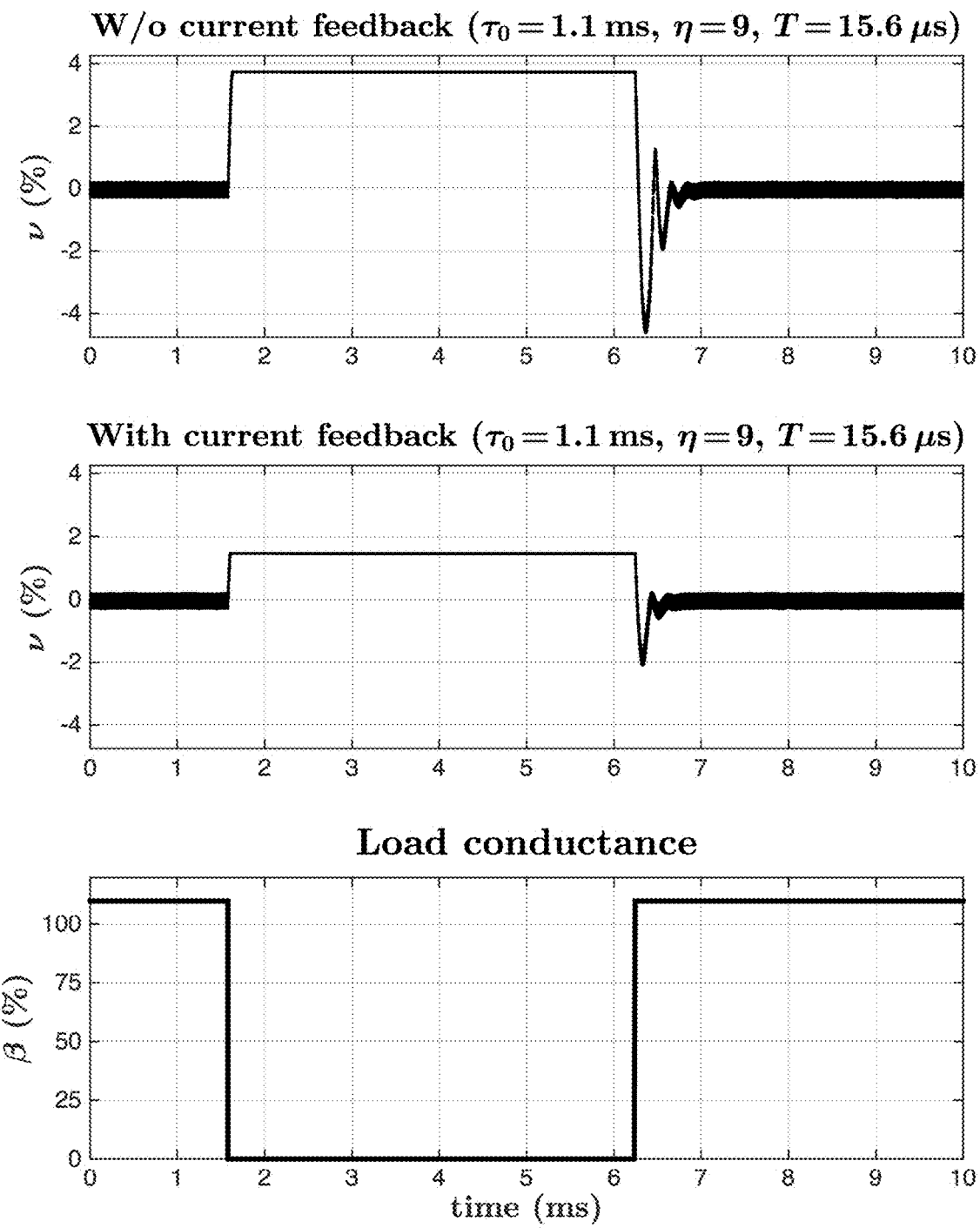
FIG. 25. Transients for load changes from open circuit to 10% overload (0-110% load change).
Figure 26:
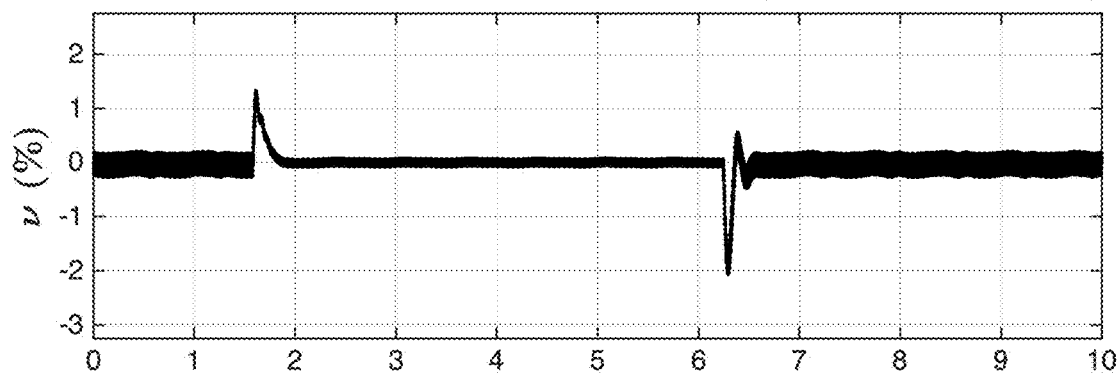
FIG. 26. Further reducing transients by increasing $C_{ld}$ (25-100% load change).
Figure 26:
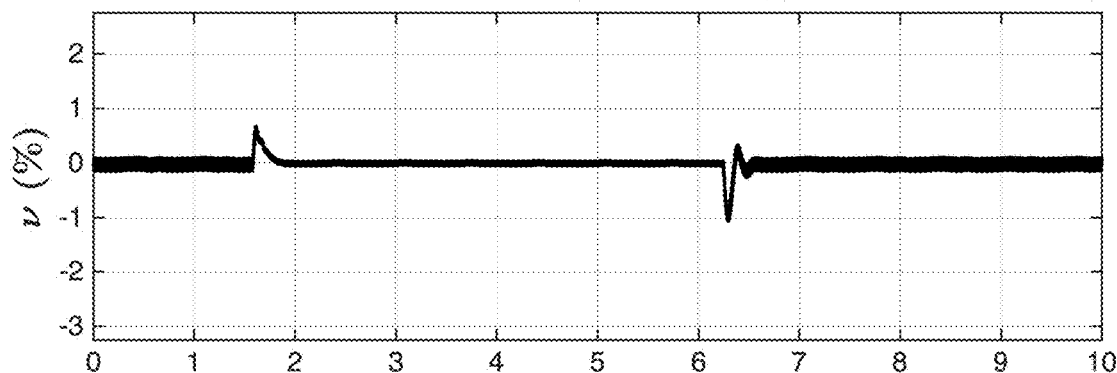
Figure 26:
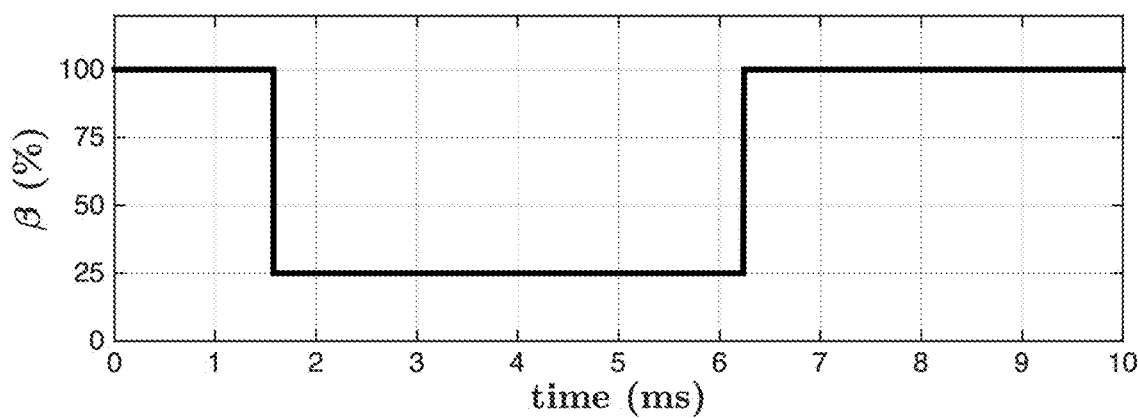
Figure 27:
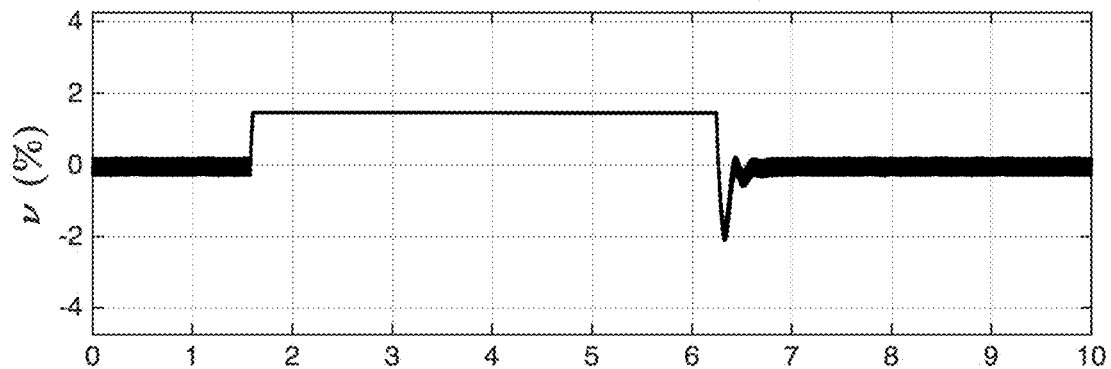
FIG. 27. Further reducing transients by increasing $C_{ld}$ (0-110% load change).
Figure 27:
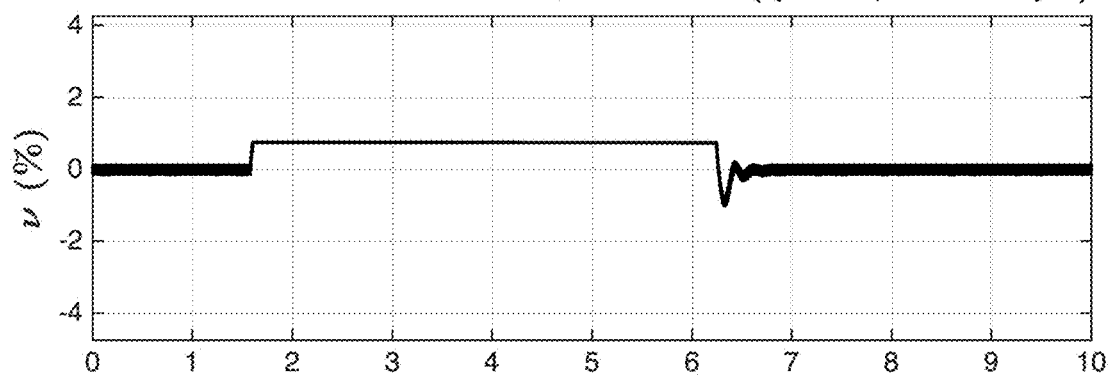
Figure 27:
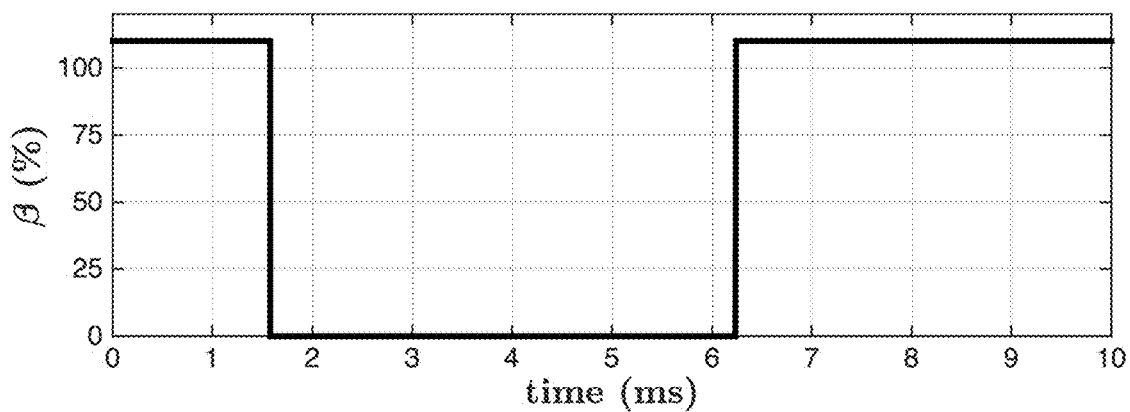

This is illustrated in FIGS. 24 and 25 that compare transient responses without and with a feedback signal indicative of the load current. As discussed in Subsection 3.1 and illustrated in FIGS. 26 and 27, further reduction of the transients' magnitude may be achieved by increasing the output (load) capacitance.

3.3 Light-Load Behavior and Transitions to and from Zero Load

When the error voltage $\Delta V(t)$ becomes positive (e.g., during a transition from non-zero to zero load), the output of an integrator (the term $$\frac{1}{T}\int dt\Delta V$$

in equations (74) and/or (89)) becomes an increasing function of time.

When the value of x(t) exceeds the maximum value of the FCS, the converter would stop switching and thus supplying current to the output circuit. If the resistance of the load is sufficiently large (e.g., infinite for an open circuit), $\Delta V(t)$ may remain positive for a relatively long time.

While x(t) remains larger than the maximum value of the FCS, both the duty cycle and its derivative would remain zero, $$D^2 \equiv \frac{d}{dt}D^2 \equiv 0,$$

and the output voltage would not depend on the value of x(t) and/or its time derivative.

If $\Delta V(t)$ remains positive for a sufficiently long time, $$\frac{1}{T}\int dt\Delta V$$

may become significantly large, limited, for example, by the integrator's supply voltage.

When the error voltage $\Delta V(t)$ becomes negative (e.g., during a transition from zero to non-zero load), the output of an integrator (the term $$\frac{1}{T}\int dt\Delta V$$

in equations (74) and/or (89)) becomes a decreasing function of time.

If at the beginning of a zero to non-zero load transition the value of x(t) is relatively large due to an excessively large integrator output (i.e., large term $$\frac{1}{T}\int dt\Delta V\Big),$$

there would be an additional "recovery" time interval before x(t) decreases to below the maximum value of the FCS and the converter starts supplying current to the output circuit to counteract the decrease in the output voltage. This would increase the magnitude of an output voltage transient.

In addition, during the extra integrator recovery time a magnitude of the rate of change (i.e., a magnitude of the time derivative) of the signal x(t) would be unnecessarily increasing without a respective increase in the duty cycle. When x(t) eventually becomes smaller than the maximum value of the FCS, such excess rate of change of x(t) may cause "ringing" in the output voltage transient.

The reduction of the integrator recovery time (and thus a corresponding improvement of a transient response) may be accomplished by "clipping" the integrator output at a value sufficiently close to the maximum value of the FCS.

For example, in terms of the mathematical formalism of this section, this may be accomplished by replacing the term $$\frac{1}{T}\int dt\Delta V$$

in equations (74) and/or (89) by the following term:

$$\frac{\theta\left(-\int dt\Delta V\right)}{T}\int dt\Delta V, \qquad (94)$$

where $\theta(x)$ is the Heaviside unit step function [1].

3.4 Further Reducing Line Current Transients and Output Voltage "Ringing" During Large Low-to-High Load Steps Large low-to-high load steps may increase nonlinearities in the transient responses. For example, following a large low-to-high load step, the transient value of x(t) may cause the duty cycle to exceed the value of $D_{max}$, which may lead to instabilities, stronger line current transients, and/or excessive "ringing" in the transient voltage response.

Further reduction of line current transients and output voltage "ringing" during large low-to-high load steps may be achieved by limiting the maximum duty cycle that may be provided by the controller. This may be achieved by limiting the value of x(t). For example, as shown further in Section 3.6, one may limit ("clip") the "low" level output of the summing amplifier to a value corresponding, for a given FCS, to a maximum allowed duty cycle $D_{max}$.

Figure 28:
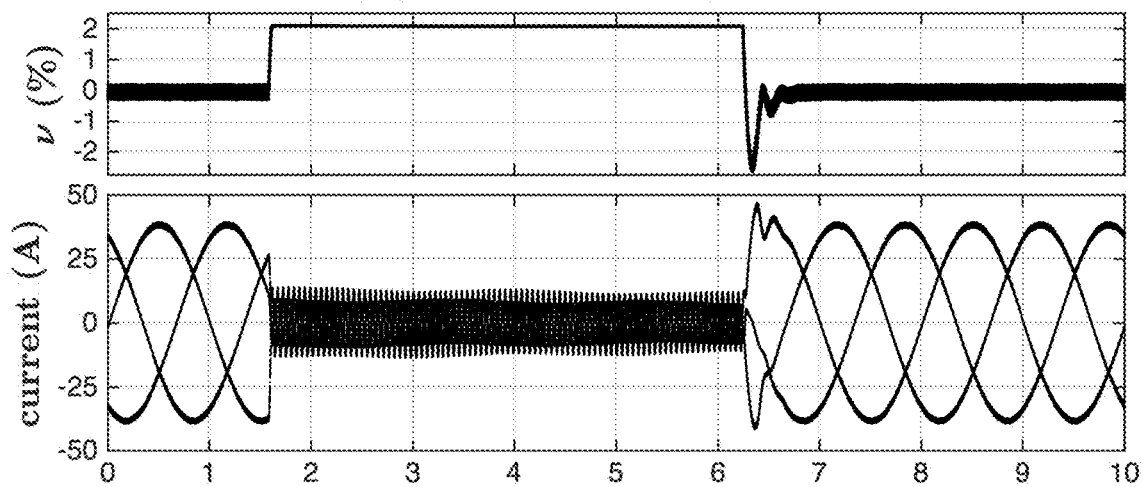
FIG. 28. Reducing line current transients and output voltage "ringing" during large low-to-high load steps (0-110% load change). ($P_{max}=8.1$ kW, $f_{sw}=144$ kHz, $f_{AC}=500$ Hz, 115 VAC/270 VDC conversion.)
Figure 28:
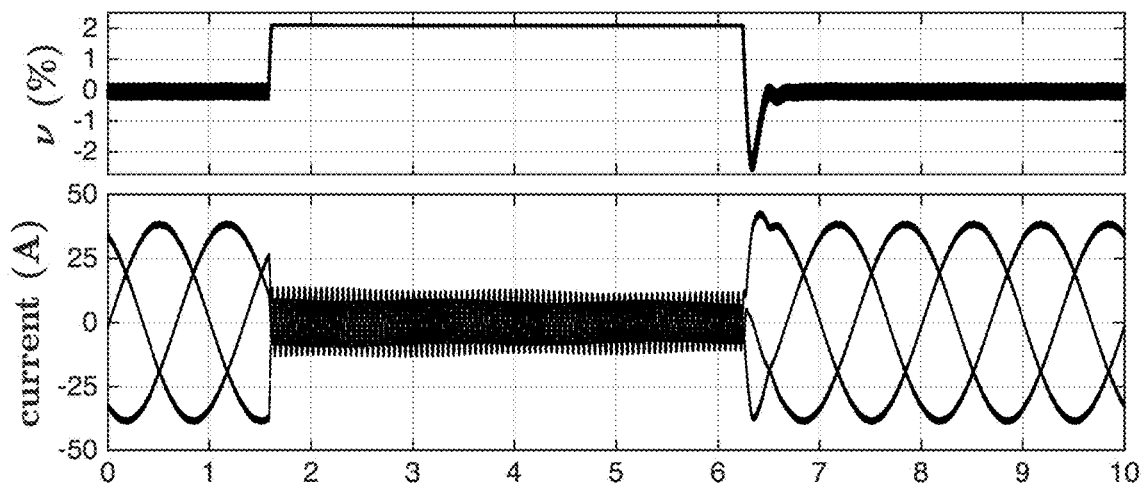
Figure 28:
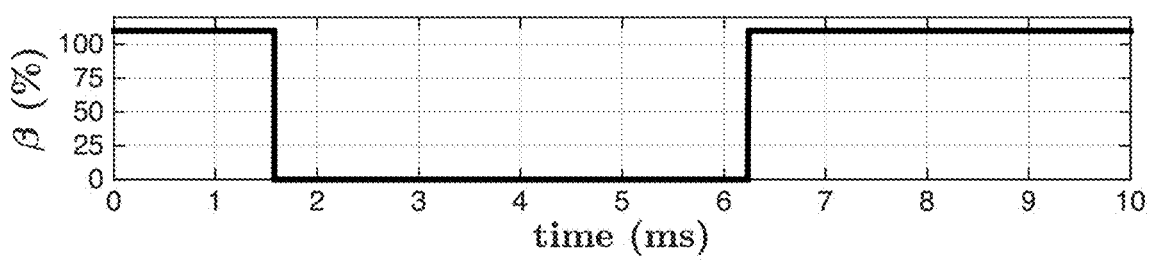

FIG. 28 provides an example of reducing line current transients and output voltage "ringing" during large low-to-high load steps (for 0-110% load change) by such clipping of the summing amplifier's output, and thus limiting the maximum allowed duty cycle. ($P_{max}$=8.1 kW, $f_{sw}$=144 kHz, $f_{AC}$=500 Hz, 115 VAC/270 VDC conversion.)

Note that limiting the maximum allowed duty cycle to $D_{max}$ would limit the maximum steady state current max ($I_{line,rms}$) drawn from an AC line to $$\max(I_{line,rms}) = \frac{1}{3}\frac{P_{max}}{V_{LN}}\left(\frac{V_{LN}}{\min(V_{LN})}\right)^2. \qquad (95)$$

3.5 Output EMI Filtering

Figure 29:
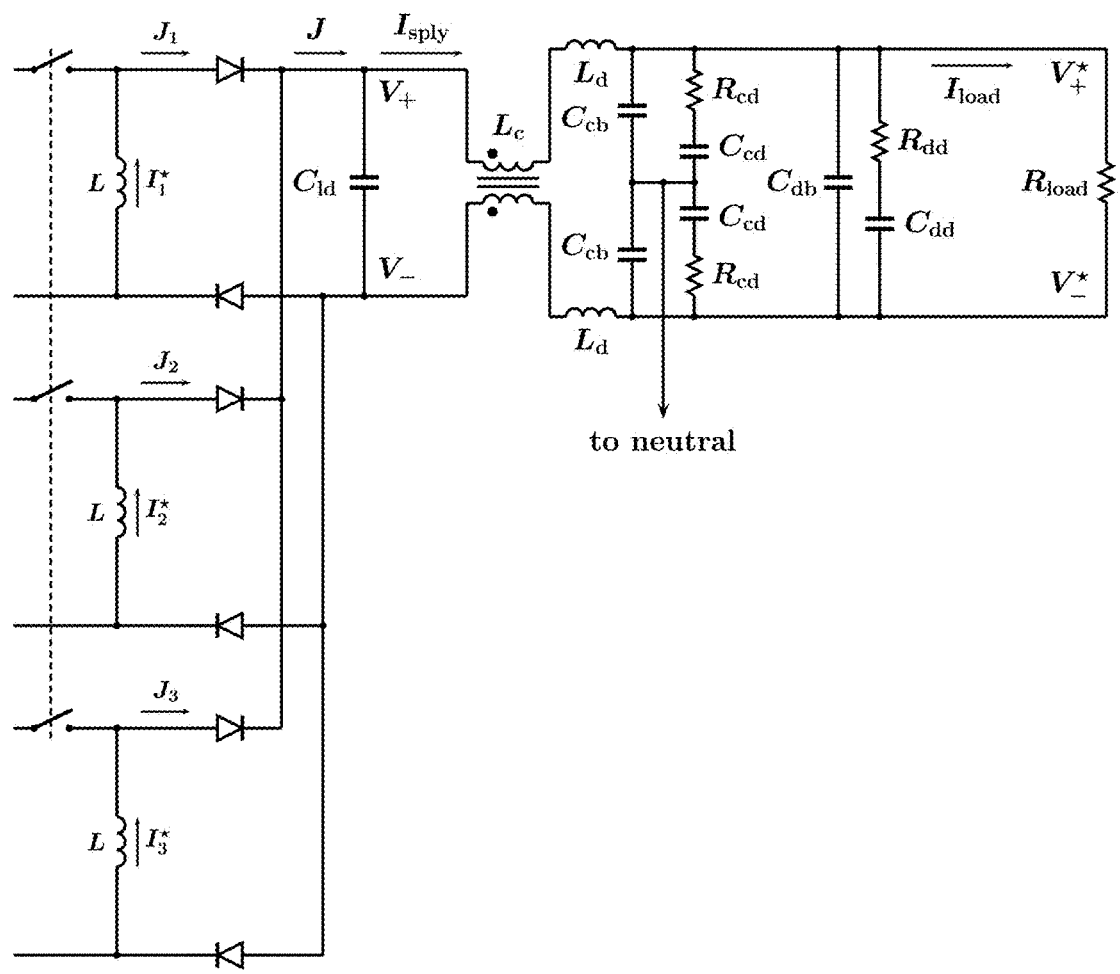
FIG. 29. Example of converter output stage with EMI filtering network.

To reduce the output common mode (CM) and differential mode (DM) EMI, an EMI filtering network may be used, such as, for example, the one illustrated in FIG. 29. As a guideline, the relations among the components in the EMI filtering network shown in FIG. 29 may be expressed as follows.

For the common and differential mode inductors and the bypass capacitors, $$L_c \gg L_d \text{ and } C_{db} \gg C_{cb}. \tag{96}$$

For example, $L_c$=4.6 mH$\gg L_d$=2.9 µH, and $C_{db}$=40 µF$\gg C_{cb}$=1 µF.

The undamped resonant frequencies for both CM and DM should be much smaller than the switching frequency, $$\frac{1}{2\pi\sqrt{2L_c C_{cb}}} \ll f_{sw} \text{ and } \frac{1}{2\pi\sqrt{2L_d C_{db}}} \ll f_{sw}. \tag{97}$$

For example, for the switching frequency $f_{sw}$=144 kHz, 1.7 kHz$\ll$144 kHz and 10 kHz$\ll$144 kHz.

The values of the damping capacitors for both CM and DM should be much larger than twice the values of the respective bypass capacitors, $$C_{cd} \gg 2C_{cb} \text{ and } C_{dd} \gg 2C_{db}. \tag{98}$$

For example, $C_{cd}$=47 µF$\gg 2C_{cb}$=2 µF, and $C_{dd}$=990 µF$\gg 2C_{db}$=80 µF.

Then the values of the damping resistors (including the ESRs of the respective damping capacitors) may be given as $$R_{cd} \approx \sqrt{\frac{L_c}{2C_{cb}}} \text{ and } R_{dd} \approx \sqrt{\frac{L_d}{2C_{db}}}. \tag{99}$$

For example, $R_{cd}$≈48Ω and $R_{dd}$≈190 mΩ.

Figure 30:
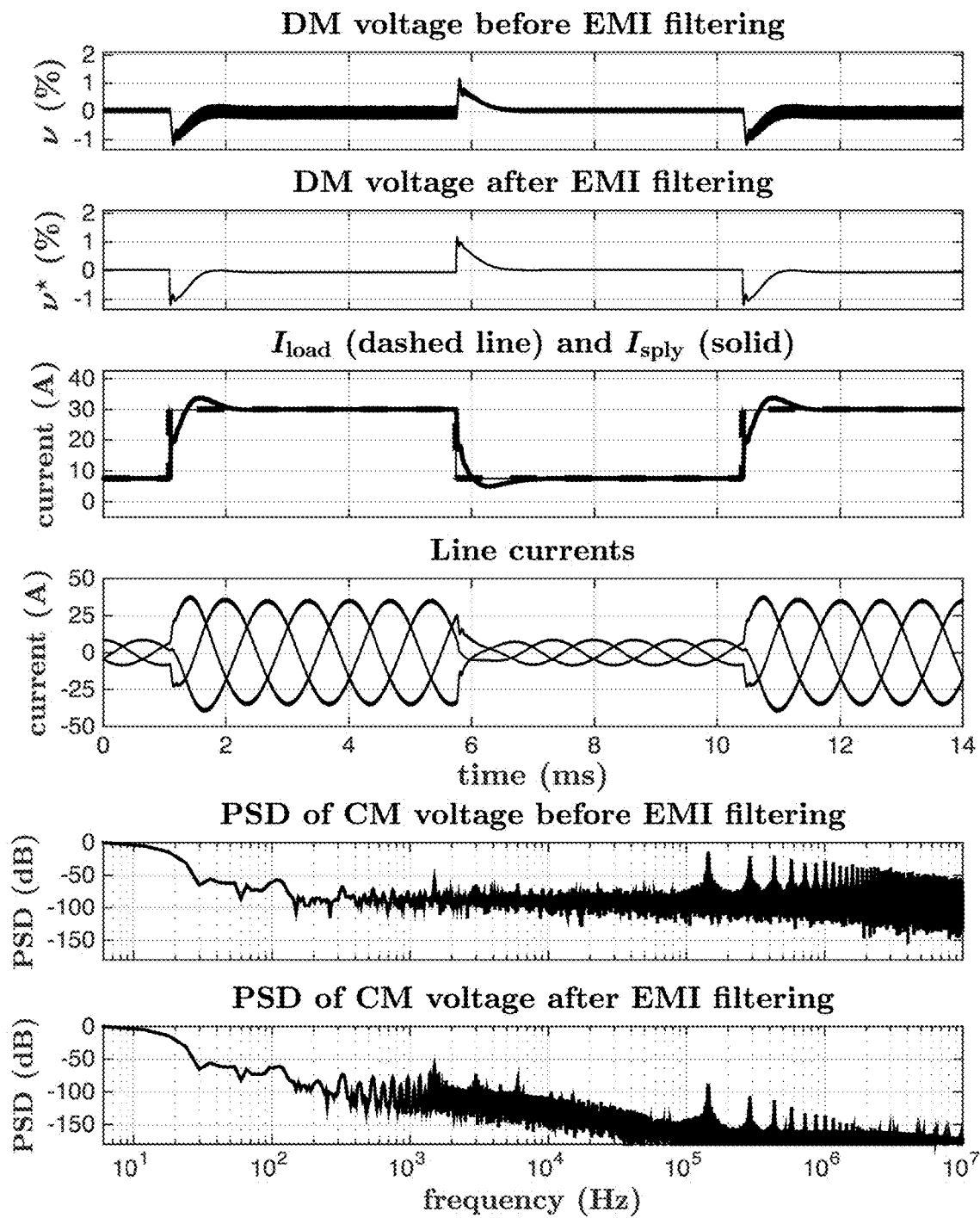
FIG. 30. Example of currents and voltages in a converter with output EMI filtering (25-100% load steps). ($P_{max}=8.1$ kW, $f_{sw}=144$ kHz, $f_{AC}=500$ Hz, 115 VAC/270 VDC conversion.)
Figure 31:
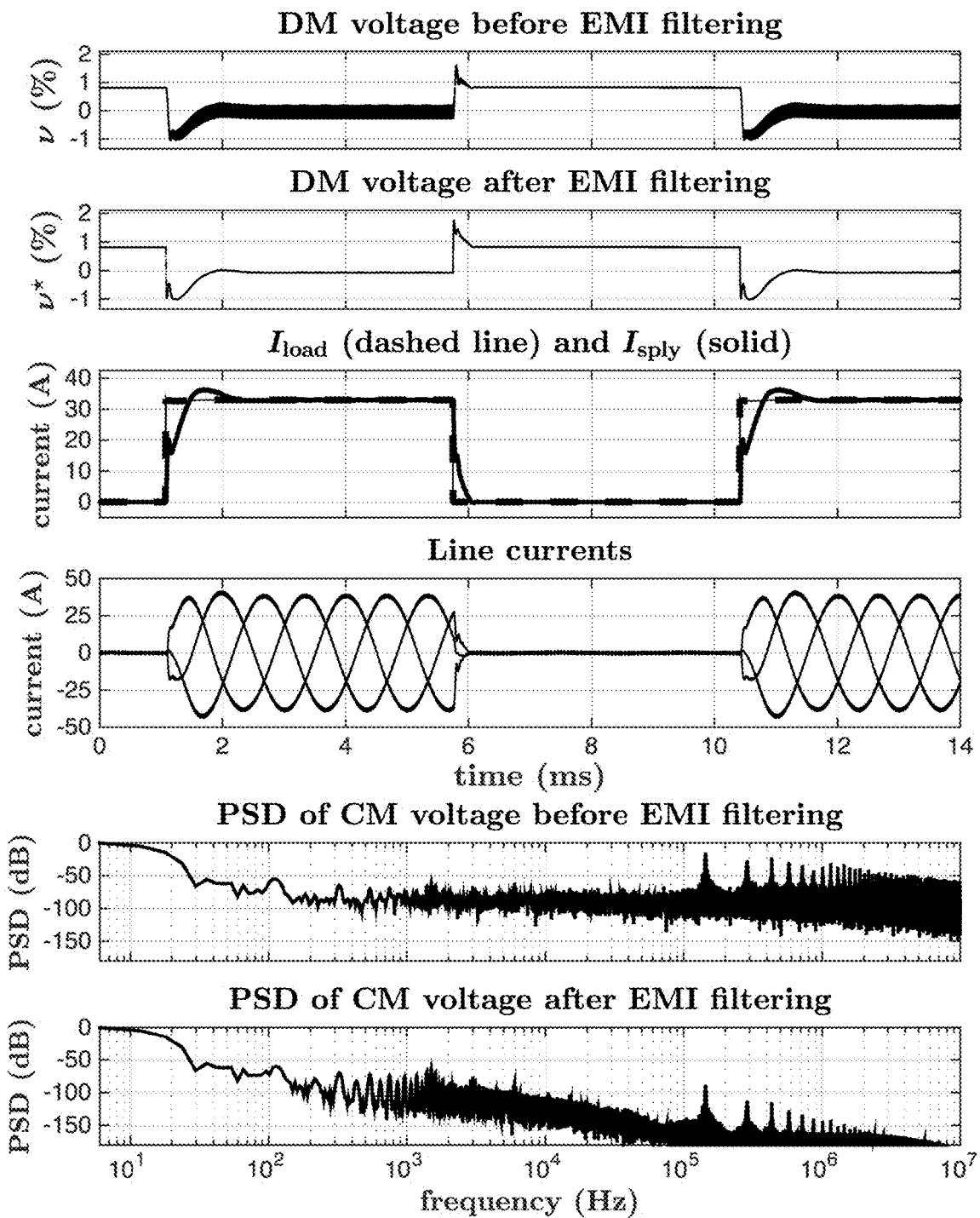
FIG. 31. Example of currents and voltages in a converter with output EMI filtering (0-110% load steps). ($P_{max}=8.1$ kW, $f_{sw}=144$ kHz, $f_{AC}=500$ Hz, 115 VAC/270 VDC conversion.)

FIGS. 30 and 31 provide examples of currents and voltages in a converter with output EMI filtering, illustrating the reduction in the CM and DM EMI. One may also note that the additional DM filtering added by the EMI filtering network further reduces transient currents and voltages. ($P_{max}$=8.1 kW, $f_{sw}$=144 kHz, $f_{AC}$=500 Hz, 115 VAC/270 VDC conversion.)

3.6 Example of Controller Circuit Implementation

Figure 32:
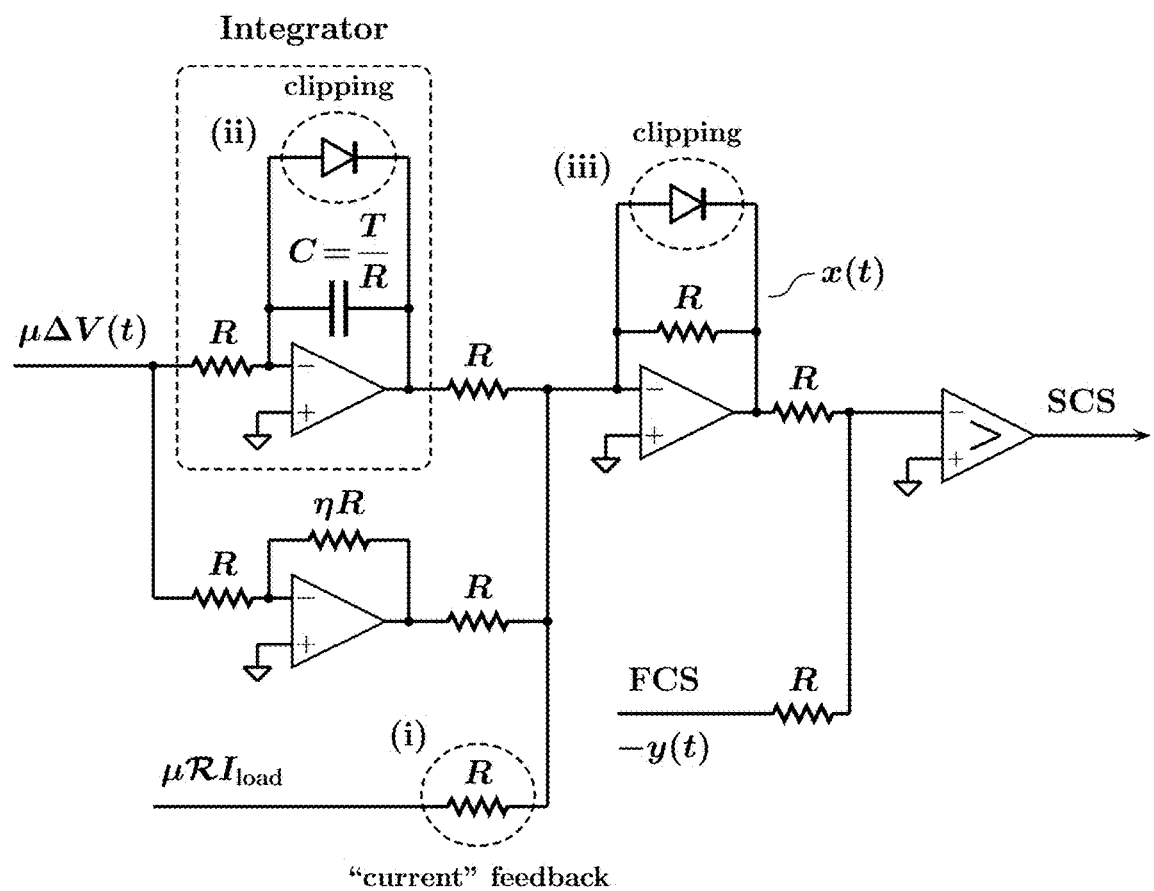
FIG. 32. Example of controller circuit implementation.

FIG. 32 provides an example of controller circuit implementation. This example shows a simplified schematic of a simple analog controller comprising (i) an integrator with time constant T=RC, (ii) a proportional amplifier with gain η (iii) a unit gain summing amplifier, (iv) a comparator outputting a switch control signal (SCS), and (v) a means to provide a frequency control signal (FCS) and an optional current feedback signal.

This schematic also shows a means to limit ("clip") the negative outputs of the integrator and the summing amplifier. In this example, it is accomplished by simple diode clipping.

One may see that, if −y(t) is the FCS, then the comparator input would be y(t)−x(t), where x(t) may be expressed, ignoring the clipping, as $$x = \mu\left[\eta\Delta V - \mathcal{R} I_{load} + \frac{1}{T}\int dt \Delta V\right]. \tag{100}$$

If, as shown in FIG. 32, a simple diode clipping is used, then for a simple sine wave FCS and $D_{max}$≈½, y(t) may be expressed as $$y(t) = A\sin(2\pi f_{sw} t) + \frac{A}{2}, \tag{101}$$

where Λ may be set to approximately twice the value of the forward voltage drop of the diode. For example, for a small silicon diode, A may be about 1.2 V to 1.4 V.

In practice, if the diode clipping is used, one may want to use "asymmetrical" clipping (e.g., the clipping in the summing amplifier may be accomplished by two diodes in series), so that the clipping diode in the integrator feedback would remain in reversed-biased mode for a wider range of output powers and the integrator's DC gain would remain high. For two diodes in series in the feedback of the summing amplifier, y(t) may be expressed as $$y(t) = 3/2A \sin(2\pi f_{sw} t) + A. \tag{102}$$

In FIG. 32, a feedback signal indicative of the load current (i) would allow to improve the overall transient response, the integrator output clipping (ii) would allow to improve the light-load behavior and the low-to-high transients, and the summing amplifier clipping (iii) would provide the duty cycle limiting, allowing to improve the voltage and current transients for large-amplitude low-to-high transitions. In addition, the duty cycle limiting would limit the maximum steady state current drawn from the mains according to equation (95).

4 Additional Discussion of ULSR Converter, its Modifications, and Properties

4.1 Scaling to Different Range of Output Powers

A buck-boost 3-phase AC-to-DC converter disclosed above may be referred to as an Ultra Linear Switching Rectifier (Unit), or ULSR(U).

"Ultra" may refer to very or extremely, "linear" may refer to proportional relation between input currents and voltages, and thus imply high PF and low THD, "switching" may refer to active (solid state) switching, and "rectifier" may refer to AC-to-DC conversion.

As has been disclosed, an AC-to-DC converter according to the current invention may be configured to provide AC-to-DC conversion for a wide range of line and switching frequencies, output powers, and voltage conversion ratios, and the values of the converter components and the controller parameters may be chosen according to the provided disclosure, based on the desired performance specifications.

For example, given a converter (and the associated controller) designed for given input AC and the output DC voltages, line frequency range, switching frequency, and output power range, it may be desirable to re-scale the output power range provided by the converter.

A straightforward way to re-scale the values of the converter components and the controller parameters of a converter designed for $P_{max}$=$P_1$ to a larger range of output powers, $P_{max}$=$P_2$>$P_1$ may be as follows:
(i) obtain the scaling coefficient K as K=$P_2$/$P_1$>1,
(ii) decrease all inductor values (e.g., the converter inductors L and the line inductors $L_l$) by a factor of K,
(iii) increase all capacitor values (e.g., the virtual neutral capacitors C and the output capacitor $C_{ld}$) by a factor of K, and (iv) decrease the "current feedback" coefficient $\mathcal{R}$ by a factor of K.

Then, for a proportionally scaled output power (i.e., for $P_{out}=\beta P_{max}$) the respective node voltages in the "new" converter would remain effectively the same as in the "old" converter (that is, ignoring changes in the voltage drops across the components due to the changes in the currents through the components), while the respective currents would be effectively increased by a factor of K.

4.2 Limiting Maximum Voltages Across Switches

When the switch in a ULSR section is turned off, the voltage across the switch would be the sum of the voltages across the output of the bridge and across the converter inductor. In a ULSR built of ideal components, the maximum value of such voltage may be easily determined. For example, for the 1st section in FIG. 1, the maximum voltage across the switch may be expressed as $V_{out}$+max($|V+V_b|$)=$V_{out}+V_{LN}\sqrt{6}$.

The virtual neutral capacitors in the line LC filtering network (see FIG. 6) increase this voltage to $V_{out}$+max$(|V_a^*+V_b^*|)$>$V_{out}+V_{LN}\sqrt{6}$. Further, parasitic elements (such as, e.g., parasitic capacitances) in a practical ULSR may cause this voltage to be noticeably higher.

Figure 33:
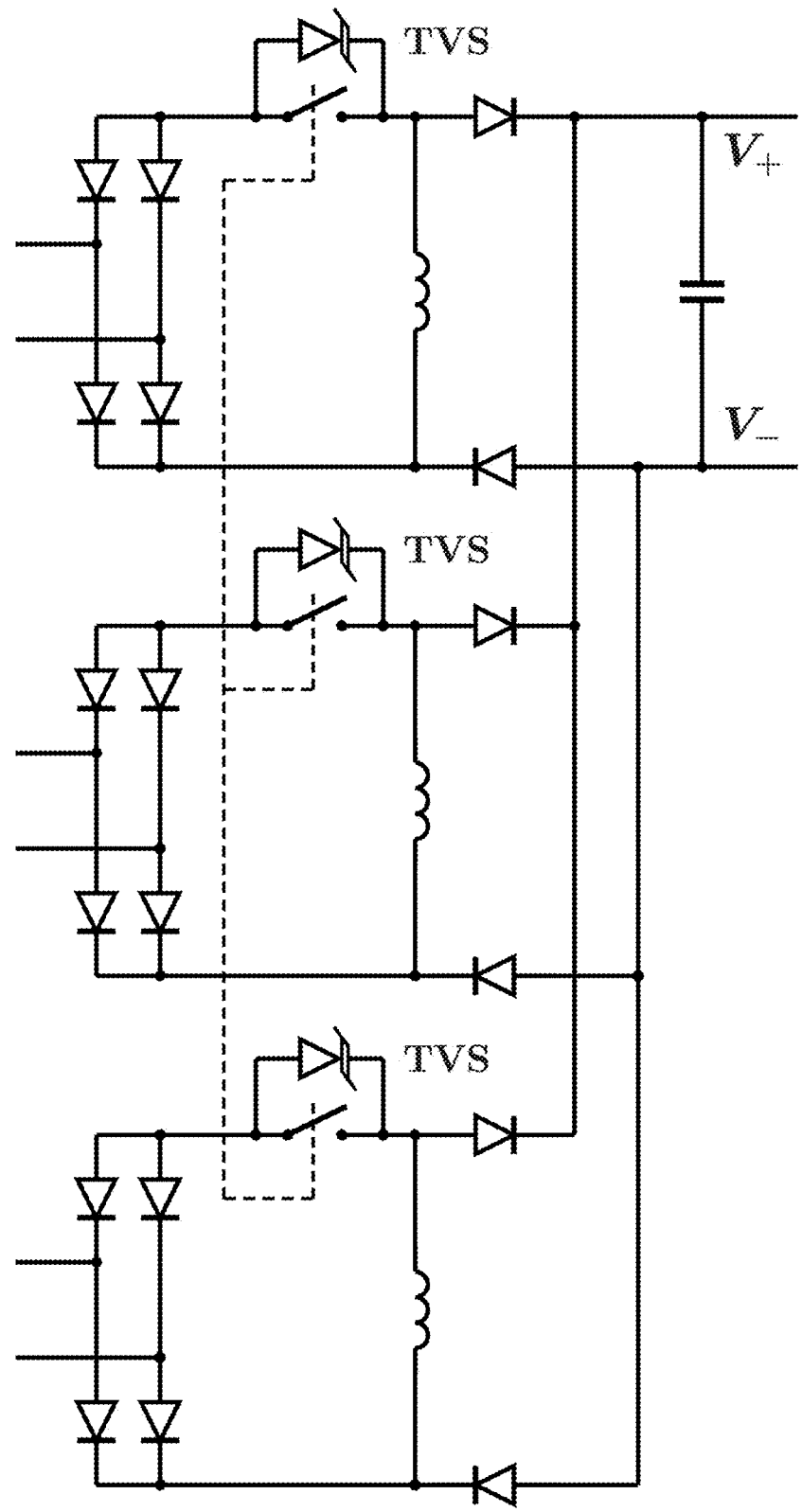
FIG. 33. Limiting maximum voltages across switches by TVS diodes.

Power MOSFET switches may have a maximum specified drain to source voltage (when turned off), beyond which breakdown may occur. Exceeding the breakdown voltage may cause the device to conduct, potentially damaging it and other circuit elements due to excessive power dissipation. Then a transient voltage suppressor (TVS) device, for example, a transient voltage suppression diode may be used to limit the maximum voltage across a switch. FIG. 33 illustrates limiting maximum voltages across switches in a ULSR by TVS diodes.

4.3 Operation Under Heavily Unbalanced Mains Voltages and/or in Case of Mains Failure A ULSR converter would normally exhibit reliable behavior under heavily unbalanced mains voltages and/or in case of mains failure. For example, under a single-phase outage, a ULSR would be capable of providing approximately ⅔ of its nominal maximum power with a moderate degradation of the power quality.

Proper modification of the ULSR controller parameters (such as, e.g., increasing the integrator time constant T and/or decreasing the gain η), may provide ULSR operation under heavily unbalanced mains voltages and/or in case of mains failure without significant, if any, degradation of the power quality.

4.4 Parallel Connections to Increase Power and/or to Provide N+1 Redundancy

It may be desirable to connect two or more different AC-to-DC converters in parallel to increase output power and/or to provide N+1 redundancy. The present invention enables such "paralleling" of converters with the same and/or different power ratings that would not require tight output voltage matching or active means to "force" current sharing.

Figure 34:
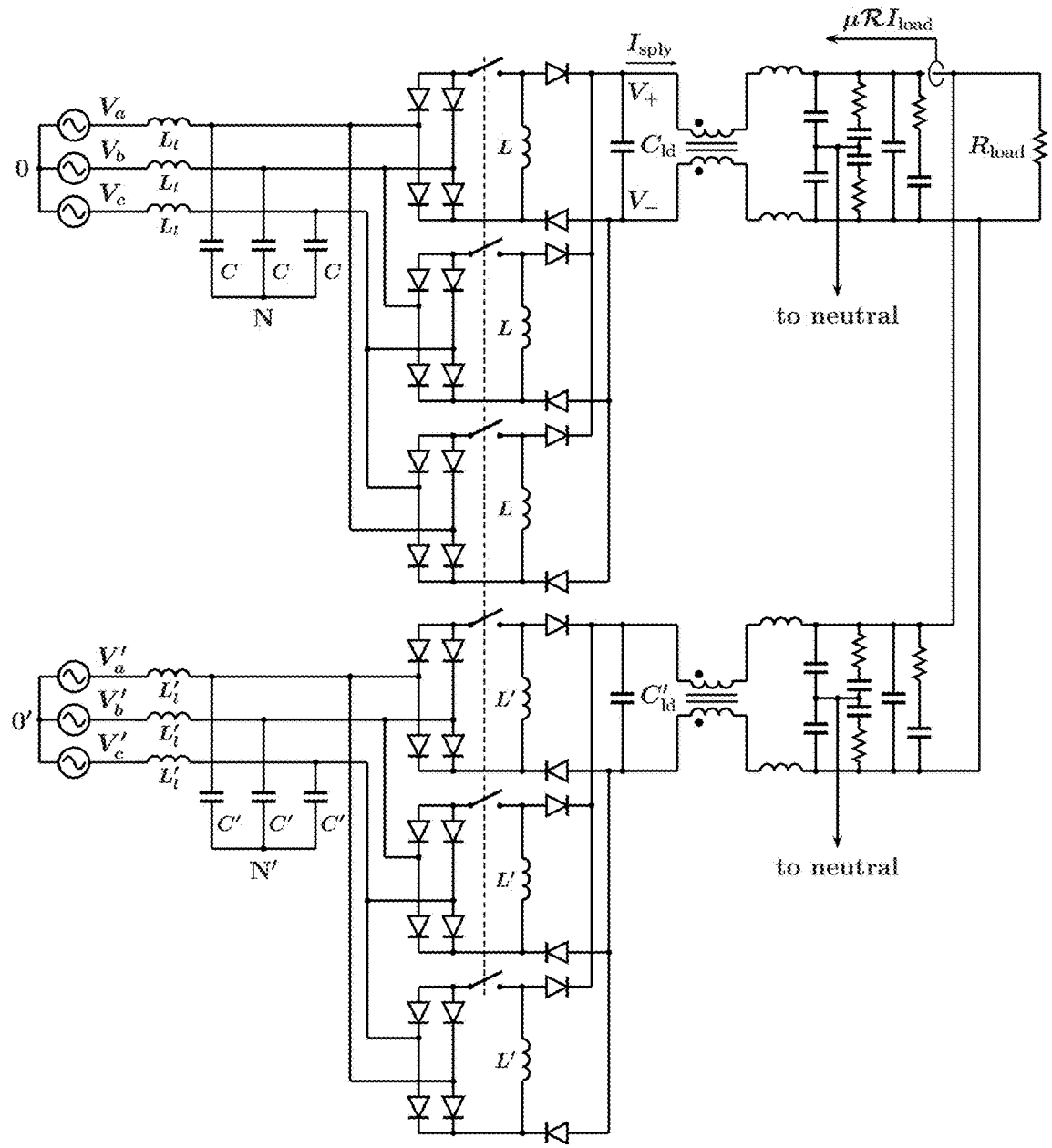
FIG. 34. Example of parallel connection of two different ULSR converters.

FIG. 34 provides an example of connecting two ULSR units in parallel. As indicated by the dashed line in the figure, all switches operate synchronously, i.e., they are "on" and/or "off" at effectively the same time. For example, all switches may be turned "on" and/or "off" by the same SCS provided, e.g., by the controller of one of the units.

For simplicity, it may be assumed that the line-to-neutral source voltages have effectively the same RMS values (but not necessarily the line frequencies, which may be different). For example, the units may be connected to the same 3-phase AC source. We may further assume that the values of the components and the controller parameters of a converter unit are chosen according to the current invention. Then the arrangement shown in FIG. 34 may be (somewhat simplistically) viewed as a single ULSR unit wherein the value of the converter inductor may be expressed as LL'/(L+L').

Similarly, N different converter units connected in parallel may be viewed to be akin to a single unit wherein the value of the converter inductor may be expressed as $1/\Sigma_{i=1}^{N} L_i^{-1}$, where $L_i$ is the converter inductor value for the ith unit. For example, four effectively identical units with the converter inductor value L connected in parallel would be akin to a single converter unit with the converter inductor value L/4.

If $P_i$ is the maximum output power of the ith unit, and $\beta P_i$ is the power provided to the load by the ith unit, then the total power $P_{out}$ provided to the load by N different converter units connected in parallel would be effectively $P_{out}=\beta\Sigma_{i=1}^{N} P_i$.

4.5 Stepping Output Voltage Up or Down with Autotransformer

Given the output power rating of an ULSR, its output voltage may be changed, while effectively preserving the voltage and current relations for the line inductors, virtual neutral capacitors, diode bridges, and the switches, by replacing converter inductors by autotransformers.

Figure 35:
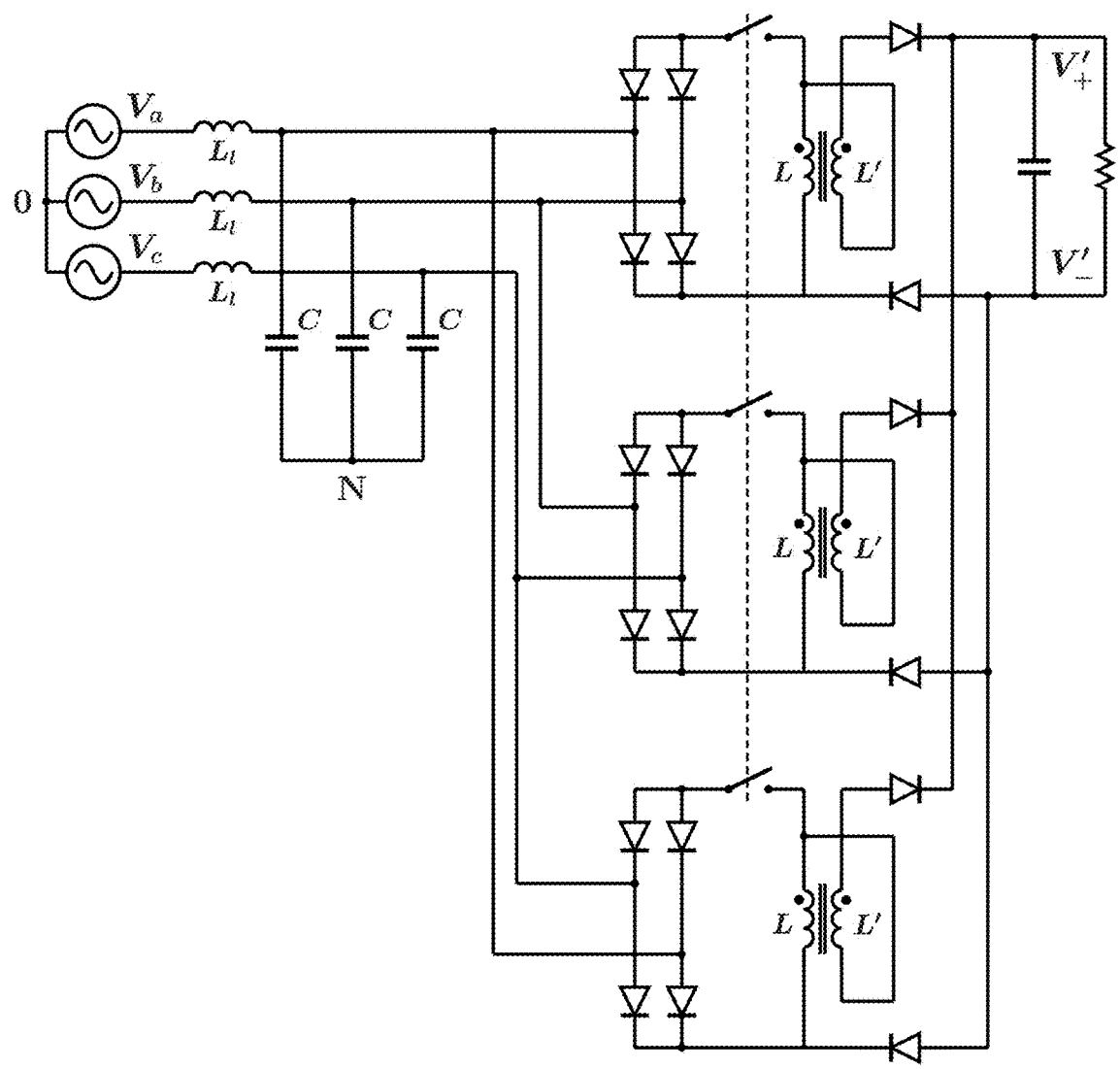
FIG. 35. Idealized circuit diagram (without an output EMI filtering network) of an ULSR unit with step-up autotransformers replacing the converter inductors to increase the output voltage.

For example, FIG. 35 provides an idealized circuit diagram (without an output EMI filtering network) of an ULSR unit with step-up autotransformers replacing the converter inductors to increase the output voltage.

For a given output power, switching frequency, and the duty cycle, the output voltage $V_{out}'=V_+'-V_-'$ of the ULSR shown in FIG. 35 would be $$V_{out}' = V_{out}\left(1 + \sqrt{\frac{L'}{L}}\right), \tag{103}$$

where $V_{out}=V_+-V_-$ is the output voltage of the "base" ULSR (e.g., shown in FIG. 6) with the same component values (and the converter inductor value equal to L).

4.6 Boost 3-Phase AC-to-DC Converter

Figure 36:
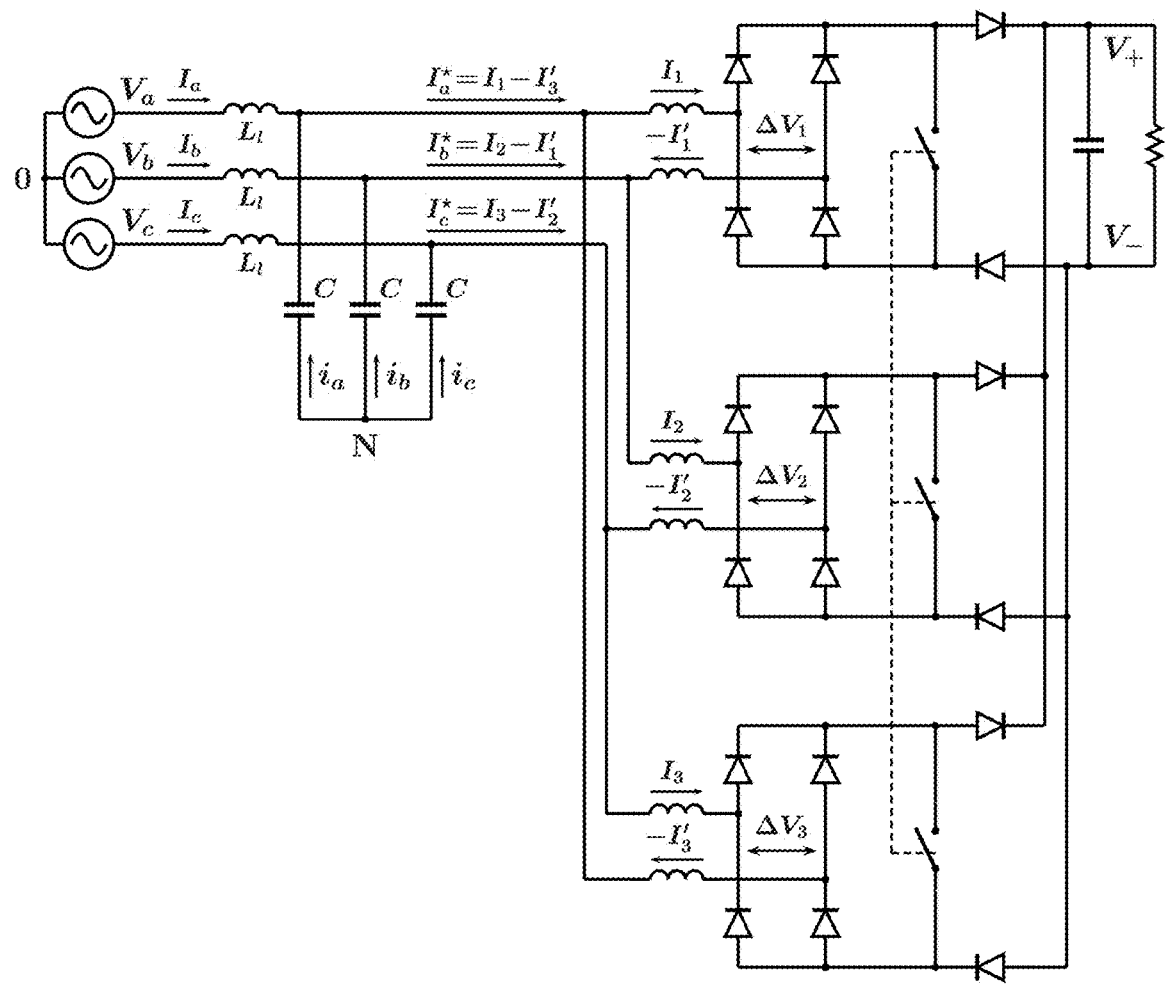
FIG. 36. 3-phase boost AC-to-DC converter, with an LC filtering network inserted between the voltage sources and the power stage of the converter.

For large voltage conversion ratios (e.g., $V_{out}/V_{LN}$>6 $\sqrt{6}/\pi$) one may use a boost converter topology, as illustrated in FIG. 36. While this configuration may not be able to achieve extremely low THD levels of a ULSR, it still would share some of the main advantages of a non-isolated ULSR topology.

One skilled in the art will recognize that a detailed analysis of the behavior and properties of such a converter may be performed in a manner similar to the rest of the disclosure herein.

Isolated Buck-Boost 3-Phase AC-to-DC Converter

Figure 37:
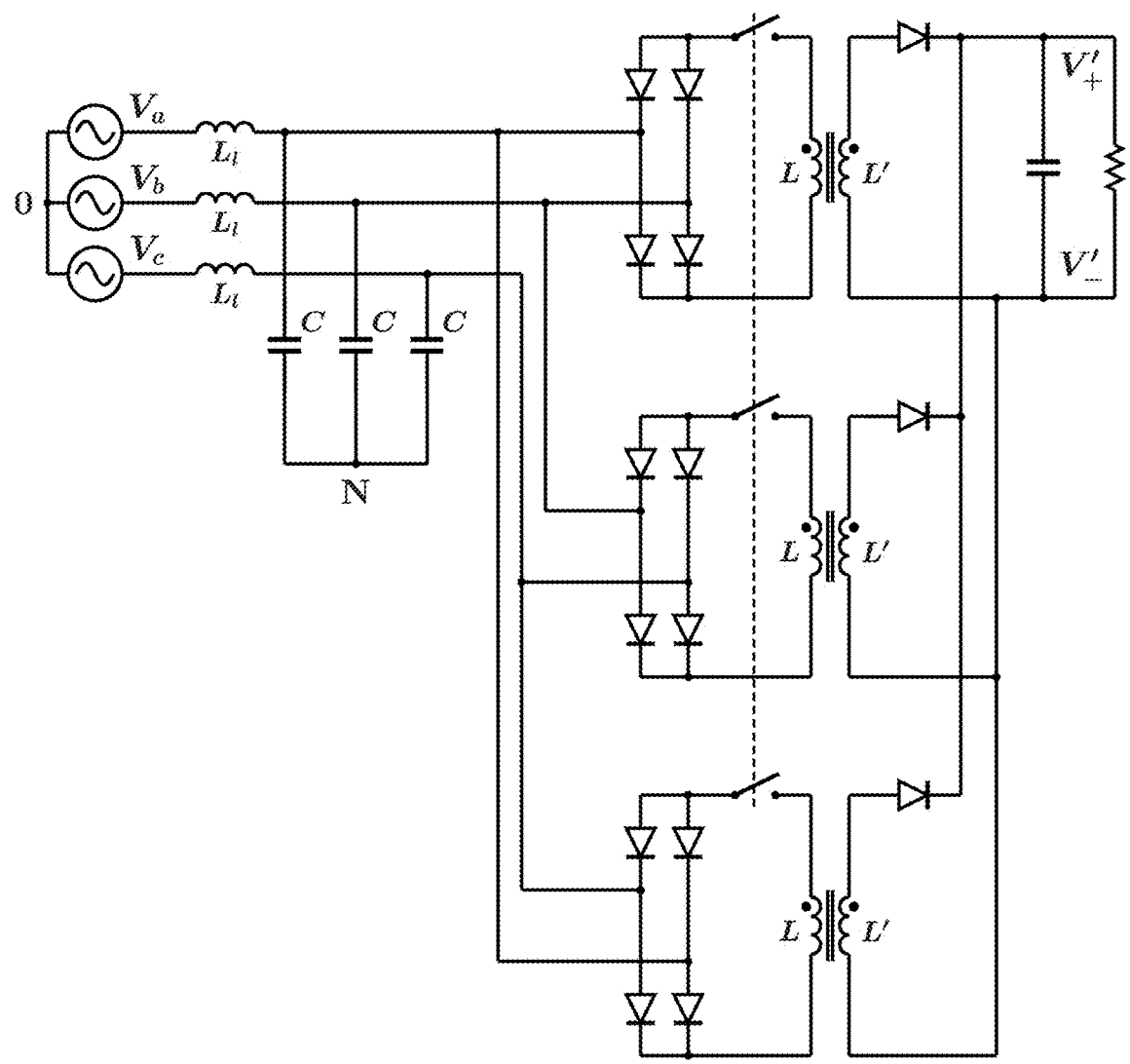
FIG. 37. Idealized circuit diagram of an Ultra Linear Isolated Switching Rectifier (ULISR).

A non-isolated ULSR disclosed herein may be converted into an isolated configuration by replacing converter inductors by transformers (flyback transformers), as illustrated in FIG. 37. We may refer to such an isolated buck-boost 3-phase AC-to-DC converter as an Ultra Linear Isolated Switching Rectifier, or ULISR.

For a given output power, switching frequency, and the duty cycle, the output voltage $V_{out}'=V_+'-V_-'$ of the ULISR shown in FIG. 37 would be $$V_{out}' = V_{out}\sqrt{\frac{L'}{L}}, \quad (104)$$

where $V_{out}=V_+-V_-$ is the output voltage of the "base" non-isolated ULSR (e.g., shown in FIG. 6) with the same component values (and the converter inductor value equal to L).

One may note that in a ULISR (i) only one out of two output diodes would be needed, (ii) either positive or negative output terminal may be connected to ground, and (iii) an output CM EMI filter would be unnecessary.

6 Mitigating the Effects of Parasitic Capacitances of Semiconductor Components and of Bridge Voltage Drops Note that in the previous sections of this disclosure we have neglected non-idealities of the components in a ULSR, such as their parasitic capacitances. As a result, we have assumed zero current in the reverse-bias direction of the diodes, and zero current through open switches. In addition, we have assumed DCM operation, and thus that the current in, and the voltage across, the converter inductor in each section are zero at the beginning (and, therefore, at the end) of any switching interval.

However, parasitic capacitances of the diodes and the switches (e.g., MOSFET power switches) may invalidate these assumptions. For example, in a ULSR section, the converter inductor and the parasitic capacitances of the reversed-biased bridge and output diodes, and of the open switch, would form a parallel LC circuit that may have significant "residual" current and voltage oscillations after the current in the converter inductor falls to zero. As a result, when the switch in the section is turned "on" (and depending on the instance of time the switch is turned "on" in relation to said oscillations), the current drawn from an AC line may be smaller or larger than the current drawn from the AC line when the current in, and the voltage across, the converter inductor are zero at the beginning of a switching interval.

In addition, the output diodes in a ULSR section may not become forward-biased at the same time after the switch is turned "off". As a result, there may be noticeable non-zero CM section currents, as currents flowing in and out of a ULSR section may not be of equal magnitude.

Figure 38:
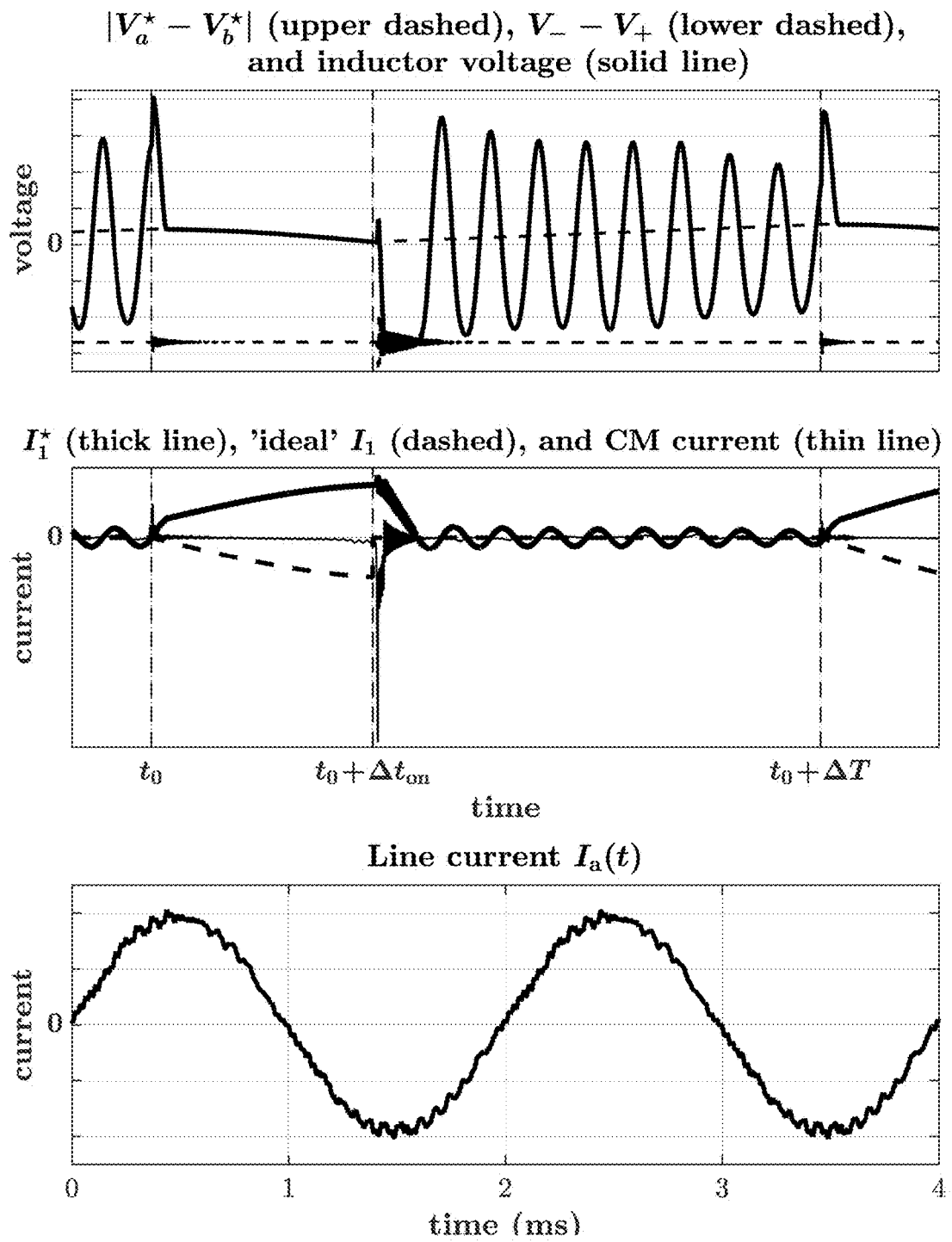
FIG. 38. Illustration of effects of parasitic capacitances on the 1st section converter inductor voltage and current, and on the line current.

FIG. 38 illustrates such effects of parasitic capacitances on the 1st section converter inductor voltage and current, and on the line current. (The "ideal" input section current $I_1$ is the current that would be drawn by the section in the absence of the parasitic capacitances.) One may see in FIG. 38 that these effects cause distortions in the line current, increasing the THD ($\approx$4% in the figure).

One may note that relative magnitude of the effects just discussed on the AC line currents would be larger when magnitudes of line-to-line voltages applied to ULSR sections are smaller, e.g., close to zero. In addition, when the magnitude of the line-to-line voltage applied to a ULSR section is relatively small, the forward voltage drops in bridge diodes would cause a more noticeable deviation from proportionality between the average current supplied to the section during a switching interval and the voltage applied to the section during this interval, causing increase in the THD.

One may also note that if the parasitic capacitances are sufficiently small so that the average period of the residual current and voltage oscillations is much smaller than the "on" time interval $\Delta t_{on}$, then the effect of the parasitic capacitances on the THD may be negligible. Indeed, the magnitude of the current oscillations and the CM currents would then be relatively small, and the voltage oscillations would not have a significant effect on timing of the bias change of the diodes.

To mitigate the effects of relatively large parasitic capacitances, one may want (i) to ensure that the current in, and the voltage across, converter inductors in each ULSR section are effectively zero at the beginning (and, therefore, at the end) of any switching interval, and (ii) to ensure that the CM currents in each section are effectively zero.

Figure 39:
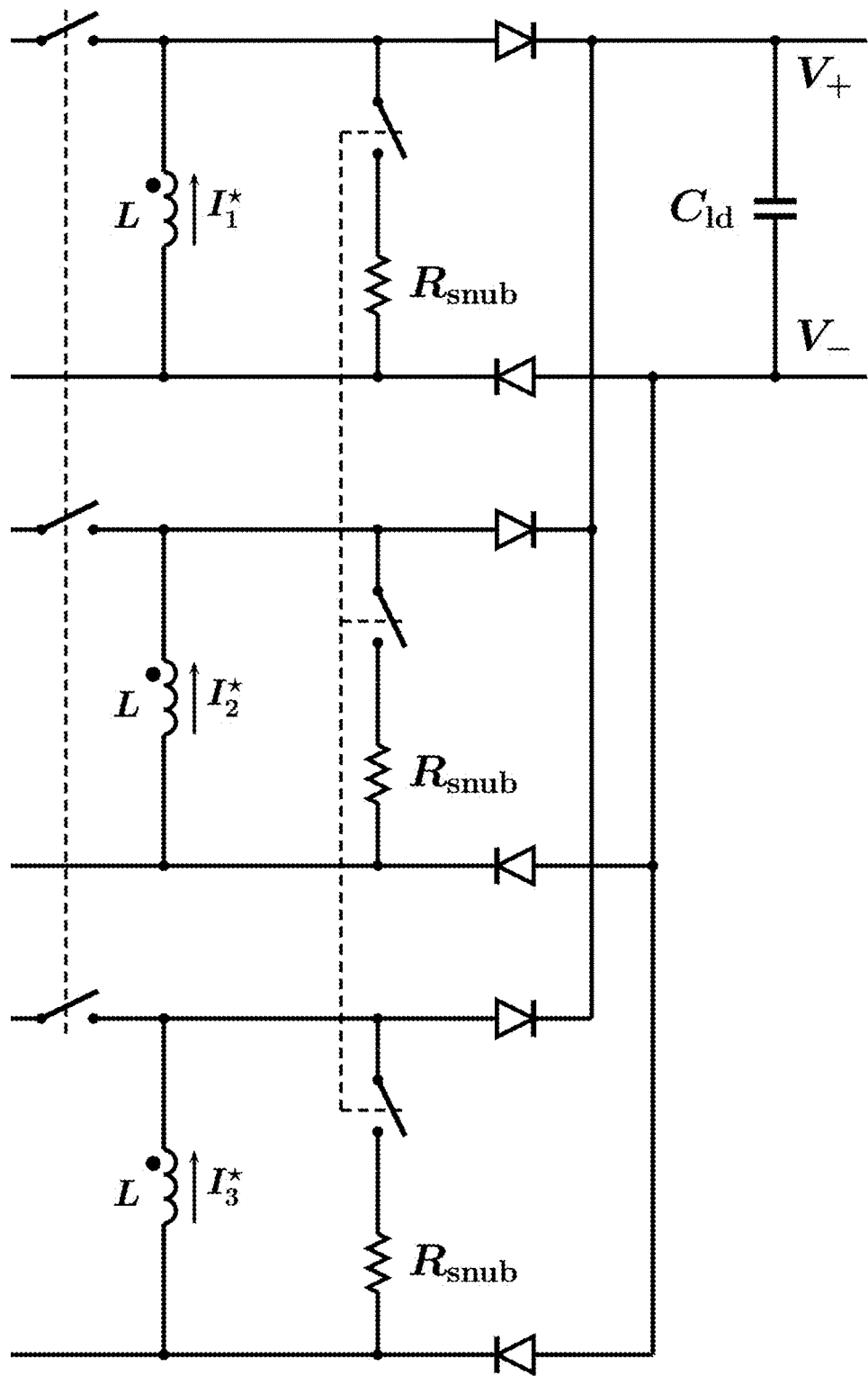
FIG. 39. Example of an active snubber to ensure that the current in, and the voltage across, converter inductors in each ULSR section are effectively zero at the beginning and the end of any switching interval.

FIG. 39 provides an example of an active "snubber" that may be used to ensure that the current in, and the voltage across, converter inductors in each ULSR section are effectively zero at the beginning and the end of any switching interval. In such a snubber, the value of $R_{snub}$ may be chosen to provide approximately critical damping for the parallel LC circuit formed by the converter inductor and the parasitic capacitances of the reversed-biased bridge and output diodes, and of the open switch. Then the snubber switches may be turned "on" for a time interval $\Delta t_{snub}$ immediately preceding time $t_0$ (when the ULSR power switches are turned "on"). One skilled in the art will recognize that $\Delta t_{snub}$ may be close in magnitude to the average period of the residual current and voltage oscillations.

Figure 40:
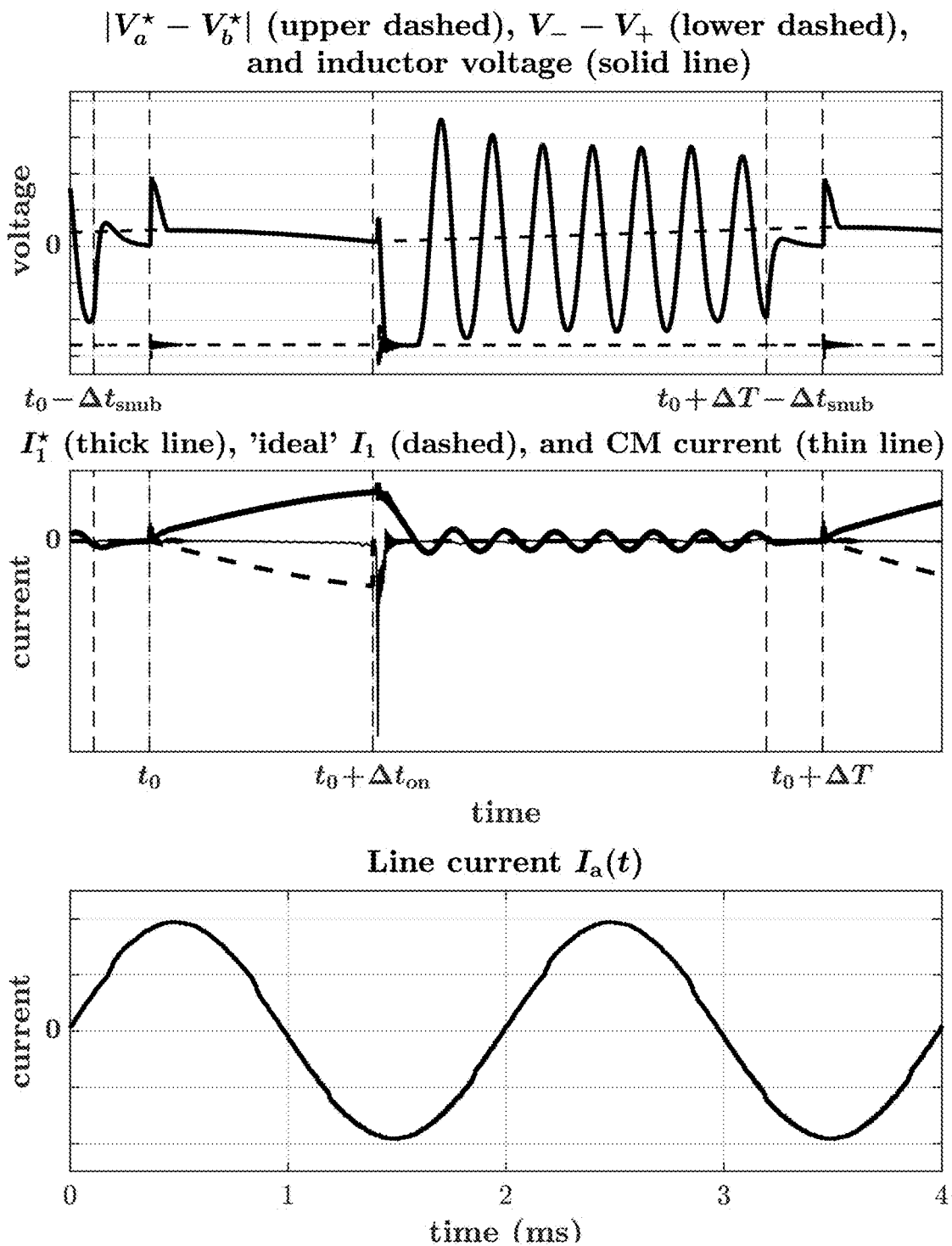
FIG. 40. Illustration of reducing the effects of parasitic capacitances on the inductor voltage and current, and on the line current, by an active snubber shown in FIG. 39.

FIG. 40 illustrates reduction of the effects of parasitic capacitances on the inductor voltage and current, and on the line current, by an active snubber shown in FIG. 39. In a switching cycle, the snubber switches are turned "on" at time $t_0+(\Delta T-\Delta t_{snub})$ and turned "off" at time $t_0+\Delta T$, at the end of the switching interval. Then, as one may see in FIG. 40, the magnitudes of the current and voltage oscillations decay to effectively zero values by the beginning of the next switching cycle, making the current drawn from the mains closer to the "ideal" input section current and reducing the THD (e.g., $\approx$1.9% in FIG. 40 as opposed to $\approx$4% in FIG. 38).

Figure 41:
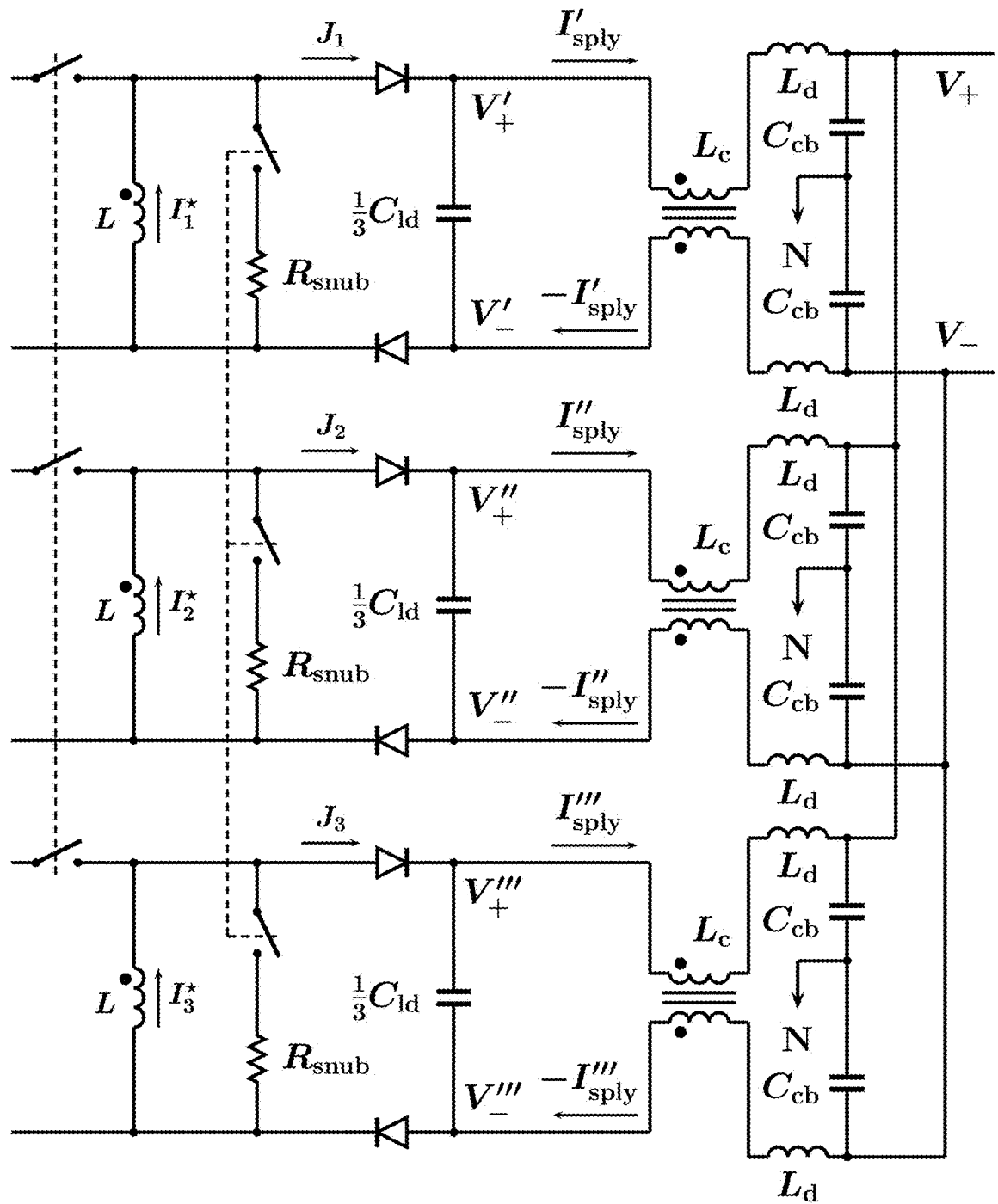
FIG. 41. Example of CM section chokes added to reduce CM section currents.
Figure 42:
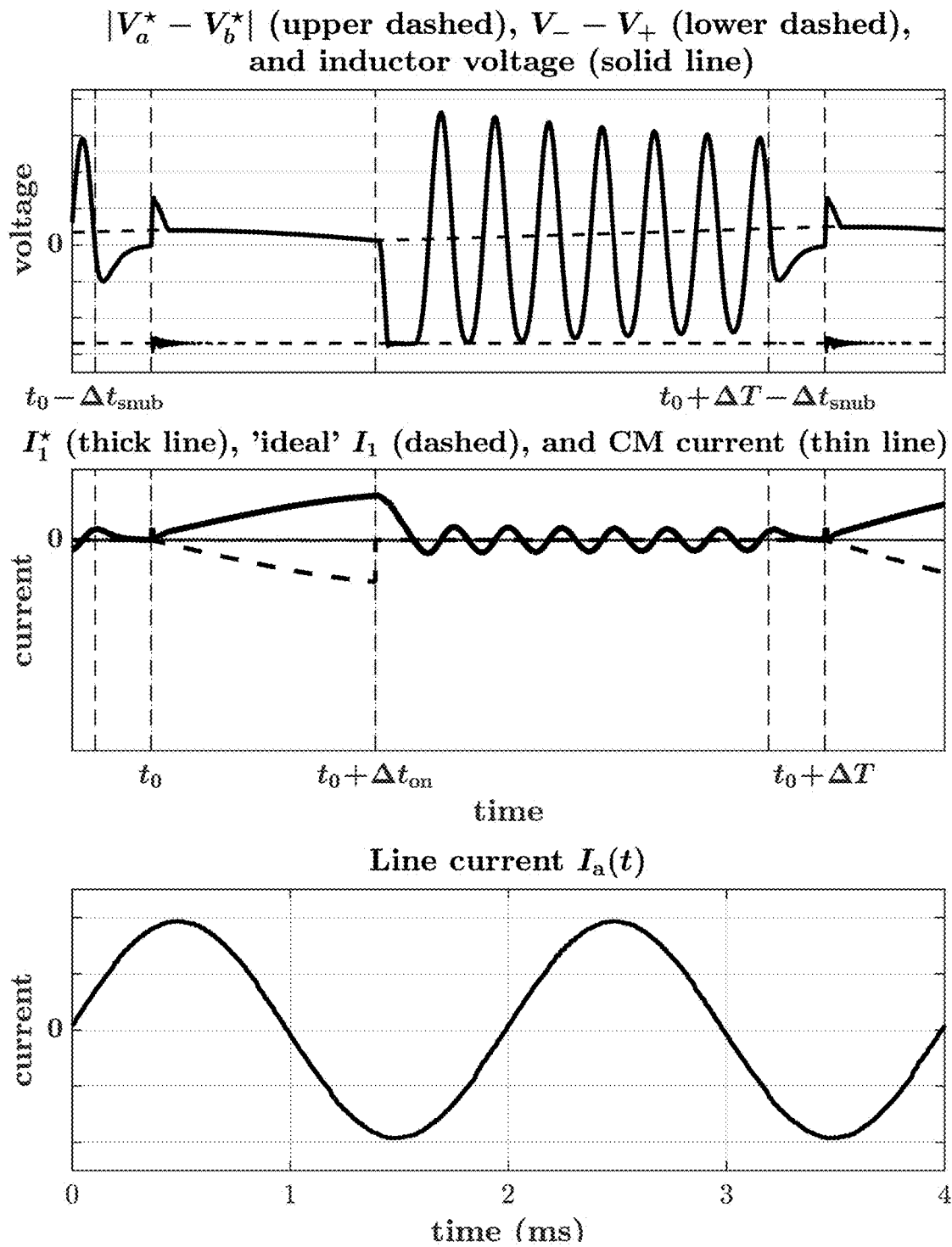
FIG. 42. Illustration of reducing the effects of parasitic capacitances on the inductor voltage and current, and on the line current, by an active snubber and CM section chokes, as shown in FIG. 41.

One may see in FIG. 40 that the CM section currents remain unaffected by the snubber, and may note that the CM effects are the most noticeable at small values of line-to-line voltages. To reduce the CM section currents, one may deploy inductive CM chokes at the outputs of the ULSR sections, as illustrated in FIG. 41. As one may see in FIG. 42, such chokes may effectively eliminate the CM section currents, further reducing the THD (e.g., $\approx$0.7% in FIG. 42 as opposed to $\approx$1.9% in FIG. 40).

Note that in a ULISR the CM effects would not represent a problem, and only active snubbers would need to be employed to mitigate the effects of parasitic capacitances, by ensuring effectively zero currents and voltages on both primary and secondary sides of the flyback transformers at the beginning and the end of any switching interval.

6.1 Further Reduction of THD in ULSR by Introducing Coupling Among Converter Inductors As was discussed earlier, when the magnitude of the line-to-line voltage applied to a ULSR section is relatively small, the forward voltage drops in bridge diodes would cause a more noticeable deviation from proportionality between the average current supplied to the section during a switching interval and the voltage applied to the section during this interval, causing increase in the THD. To compensate for such bridge voltage drops, one may introduce small (e.g., of order 1%) intentional coupling among the converter inductors, with the mutual polarity as indicated by the phase dots in FIGS. 39 and 41. Such appropriately chosen coupling may further reduce the THD and increase ULSR efficiency.

Figure 43:
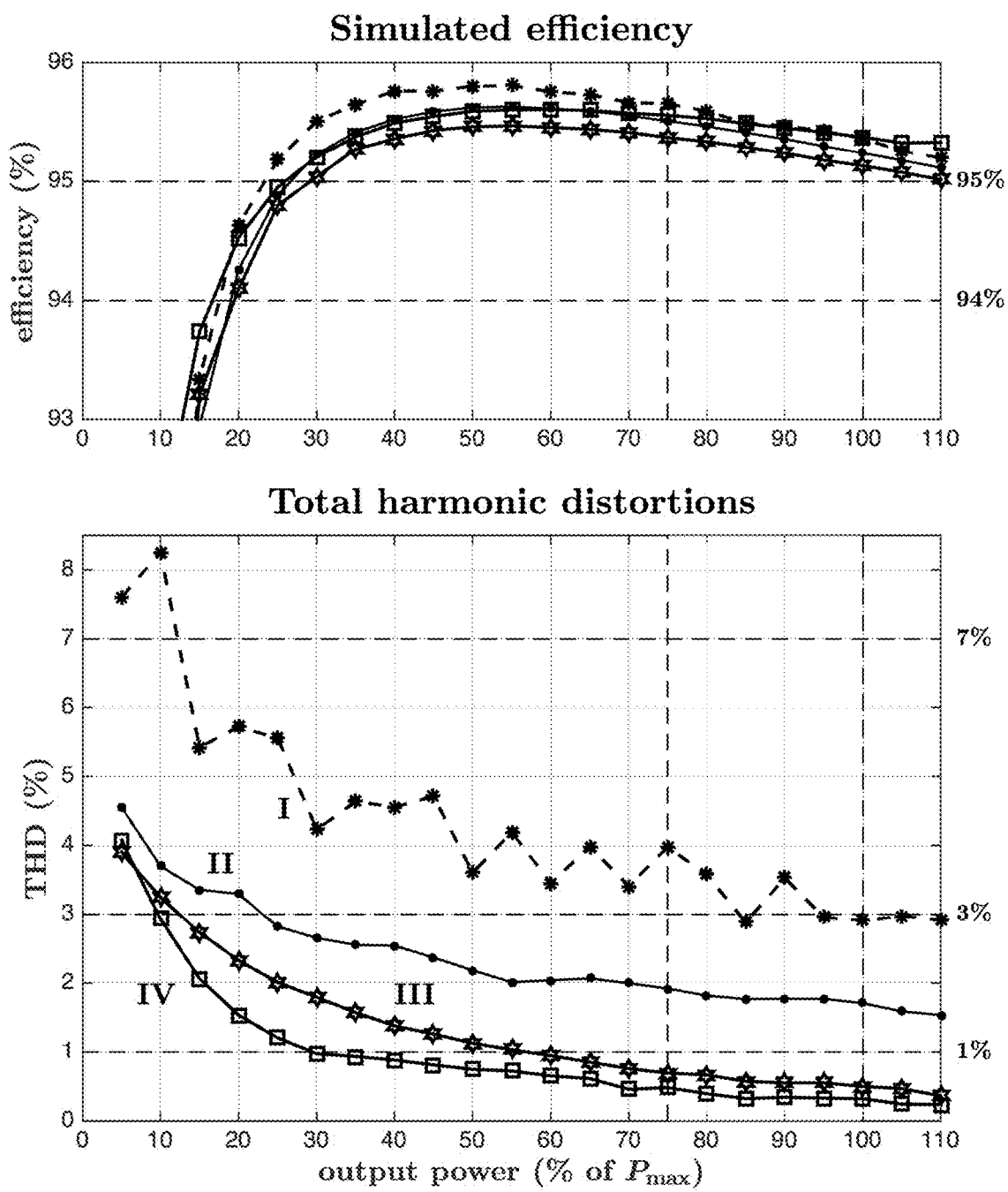
FIG. 43. Illustrative comparison of efficiencies and THD of ULSR converters, as functions of output power, for ULSRs (i) without active snubber, section CM chokes, and converter inductors coupling (line type I), (ii) with active snubber only (line type II), (iii) with both active snubber and section CM chokes (line type III), and (iv) with the snubber, CM chokes, and converter inductor coupling (line type IV). ($P_{max}=3$ kW, $f_{sw}=144$ kHz, $f_{AC}=500$ Hz, 115 VAC/270 VDC conversion.)

FIG. 43 provides illustrative comparison of efficiencies and THD of ULSR converters ($P_{max}$=3 kW, $f_{sw}$=144 kHz, $f_{AC}$=500 Hz, 115 VAC/270 VDC conversion), as functions of output power, for ULSRs (i) without active snubber, section CM chokes, and converter inductors coupling (line type I), (ii) with active snubber only (line type II), (iii) with both active snubber and section CM chokes (line type III), and (iv) with the snubber, CM chokes, and converter inductor coupling (line type IV).

Figure 44:
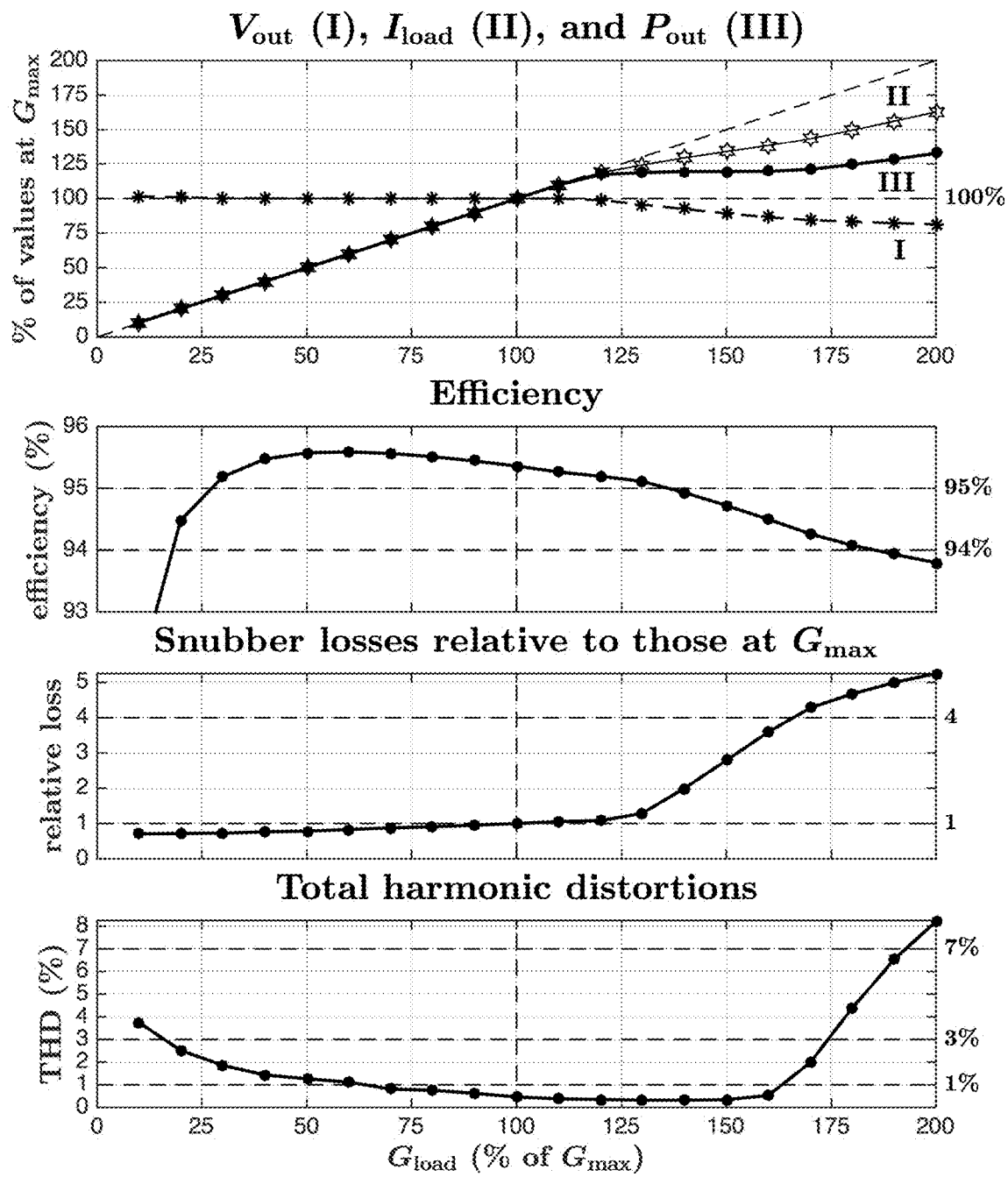
FIG. 44. Example of the output voltages, currents, and powers (illustrating the current/power limiting), efficiency, THD, and losses in the snubber, as functions of the load conductance, for a ULSR with active snubber and section CM chokes. ($P_{max}=3$ kW, $f_{sw}=144$ kHz, $f_{AC}=500$ Hz, 115 VAC/270 VDC conversion.)

FIG. 44 provides an example of the output voltages, currents, and powers (illustrating the current/power limiting), efficiency, THD, and losses in the snubber, as functions of the load conductance, for a ULSR with active snubber and section CM chokes. ($P_{max}$=3 kW, $f_{sw}$=144 kHz, $f_{AC}$=500 Hz, 115 VAC/270 VDC conversion.)

7 Additional Comments on the Current Disclosure

A 3-phase alternate current (AC) input voltage source may be viewed as comprising 3 AC voltage sources mutually connected to provide 3 line voltages. In the examples of the current disclosure (see, e.g., FIGS. 1, 6, and 34 through 37), the "Y" connection configuration was typically implied, and a different connection configuration would affect the relevant numerical values (e.g., AC/DV voltage conversion ratios) in the mathematical description.

As discussed in Subsection 1.1, for a given AC/DC voltage conversion ratio the maximum "on" time interval would need to be sufficiently smaller than the total switching time interval, $\max(\Delta t_{on}) < D_{max}'\Delta T$ (see equation (12)), to ensure a DCM operation.

Further, for a given AC/DC voltage conversion ratio, an output direct current (DC) power, and the total switching time interval, the converter inductance should be sufficiently small (see, for example, equation (15)) to ensure a DCM operation. That is, the converter inductance should be sufficiently small so that, for any switching cycle, effectively all electrical energy stored in a converter inductor at the end of the "on" time interval is transferred to the output storage capacitor by the end of the total switching time interval. When converter inductors are replaced by autotransformers (see Section 4.5) or flyback transformers (see Section 5), the requirement for the converter inductance to be sufficiently small translates into the requirement for the primary inductance, or primary self-inductance, respectively, to be sufficiently small.

The capacitance of the output storage capacitor should be sufficiently large (e.g., $C \gg 2\Delta T/R_{load}$), so that, for any switching cycle, the electrical energy stored in the output capacitor would be much larger than the energy delivered to the load during the total switching time interval.

In reference to a flyback transformer, we may assume that the coupling coefficient is sufficiently high, and thus assume effective equality of the self- and magnetization inductances for both primary and secondary windings.

In reference to an autotransformer, we would assume that an autotransformer may be represented using two connected in series and magnetically coupled inductors, with inductances L and L', as shown in FIG. 35. Then we may refer to L as the "primary inductor" and/or the "primary inductance". If the autotransformer is a step-up autotransformer, the polarity of the L' inductor would be as indicated by the phase dots in FIG. 35, and the output voltage would be given by equation (103). If the autotransformer is a step-down autotransformer, then the polarity of the L' inductor would be reversed, and the output voltage may be written as $$V_{out}' = V_{out}\left(1 - \sqrt{\frac{L'}{L}}\right), \quad (105)$$

where $V_{out}=V_+-V_-$ is the output voltage of the "base" ULSR (e.g., shown in FIG. 6) with the same component values (and the converter inductor value equal to L).

As discussed throughout the disclosure, the switching frequency is much larger than the AC frequency, and thus the total switching time interval is much smaller than the inverse of the AC frequency.

As discussed in Section 2.1, the line inductance should be sufficiently large so that the line currents may be considered constant during a switching interval. Also, as further discussed in Section 2.1, the virtual neutral capacitors should have sufficiently large capacitance to ensure an increasing current through a converter inductor during any "on" time interval.

Further, Section 2.2 provides detailed discussion of the boundaries and/or ranges for the line inductances and/or the virtual neutral capacitances based on the desired ranges for the power factor at different loads, and on other converter specifications.

REFERENCES

[1] R. Bracewell. *The Fourier Transform and Its Applications*, chapter "Heaviside's Unit Step Function, H(x)", pages 61-65. McGraw-Hill, New York, 3rd edition, 2000.
[2] P. A. M. Dirac. *The Principles of Quantum Mechanics*. Oxford University Press, London, 4th edition, 1958.
[3] J. W. Kolar and J. Mühlethaler. The essence of three-phase PFC rectifier systems. In 2012 *IEEE 7th International Power Electronics and Motion Control Conference—ECCE Asia (IPEMC 2012)*, pages 1-178, Harbin, China, 2-5 Jun. 2012.

Regarding the invention being thus described, it will be obvious that the same may be varied in many ways. Such variations are not to be regarded as a departure from the spirit and scope of the invention, and all such modifications as would be obvious to one skilled in the art are intended to be included within the scope of the claims. It is to be understood that while certain now preferred forms of this invention have been illustrated and described, it is not limited thereto except insofar as such limitations are included in the following claims.

A full-wave rectifier is a conventional feature of various AC/DC power converters, and it converts the whole of the input waveform to one of constant polarity (positive or negative) at its output. Mathematically, this corresponds to the absolute value function. As illustrated in FIGS. 1, 6, 16, 33, 34, 35 and 37, full-wave rectified differences between pairs of AC voltages may be obtained by means of full-wave bridge rectifiers. One skilled in the art will recognize that silicon or Schottky diodes may be used in such bridge rectifiers and, instead of diode bridge rectifiers, active or passive full-wave MOSFET bridge rectifiers may be used.

The error voltage, or error signal ΔV is introduced above as the difference between the output voltage $V_{out}$ and the reference voltage $V_{ref}$. An error voltage $\mu\Delta V$ (t) proportional to the difference between the output voltage $V_{out}$ and the reference voltage $V_{ref}$ (the "feedback error signal" above is used to form a comparator input signal x(t) (see, e.g., equation (74)), and it is indicated by the graphical symbol "$\mu\Delta V(t)$" in FIG. 32. A pulse-width modulator (PWM) comprises said comparator to compare the signal x(t) with a frequency control signal (FCS) y(t) to produce a (two-level) switch control signal (SCS) (see, e.g., FIGS. 19, 20, 21, and 32). One skilled in the art will recognize that an error voltage may be obtained by a variety of means, including various electronic circuits that produce an output signal $\mu\Delta V$ (t) that is effectively proportional to a difference or sum of two input signals (e.g., voltages) $V_1(t)$ and $V_2(t)$: $\mu\Delta V(t) \propto V_1(t) - V_2(t) = V_1(t) + (V_2(t))$. For example, the error voltage $\mu\Delta V(t) \propto V_{out}(t) - V_{ref}$ may be provided by the output of a summing amplifier with gain $\mu$ that is given two input voltages: (1) the sensed or sampled output voltage $V_{out}(t)$ and (2) an effectively constant reference voltage $-V_{ref}$. A means to obtain an error voltage is a conventional feature of a typical voltage regulator, and its detailed illustration is not essential for a proper understanding of the current invention.

One skilled in the art will recognize that a periodic frequency control signal (FCS) with a desired fundamental frequency may be produced by a variety of electronic circuits. An example of an electronic circuit that produces a periodic, oscillating electronic signal (e.g., a sine wave) would be an electronic oscillator that converts direct current (DC) from a power supply to an alternating current (AC) signal. Such oscillators are widely used in many electronic devices to generate, e.g., signals broadcast by radio and television transmitters, clock signals that regulate computers and quartz clocks, and the sounds produced by electronic beepers and video games.

As discussed in Section 3, an FCS y(t) should be such that $$\frac{d}{dx}(\theta(y(t)-x))(\theta(y(t)-x))^2_{\Delta T} \approx const \text{ for } x_{min} < x \leq \max(y(t)), \quad (106)$$

where $\Delta T = f_{sw}^{-1}$ is the FCS period. For example, when the FCS is a sine signal, $y(t)=A \sin(2\pi t/\Delta T)$, equation (106) would approximately hold for $0 \leq x \leq A$, as illustrated in FIGS. 21 and 22. Such a sine wave FCS may be generated by first generating a square wave (e.g., by a multivibrator circuit), then filtering this square wave by a lowpass or a bandpass filter to suppress the harmonics of the fundamental frequency.

Further, as discussed above, an approximation to a parabolic FCS may be a full-wave rectified sine wave with frequency $f_{sw}/2$, e.g., $B|\sin(\pi t/\Delta T)|$. Rectification of a sine wave may be accomplished in a variety of ways, e.g., by an active op amp-based precision full-wave rectifier. To obtain the desired lower and upper limits of the FCS, a linear transformation (i.e., scaling and/or translation) may be applied to such full-wave rectified sine wave. For example, to obtain the FCS illustrated in FIG. 20, the following scaling and translation may be applied to the signal $B \sin(\pi t/\Delta T)|$:

$$y(t) = \frac{4A}{B} B \left|\sin\left(\frac{\pi t}{\Delta T}\right)\right| - 4A \quad (107)$$

(i.e., scaling by the factor (gain) 4A/B and translation (shift) by $-4A$). Such scaling and/or translation may be accomplished, e.g., by means of an electronic amplifier with a gain 4A/B and an output DC voltage offset $-4A$.

As discussed above and illustrated in FIGS. 19 and 22, a (symmetric or asymmetric) "parabolic" FCS may be generated, e.g., by integrating (for example, by an op-amp or a switched-capacitor based integrator) a zero-mean sawtooth (for an asymmetric wave) or triangle (for a symmetric wave) signal and applying appropriate scaling and/or translation. Alternatively, such a parabolic FCS may be obtained by squaring (for example, by a translinear squaring circuit) a sawtooth or a triangle wave produced, e.g., by a ramp generator. One skilled in the art will recognize that a parabolic FCS with a desired fundamental frequency may be obtained by a variety of electronic circuits, and that parabolic waveform generators are commonly used, e.g., for controlling an electron beam in a cathode ray tube (CRT) displays. Thus, a means to produce a periodic FCS with a desired fundamental frequency is a conventional feature in various apparatus, and its detailed illustration is not essential for a proper understanding of the current invention. As such, an FCS is indicated by the labels "FCS" and "$-y(t)$" in FIG. 32.

I claim:

1. A controller for non-isolated switching rectifier configured to provide DC electrical power to a load characterized by a load current, wherein said non-isolated switching rectifier is characterized by a pair of AC line voltages, a DC output voltage, a DC reference voltage, and a switching frequency, wherein said non-isolated switching rectifier comprises a means to obtain a full-wave rectified difference between said pair of AC line voltages, a rectifier inductor associated with said pair of AC line voltages, an output storage capacitor connected in parallel to said load, and a rectifier switch controlled by a switch control signal, and wherein said controller provides said switch control signal characterized by a duty cycle and capable of controlling said rectifier switch, said controller comprising:

a) an integrator characterized by an integration time constant and operable to receive an integrator input signal and to produce an integrator output signal, wherein said integrator output signal is proportional to an antiderivative of said integrator input signal;

b) a comparator operable to receive a comparator input signal and to output said switch control signal;

c) a means to produce a frequency control signal, wherein a fundamental frequency of said frequency control signal is effectively equal to said switching frequency, and d) a means to obtain an error voltage, wherein said error voltage is effectively proportional to a difference between said DC output voltage and said DC reference voltage;

wherein said integrator input signal is effectively proportional to said error voltage, wherein said comparator input signal comprises a first comparator input component effectively proportional to said frequency control signal, wherein said comparator input signal comprises a second comparator input component, and wherein said second comparator input component comprises a linear combination of said error voltage and said integrator output signal.

2. The controller of claim 1 wherein said duty cycle is characterized by a maximum duty cycle value and wherein said frequency control signal is configured in such a way that a squared value of said duty cycle is effectively proportional to said second comparator input component when said duty cycle is larger than zero and is smaller than said maximum duty cycle value.

3. The controller of claim 2 wherein the amplitude of said second comparator input component is limited such that said duty cycle does not exceed said maximum duty cycle value.

4. The controller of claim 2 wherein said second comparator input component comprises a linear combination of said error voltage, said integrator output signal, and said load current.

5. The apparatus of claim 4 wherein the amplitude of said second comparator input component is limited such that said duty cycle does not exceed said maximum duty cycle value.

6. A controller for isolated switching rectifier configured to provide DC electrical power to a load characterized by a load current, wherein said isolated switching rectifier is characterized by a pair of AC line voltages, a DC output voltage, a DC reference voltage, and a switching frequency, wherein said isolated switching rectifier comprises a means to obtain a full-wave rectified difference between said pair of AC line voltages, a rectifier transformer having primary and secondary windings and being associated with said pair of AC line voltages, an output storage capacitor connected in parallel to said load, and a rectifier switch controlled by a switch control signal, and wherein said controller provides said switch control signal characterized by a duty cycle and capable of controlling said rectifier switch, said controller comprising:
 a) an integrator characterized by an integration time constant and operable to receive an integrator input signal and to produce an integrator output signal, wherein said integrator output signal is proportional to an antiderivative of said integrator input signal;
 b) a comparator operable to receive a comparator input signal and to output said switch control signal;
 c) a means to produce a frequency control signal, wherein the fundamental frequency of said frequency control signal is effectively equal to said switching frequency, and
 d) a means to obtain an error voltage, wherein said error voltage is effectively proportional to a difference between said DC output voltage and said DC reference voltage;
  wherein said integrator input signal is effectively proportional to said error voltage, wherein said comparator input signal comprises a first comparator input component effectively proportional to said frequency control signal, wherein said comparator input signal comprises a second comparator input component, and wherein said second comparator input component comprises a linear combination of said error voltage and said integrator output signal.

7. The controller of claim 6 wherein said duty cycle is characterized by a maximum duty cycle value and wherein said frequency control signal is configured such that a squared value of said duty cycle is effectively proportional to said second comparator input component when said duty cycle is larger than zero and is smaller than said maximum duty cycle value.

8. The controller of claim 7 wherein the amplitude of said second comparator input component is limited such that said duty cycle does not exceed said maximum duty cycle value.

9. The controller of claim 7 wherein said second comparator input component comprises a linear combination of said error voltage, said integrator output signal, and said load current.

10. The apparatus of claim 9 wherein the amplitude of said second comparator input component is limited such that said duty cycle does not exceed said maximum duty cycle value.

* * * * *